United States Patent [19]

Miyazawa et al.

[11] Patent Number: 5,369,462
[45] Date of Patent: Nov. 29, 1994

[54] INCLINATION DETECTING APPARATUS AND CAMERA FOR DETECTING HAND SHAKE USING THE SAME

[75] Inventors: Azuma Miyazawa; Kouji Mizobuchi; Takeshi Ito; Masataka Ide; Atsushi Maruyama, all of Tokyo; Juro Kikuchi, Yamanashi; Yuji Imai, Tokyo, all of Japan

[73] Assignee: Olympus Optical Co., Ltd., Tokyo, Japan

[21] Appl. No.: 72,837

[22] Filed: Jun. 7, 1993

[30] Foreign Application Priority Data

Jun. 9, 1992 [JP] Japan .................. 4-149673
Jun. 9, 1992 [JP] Japan .................. 4-149674
Jul. 28, 1992 [JP] Japan .................. 4-201475
Sep. 16, 1992 [JP] Japan .................. 4-246846

[51] Int. Cl.$^5$ ............... G03B 17/00; G01C 3/08
[52] U.S. Cl. ....................... 354/430; 356/1
[58] Field of Search ............ 354/430, 403, 410; 356/1, 4

[56] References Cited

U.S. PATENT DOCUMENTS

| | | | |
|---|---|---|---|
| 4,761,546 | 8/1988 | Ikari et al. | 356/1 X |
| 4,888,490 | 12/1989 | Bass et al. | 356/1 X |
| 4,911,550 | 3/1990 | Hisakuni | 356/376 |
| 5,148,211 | 9/1992 | Kotani et al. | 354/403 |
| 5,162,661 | 11/1992 | Sato et al. | 356/375 X |
| 5,166,723 | 11/1992 | Yoshida et al. | 354/430 |
| 5,175,580 | 12/1992 | Shiomi | 354/410 |
| 5,235,376 | 8/1993 | Inoue et al. | 354/403 |
| 5,237,365 | 8/1993 | Miyazawa | 354/430 X |
| 5,257,060 | 10/1993 | Kotani et al. | 354/403 X |

FOREIGN PATENT DOCUMENTS

57-482    1/1982  Japan .
87/02797  5/1987  WIPO .

OTHER PUBLICATIONS

Sharp Electronic Parts General Catalog (published on Dec. 1991, p. 45).
Sharp Semicon Data Book (published on 1992, pp. 541–543).
Patent Abstracts of Japan, vol. 16, No. 511 (P-1441) Oct. 21, 1992 & JP-A-04 186 325 (Olympus Optical Co., Ltd.).
Patent Abstracts of Japan, vol. 16, No. 430 (P-1417) Sep. 9, 1992 & JP-A-04 147 228 (Fuji Photo Optical Co.).
Patent Abstracts of Japan, vol. 9, No. 329 (P-416) Dec. 24, 1985 & JP-A-60 154 176 (Matsushita Denko KK) Aug. 13, 1985.

*Primary Examiner*—W. B. Perkey
*Attorney, Agent, or Firm*—Frishauf, Holtz, Goodman & Woodward

[57] ABSTRACT

An inclination detecting apparatus includes a light projecting section, a light receiving section and an operating section. The light projection section projects light towards an object. The light receiving section receives lights reflected from at least two points of the object and outputs a photoelectric current signal. The operating section derives a difference between the reciprocals of the square roots of the photoelectric currents output from the light receiving section. An output of the operating section represents an inclination signal of the object. A shake detecting apparatus includes a light projecting/receiving section and an operating section. The light projecting/receiving section is disposed on the rear surface of a camera, so as to project light towards a photographer, receive lights reflected from at least two points on light receiving elements, and output photoelectric current signals for the respective points. The operating section derives a difference between the reciprocals of the square roots of the photoelectric currents output from the light receiving elements. An output of the operating section is used as a hand shake signal.

108 Claims, 47 Drawing Sheets

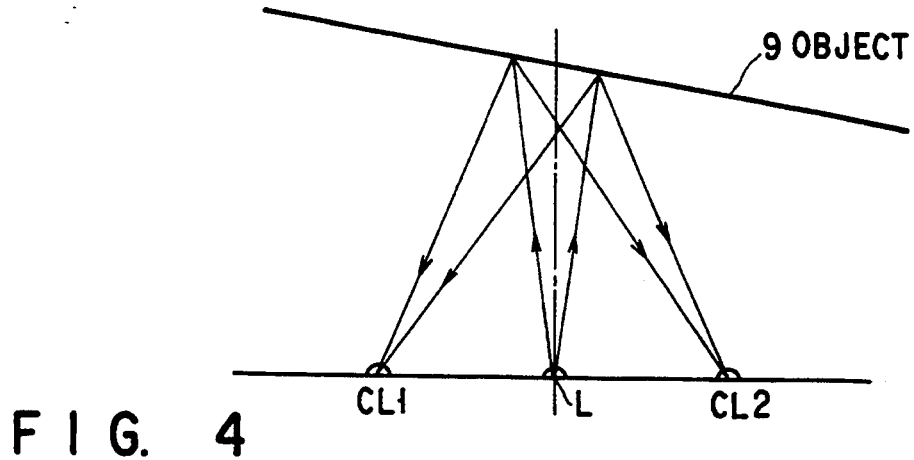
F I G. 4
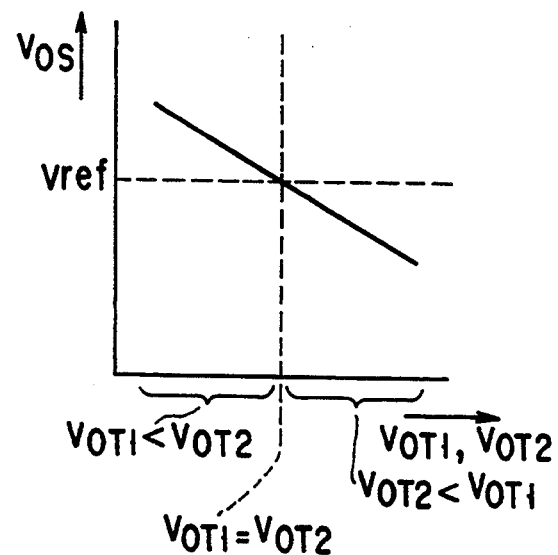
F I G. 6A
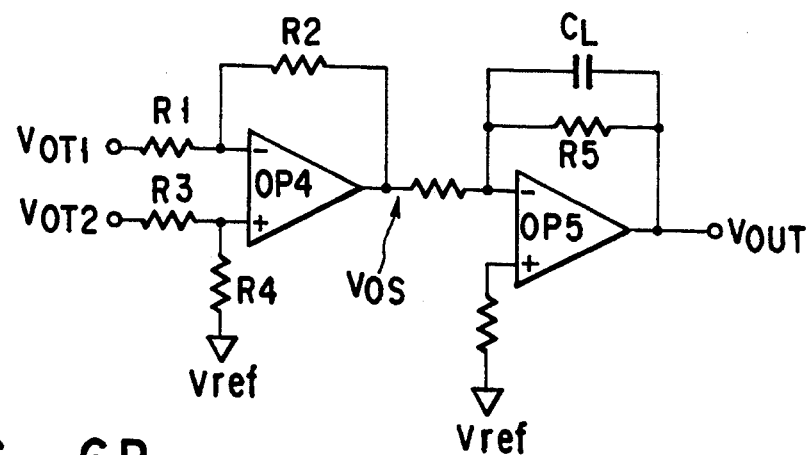
F I G. 6B

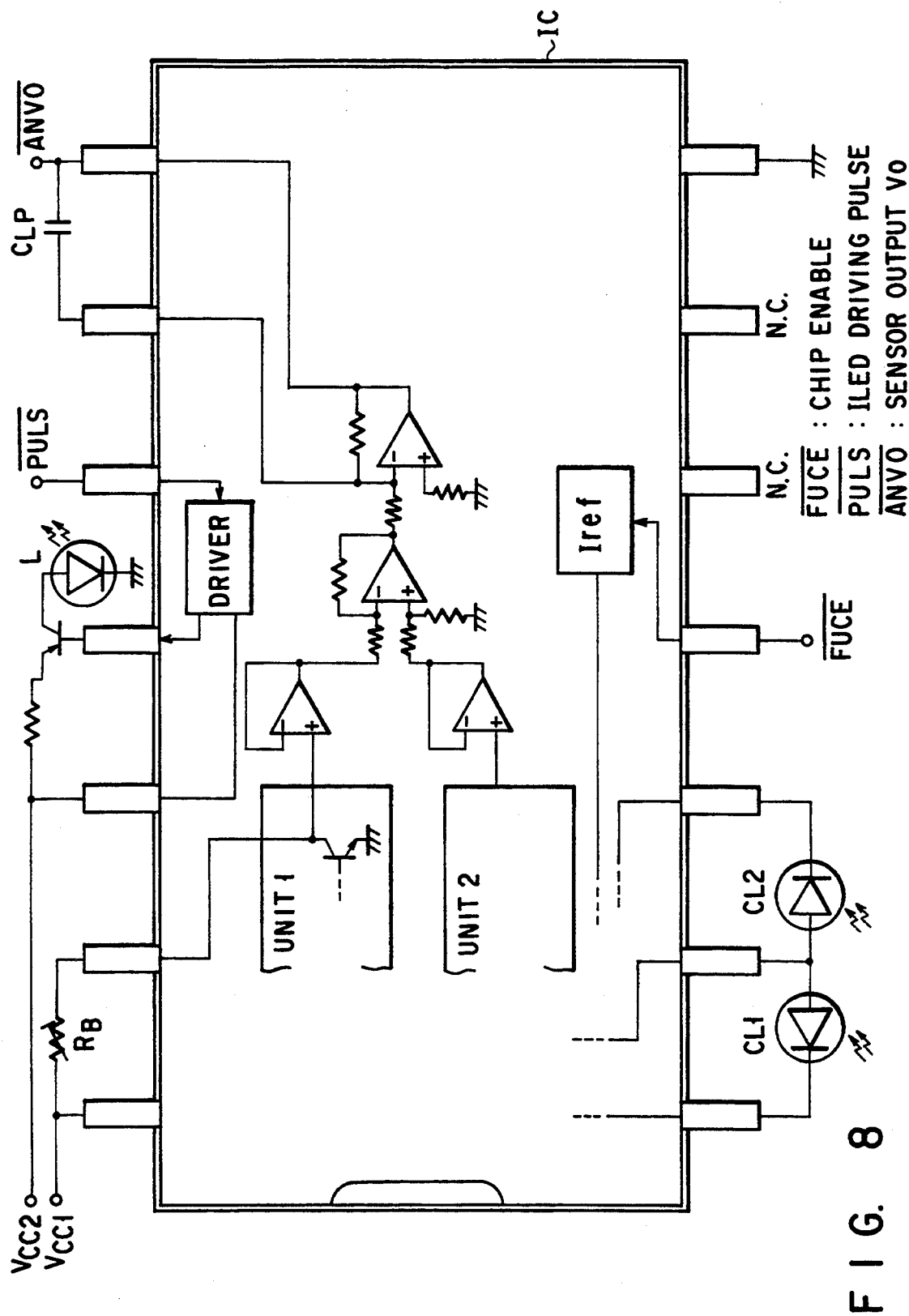
F I G. 8

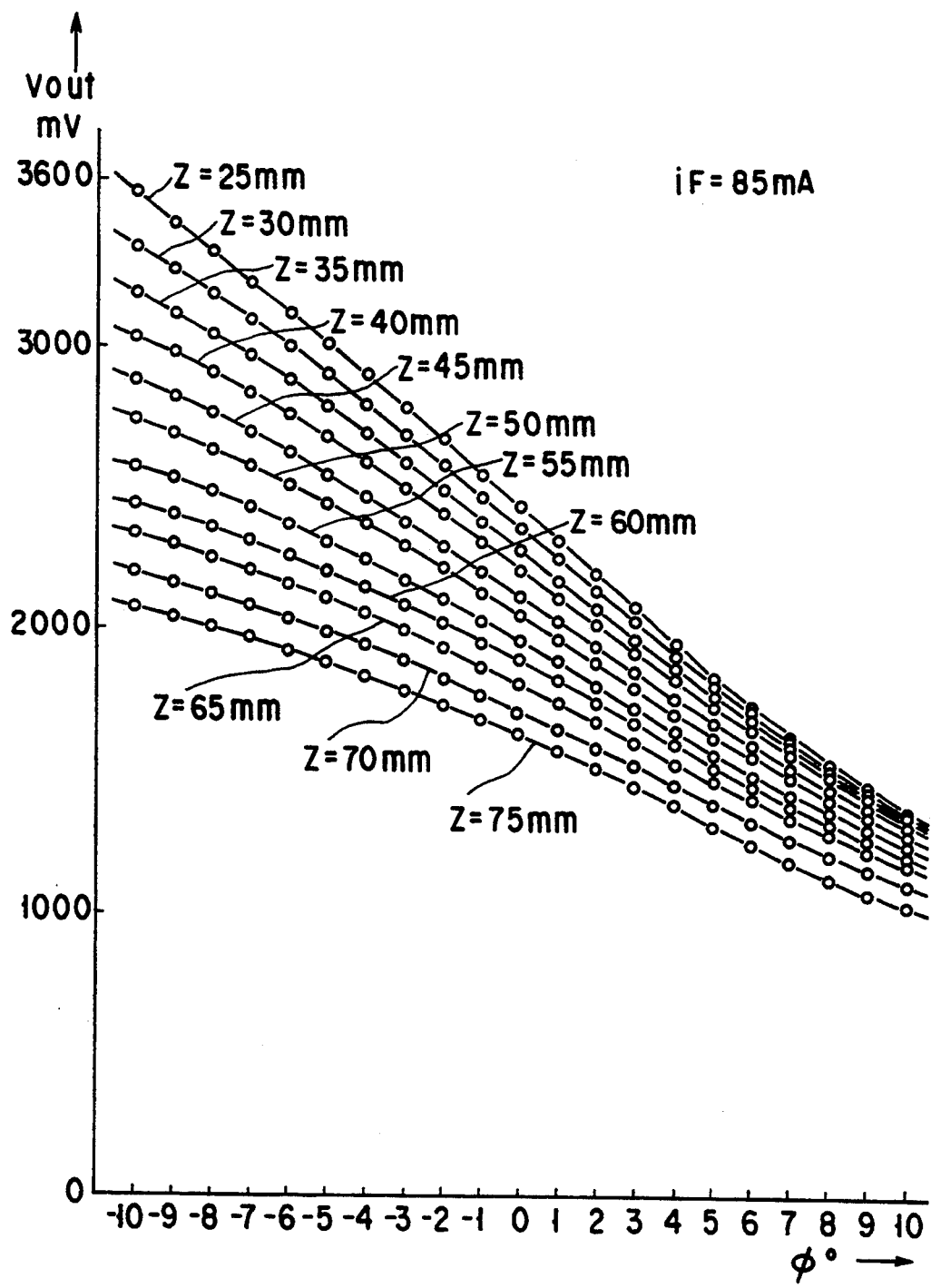
F I G. 12

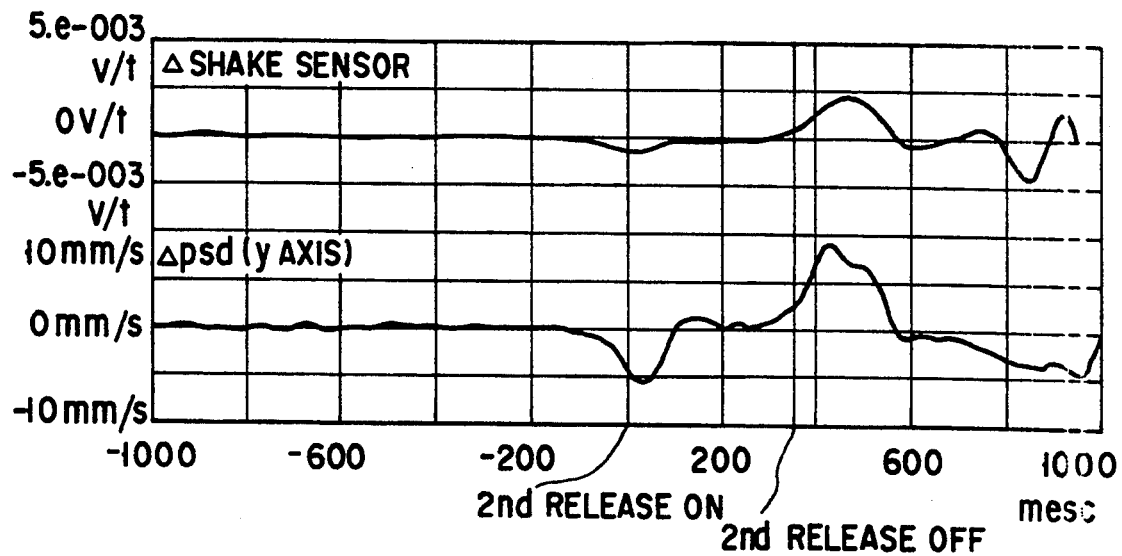
F I G. 17A
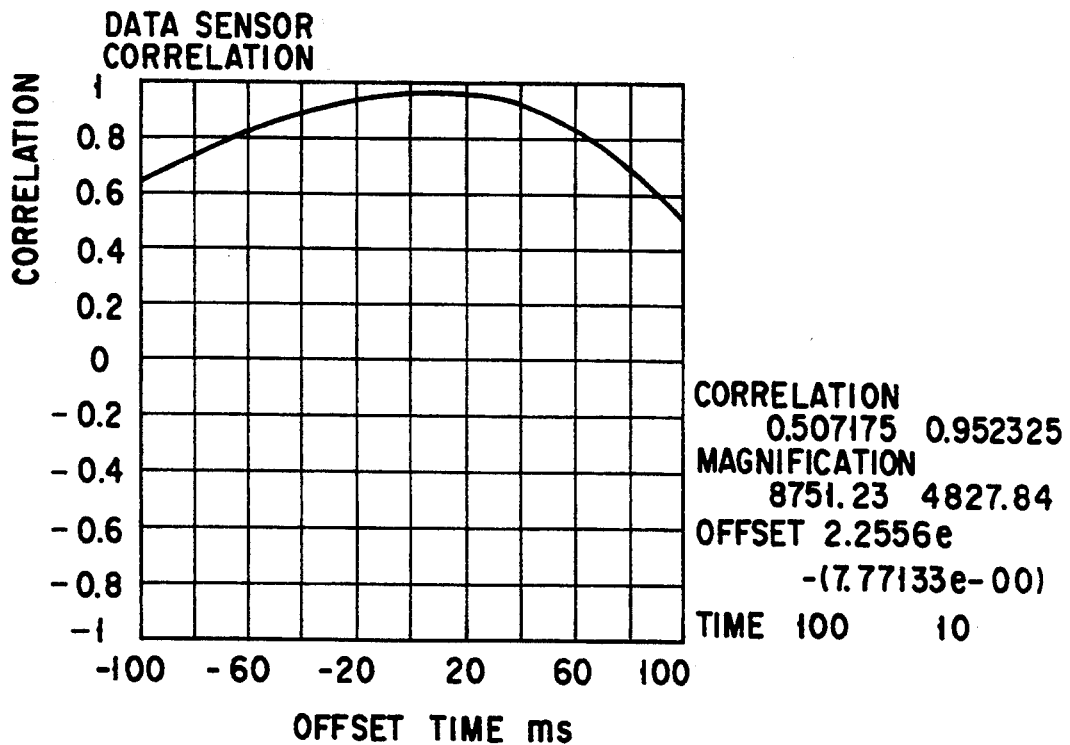
F I G. 17B

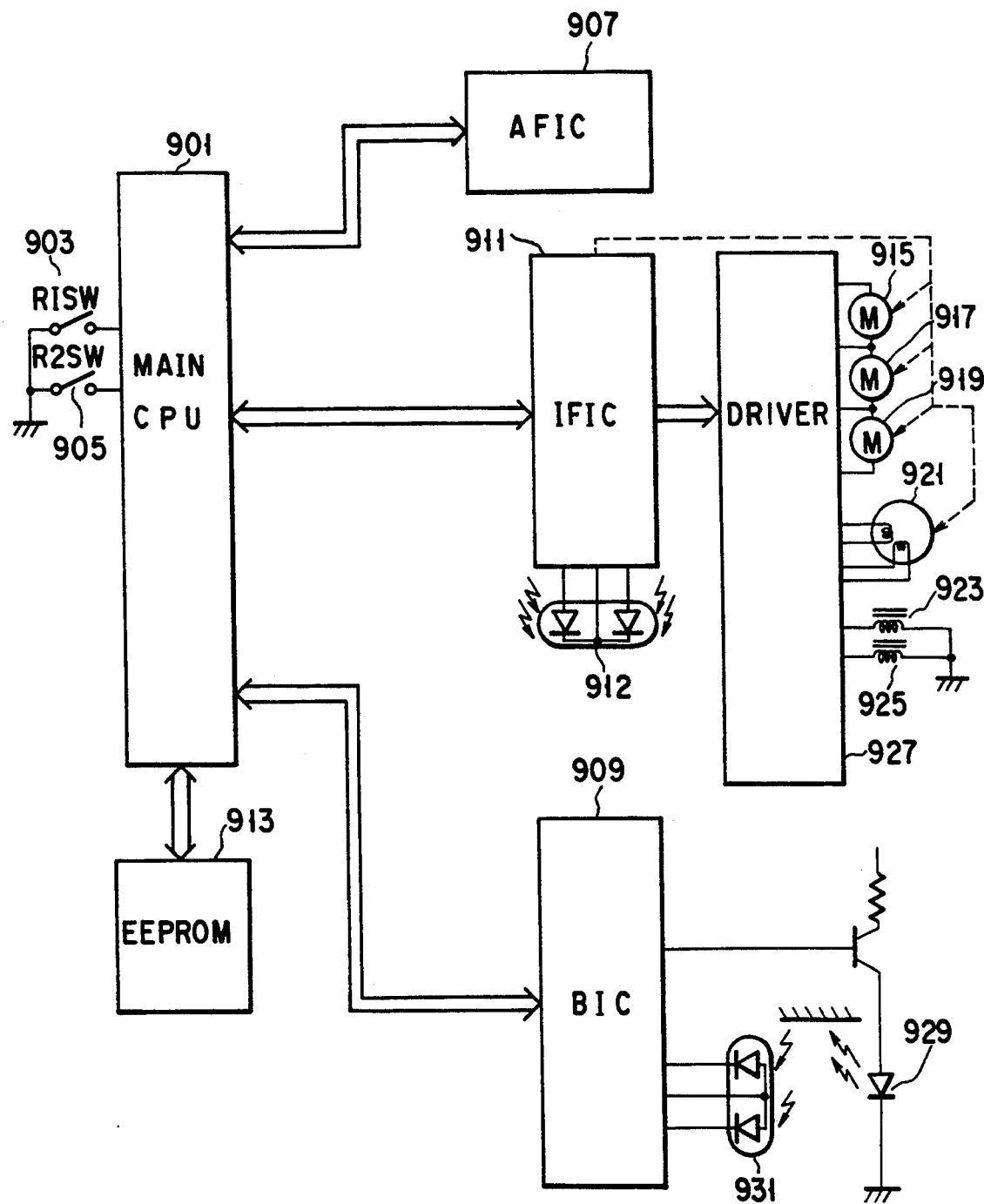
F I G. 21

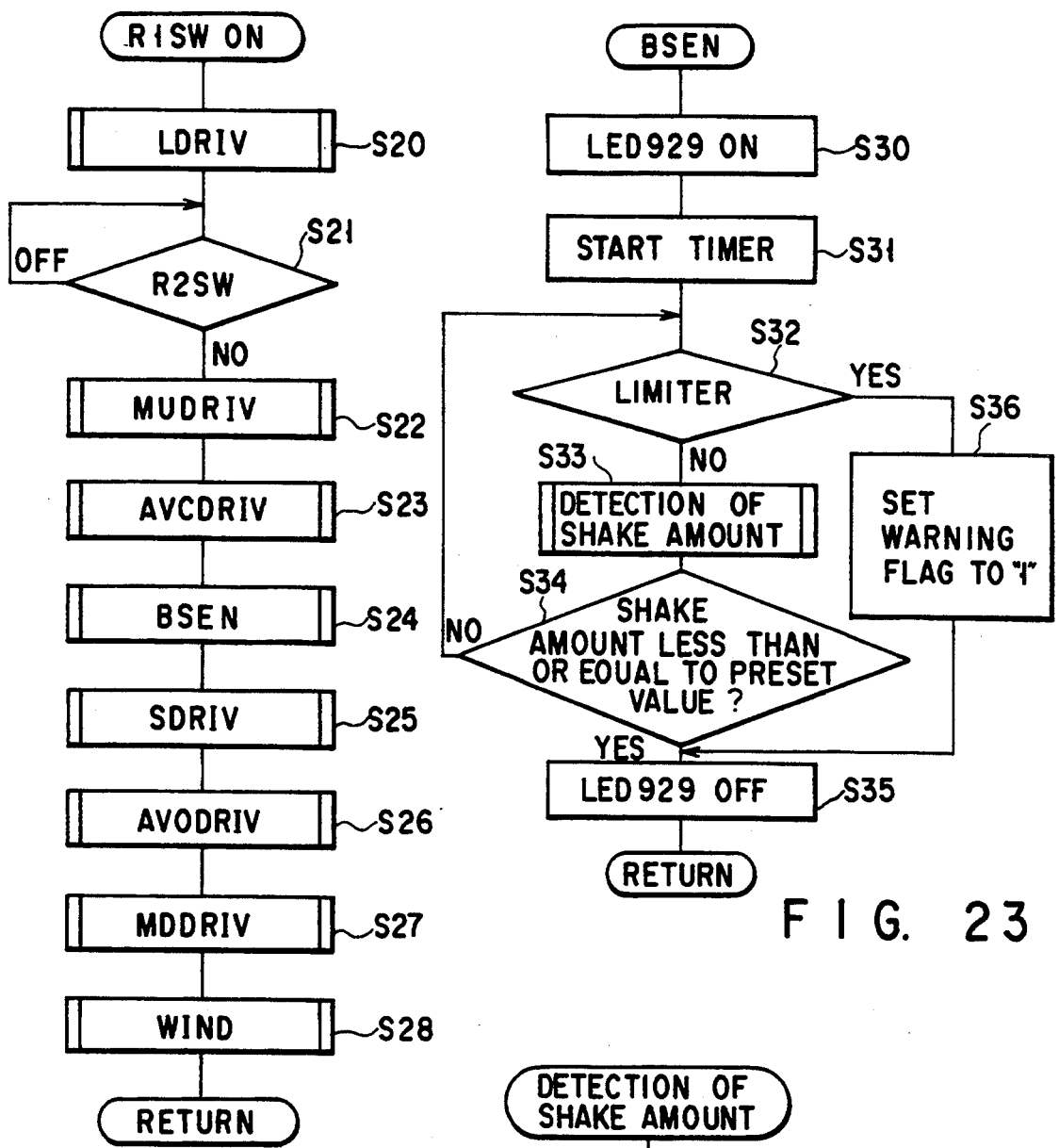
FIG. 22
FIG. 23
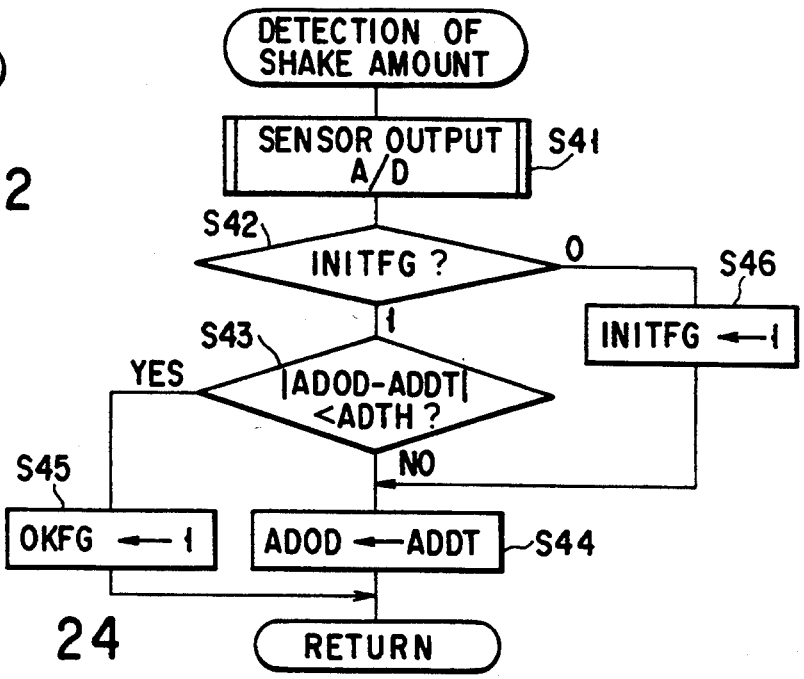
FIG. 24

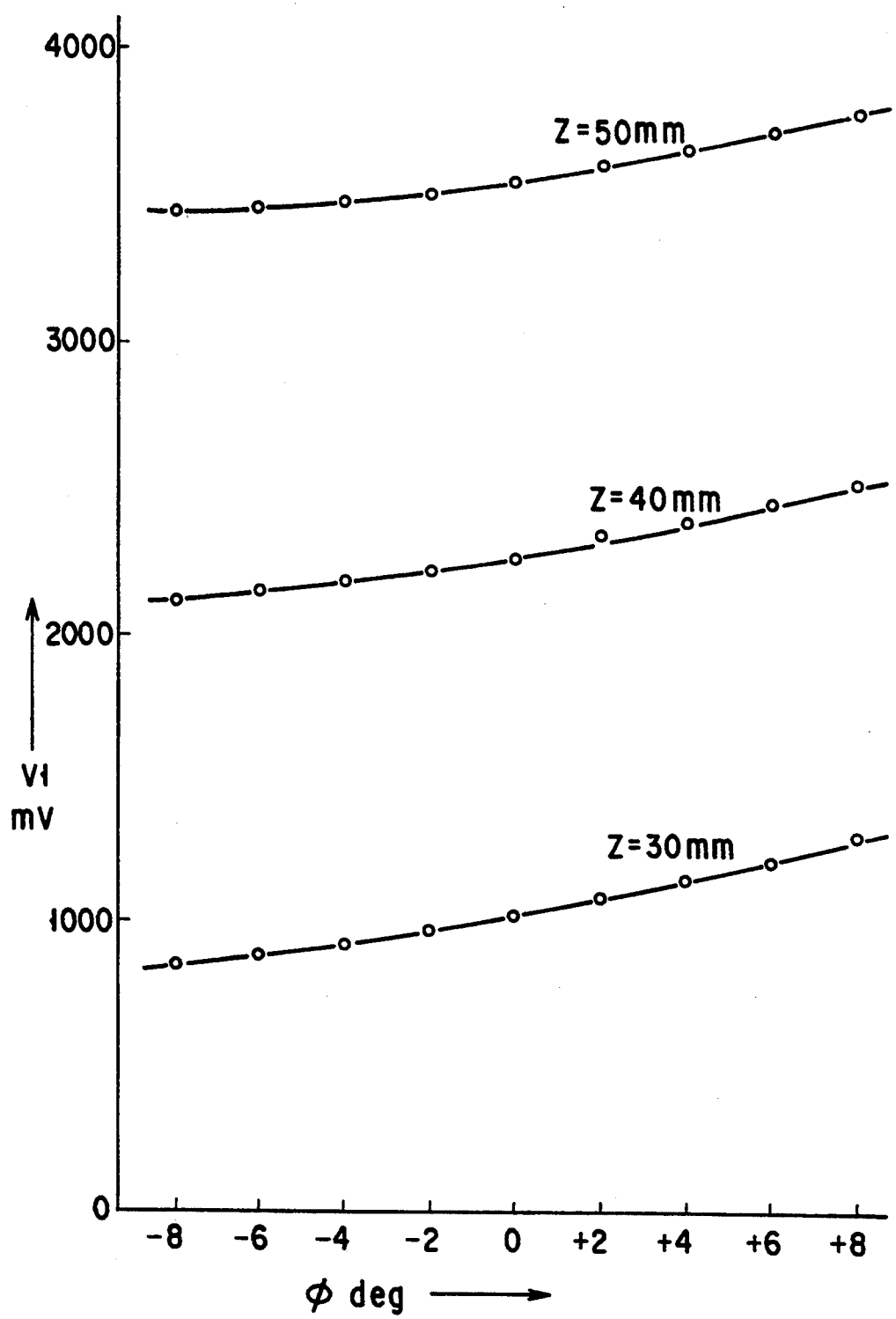
F I G. 31

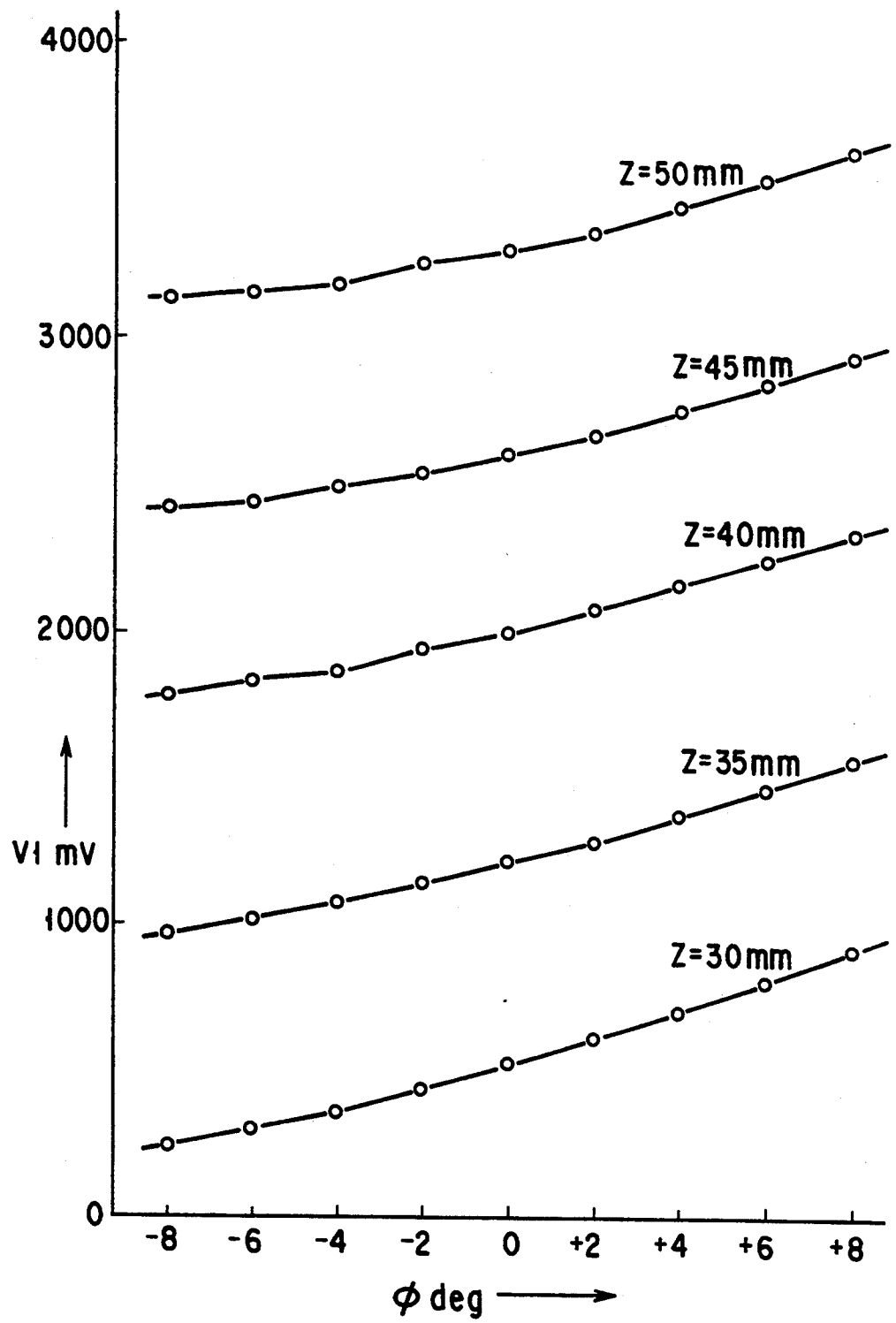
F I G. 36

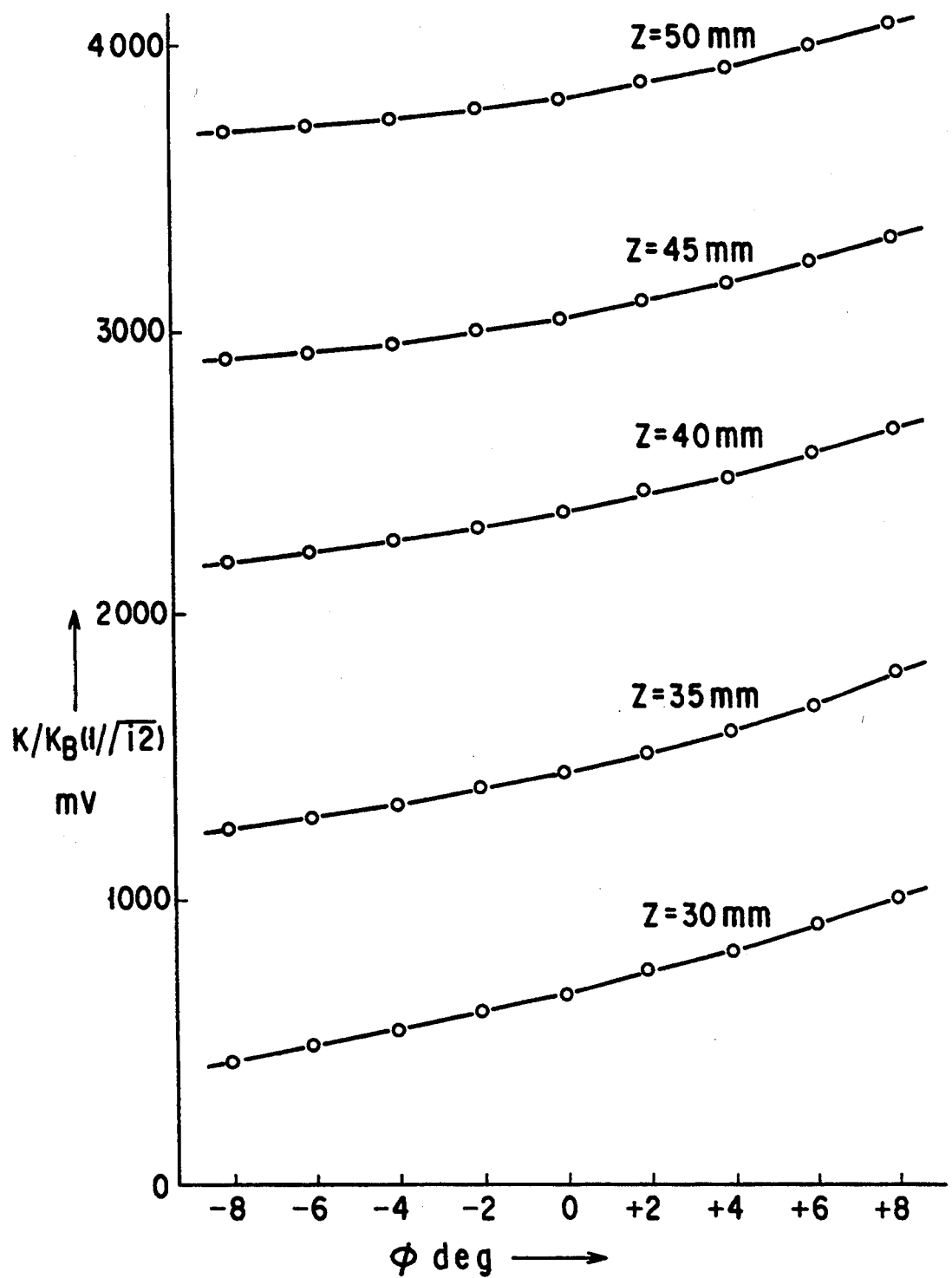
F I G. 40

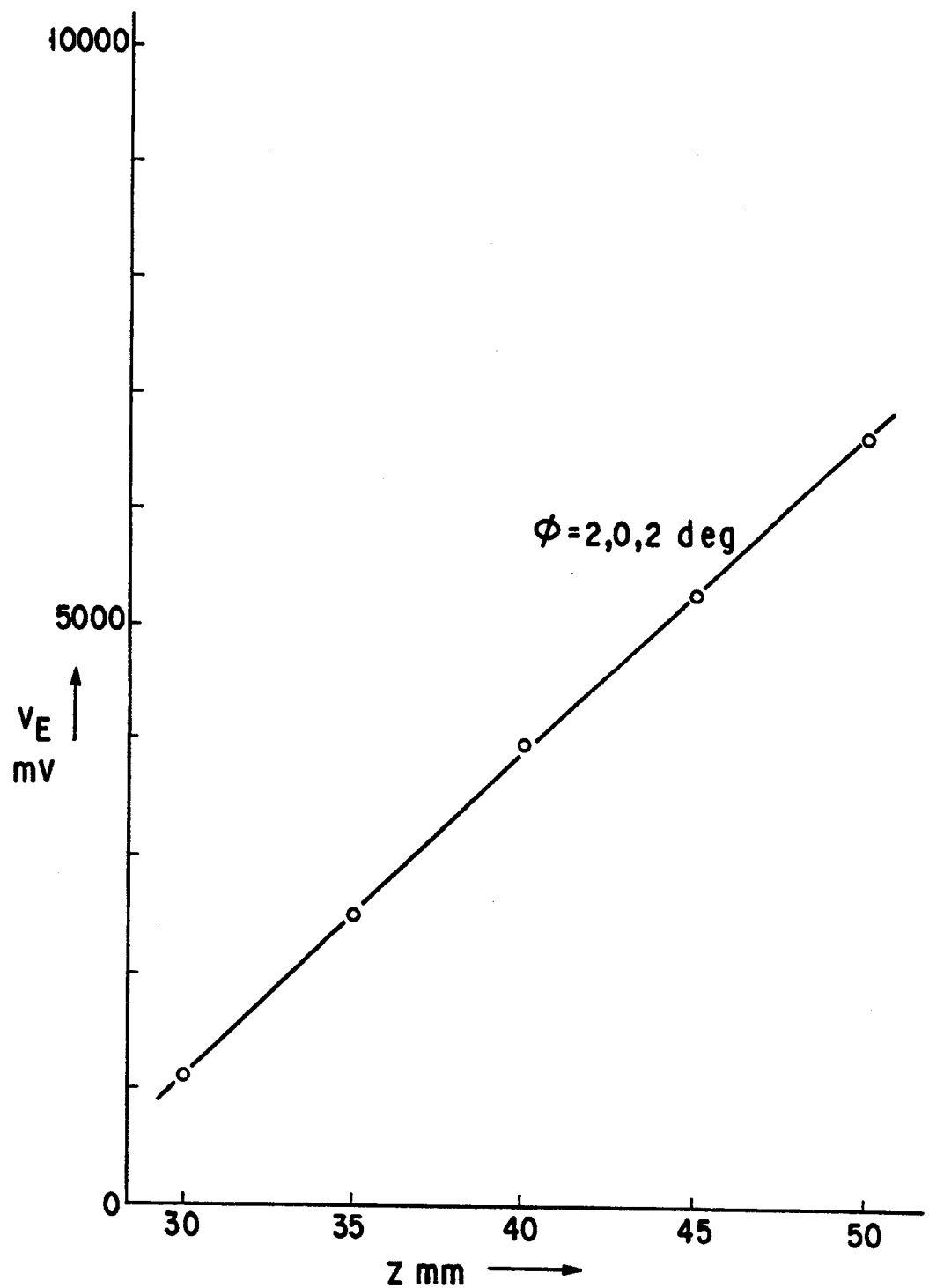
F I G. 43

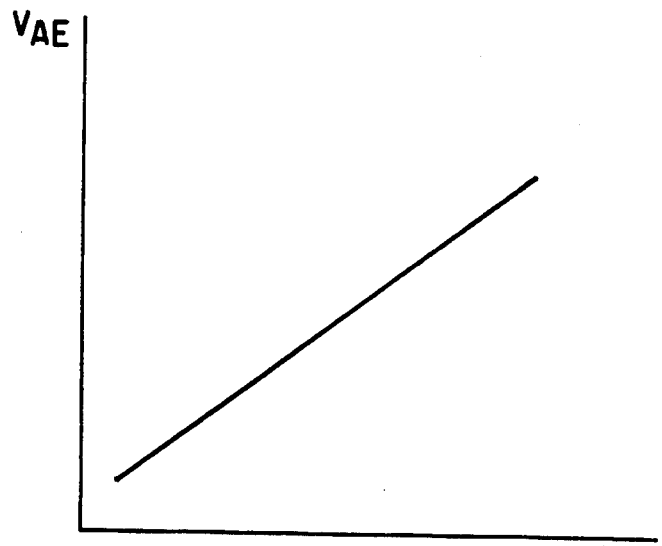
F I G. 60
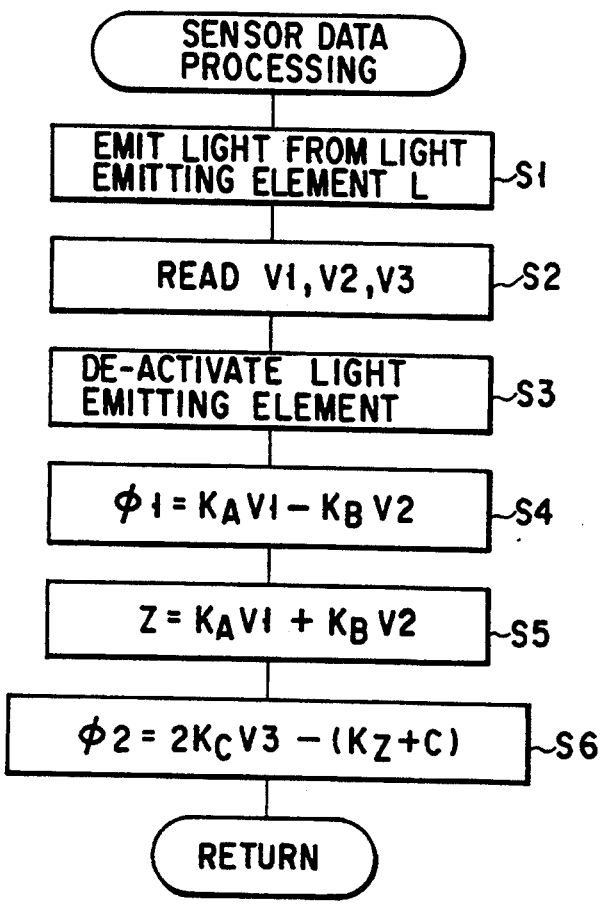
F I G. 61

INCLINATION DETECTING APPARATUS AND CAMERA FOR DETECTING HAND SHAKE USING THE SAME

BACKGROUND OF THE INVENTION

1. Field of the Invention

The present invention relates to an inclination detecting apparatus and a camera for detecting hand shake using the same, and more particularly to a non-contact type inclination detecting apparatus and a camera for detecting hand shake using the same.

The present invention also relates to an inclination detecting apparatus for easily detecting an inclination immediately before and after a shutter release operation in a camera having a lens of long focal distance, for example.

Further, the present invention relates to a two-axial inclination sensor, and more particularly to a two-axial inclination sensor for detecting inclinations in two axial directions by use of a small number of flight receiving elements.

2. Description of the Related Art

As an example of a conventional non-contact type inclination detecting apparatus, an apparatus for projecting a light on a reflection object, receiving the reflected light on two light receiving sensors and deriving A/B as an inclination angle output when a difference between the outputs of the two sensors is denoted by A and the sum of the outputs of the two sensors is denoted by B is disclosed in SHARP Electronic Parts General Catalog (published on Dec. 1991, p 45) and SHARP SEMICON DATA BOOK (published on 1992, pp 541 to 543).

However, in the above non-contact type inclination detecting apparatus, the inclination angle detection range is only several degrees, and the flexibility thereof is small.

Further, as a conventional detecting apparatus of a camera for detecting hand shake, a shake detecting apparatus using an AF sensor is disclosed in Japanese Patent Publication No. 57-482. Further, Ser. No. 08/066,585 filed May 21, 1993 the technique of projecting infrared rays to a face and detecting a shake according to a variation in a photoelectric current caused by the reflected light is conventional.

However, in the above Japanese Patent Publication No. 57-482, the integral time of the sensor becomes longer in a dark circumstance and the response speed of detection is not sufficiently high for shake detection, and in the case of TTL AF, shake detection in the mirror-up state cannot be effected. Further, a component such as a variation in the distance between the sensor and the face which does not give an influence on the shake rather than the inclination of the camera is detected, thereby making it impossible to effect the shake detection of the camera with high precision.

SUMMARY OF THE INVENTION

It is, therefore, an object of the present invention to provide a new and improved inclination detecting apparatus and a camera for detecting hand shake using the same.

Another problems and another object of this invention is to provide an inclination detecting apparatus which has a great deal of flexibility, has a detection range covering a wide inclination angle and detects only the inclination angle even when a distance between the sensor and the face is changed.

This invention has been made in view of the above problems and another object of this invention is to provide a hand shake detecting apparatus of a camera capable of detecting a shake of the camera in the mirror-up condition with a simple construction.

Still another object of this invention is to provide an inclination detecting apparatus capable of correcting variations in output characteristics of a plurality of sensors by a simple calculation.

Yet another object of this invention is to provide a two-axial inclination sensor capable of detecting the inclination in two axial directions without using four light receiving elements.

According to one aspect of this invention, there is provided an inclination detecting apparatus comprising light projection means for projecting light towards a to-be-measured object; light receiving means for receiving reflection light from the light projection means and for outputting at least two photoelectric currents according to the received light amounts; first operating means for deriving reciprocals of the square roots of the respective two photoelectric currents output from the light receiving means; and second operating means for deriving a difference between the reciprocals of the square roots derived by the first operating means, an output of the second operating means representing the inclination of the to-be-measured object.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 4 is a diagram showing the construction of a sensor having two light receiving sections for one light projecting section;

FIG. 6A is a diagram showing the amplitude of a difference output VOS with respect to the relation between $V_{OT1}$ and $V_{OT2}$;

FIG. 6B is a diagram showing the construction of a subtraction circuit of FIG. 1;

FIG. 8 is a diagram showing the function block of a driving circuit of a light emitting section (infrared LED) in addition to the function blocks of FIG. 7;

FIG. 12 is a diagram showing the $\phi$-$V_{OUT}$ characteristic obtained when no lens is disposed in front of the light projecting section L and the light projection angle is approx. ±15°;

FIGS. 17A and 17B are diagrams showing the correlation between a PSD hand shake signal and a differential (variation in the speed in the y-axis direction) of the y-axis direction output of the shake sensor;

FIG. 21 is a block diagram showing a TTL single-lens reflex camera in which a non-contact type inclination detecting apparatus according to a first embodiment of this invention is incorporated;

FIG. 22 is a flowchart for illustrating the release operation of a camera in which a non-contact type inclination detecting apparatus according to the first embodiment of this invention is incorporated;

FIG. 23 is a flowchart for illustrating the procedure of a shake detecting sub-routine BSEN24;

FIG. 24 is a flowchart for illustrating the procedure of a shake amount detecting sub-routine in FIG. 23;

FIG. 31 is a diagram showing the characteristic of an output $V_1$ of the light receiving section $CL_1$ with respect to the inclination angle $\phi$;

FIG. 36 is a diagram showing the relation between the inclination angle $\phi$ [deg] and the output $V_1$ [mv];

FIG. 40 is a diagram showing the relation between the inclination angle $\phi$ [deg] and an output value after correction;

FIG. 43 is a diagram showing the relation between the distance Z and the total sum $V_E$ of photoelectric currents;

FIG. 60 is a characteristic diagram of a distance between the reflection surfaces of the light receiving elements $CL_1$ and $CL_2$ including the correction coefficient;

FIG. 61 is a flowchart for illustrating the sensor data processing operation;

DETAILED DESCRIPTION OF THE PREFERRED EMBODIMENTS

Figure 1:
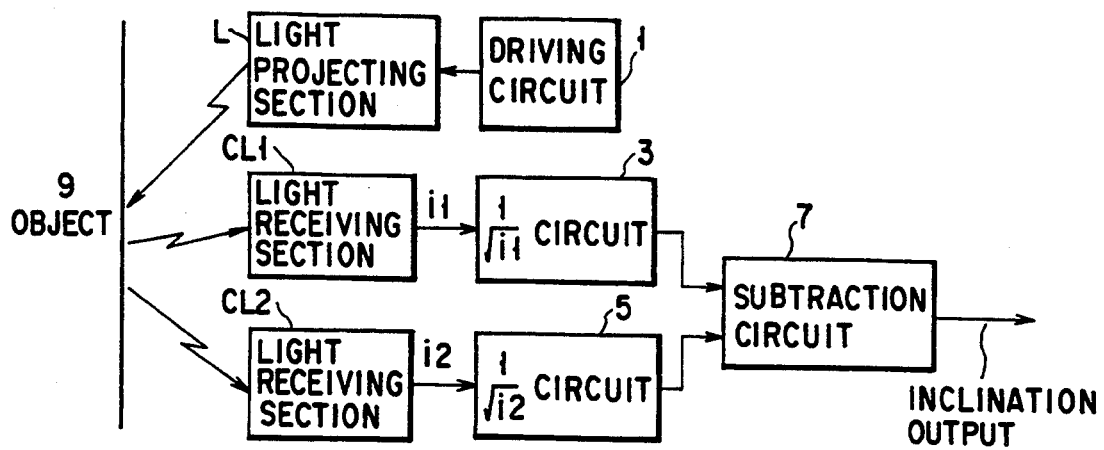
FIG. 1 is a diagram showing an inclination detecting construction according to a first embodiment of this invention.

Reference will now be made in detail to the presently preferred embodiments of the invention as illustrated in the accompanying drawings, in which like reference characters designate like or corresponding parts throughout the several drawings.

First, the outline of a first embodiment is explained. In order to attain the above object, a non-contact type inclination detecting apparatus according to the first embodiment of this invention includes light projection means for projecting light towards an object, light receiving means for receiving reflected lights from at least two points of the object and outputting photoelectric current signals, and operation means for deriving a difference between the reciprocals of the square roots of the photoelectric currents output from the light receiving means and an output of the operation means represents the inclination of the object.

That is, in the non-contact type inclination detecting apparatus according to the first embodiment this invention, light is projected to the object, reflected lights from the two points on the object are received and photoelectric current signals are output. Then, a difference between the reciprocals of the square roots of the output photoelectric currents is calculated and the thus calculated output is used as a signal indicating the inclination of the object.

Now, the first embodiment of this invention will be described in detail with reference the accompanying drawings.

Figures 2A, 2B:
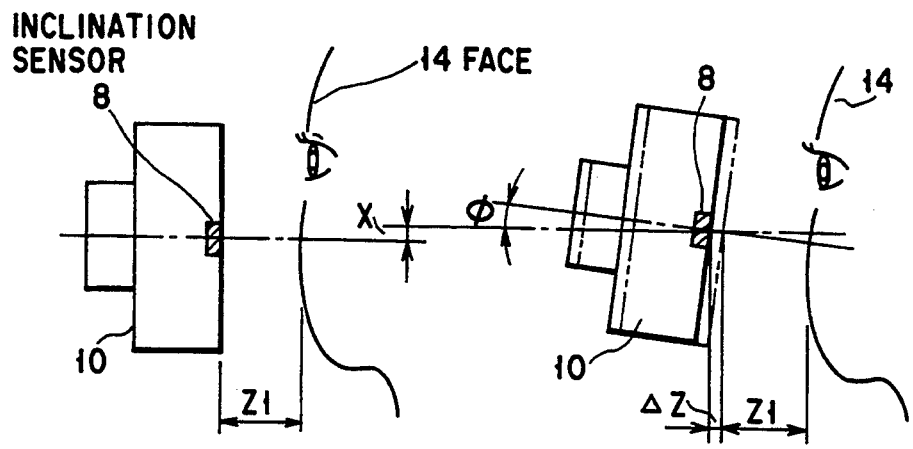
FIGS. 2A and 2B are diagrams for illustrating a method for detecting hand shake of a camera.

First, a method of detecting hand shake by the user of a camera 10 is explained with reference to FIGS. 2A and 2B. Assume that FIG. 2A shows the state at the time of start of the photographing and the face of the user is kept substantially still in the photographing operation. Then, the position of the camera 10 set when hand shake occurs may be indicated by FIG. 2B. That is, the rotation center of the camera 10 is deviated by x and the camera 10 (sensor 8) is inclined by $\phi$ when the hand shake occurs.

When only the above parameters are used, the inclination can be detected by detecting a variation in the distance $Z_1/\cos\phi$ which is obtained based on the distance $Z_1$ between the face 14 and the camera 10 shown in FIG. 2A and an inclination angle $\phi$.

The reason why the inclination angle is detected to attain the object is that the amount of movement of the object by had shake on the film surface can be expressed by the expression (1) and the shake amount may be set to $f\phi$ since $\beta x \ll f\phi$.

$$\beta x + f\phi \quad (1)$$

where $\beta$ is the multiplication of the photographing optical system in the lateral direction, and f is a focal distance of the photographing optical system.

However, in practice, the face 14 and the camera 10 are moved by $\Delta Z$ in the $Z_1$ direction by hand shake.

In general, since, $\Delta Z > (Z_1 - Z_1/\cos\phi)$, the hand shake cannot be detected simply by measuring the distance between the camera 10 and the face 14.

However, since the $\Delta Z$ component gives substantially no influence on the shake, the expression (1) itself is correct. Therefore, if only the inclination $\phi$ can be detected (or $\Delta Z$ can be detected as an amount which gives little influence on the inclination $\phi$) even when the distance between the camera 10 and the face 14 varies, the detected amount can be used as a shake amount.

The above method can be used for general inclination detection. That is, even in a case where the rotation axes of the object 9 and the inclination sensor 8 are aligned with each other as shown in FIG. 3A, or even in a case where the rotation axes of the object 9 and the inclination sensor 8 are deviated from each other as shown in FIG. 3B, a universal inclination sensor can be obtained if only the inclination $\phi$ can be detected even when the distance between the inclination sensor 8 and the object 9 is changed as described above.

Figures 3A, 3B:
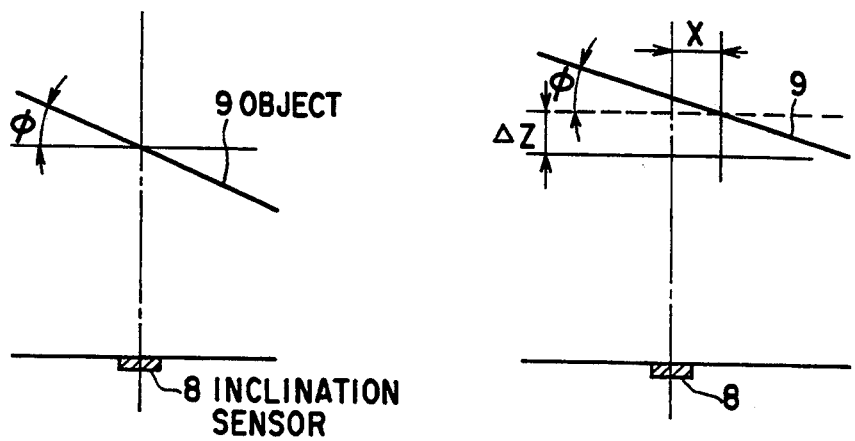
FIGS. 3A and 3B are diagrams showing the positional relation between an object and an inclination sensor.

Even if the construction shown in FIG. 3A is designed, in practice, it may be formed as the construction shown in FIG. 3B because of variation in parts and variations caused in the assembling process.

Further, the inventors of this application found a sensor system for detecting only the inclination as will be described below after various trial-and-errors.

That is, a sensor having two light receiving sections $CL_1$ and $CL_2$ disposed for a single light projecting section L as shown in FIG. 4 is considered and the inclination is detected with the construction shown in FIG. 1.

First, the light emitting section L emits light in response to a light emission command from the driving circuit 1 and reflected light from the object 9 is received by the light receiving sections $CL_1$ and $CL_2$. When photoelectric currents in the light receiving sections $CL_1$ and $CL_2$ are respectively denoted by $i_1$ and $i_2$, then the inclination can be substantially derived by the following expression (1').

$$\frac{1}{\sqrt{i_1}} - \frac{1}{\sqrt{i_2}} \quad (1')$$

Figure 5:
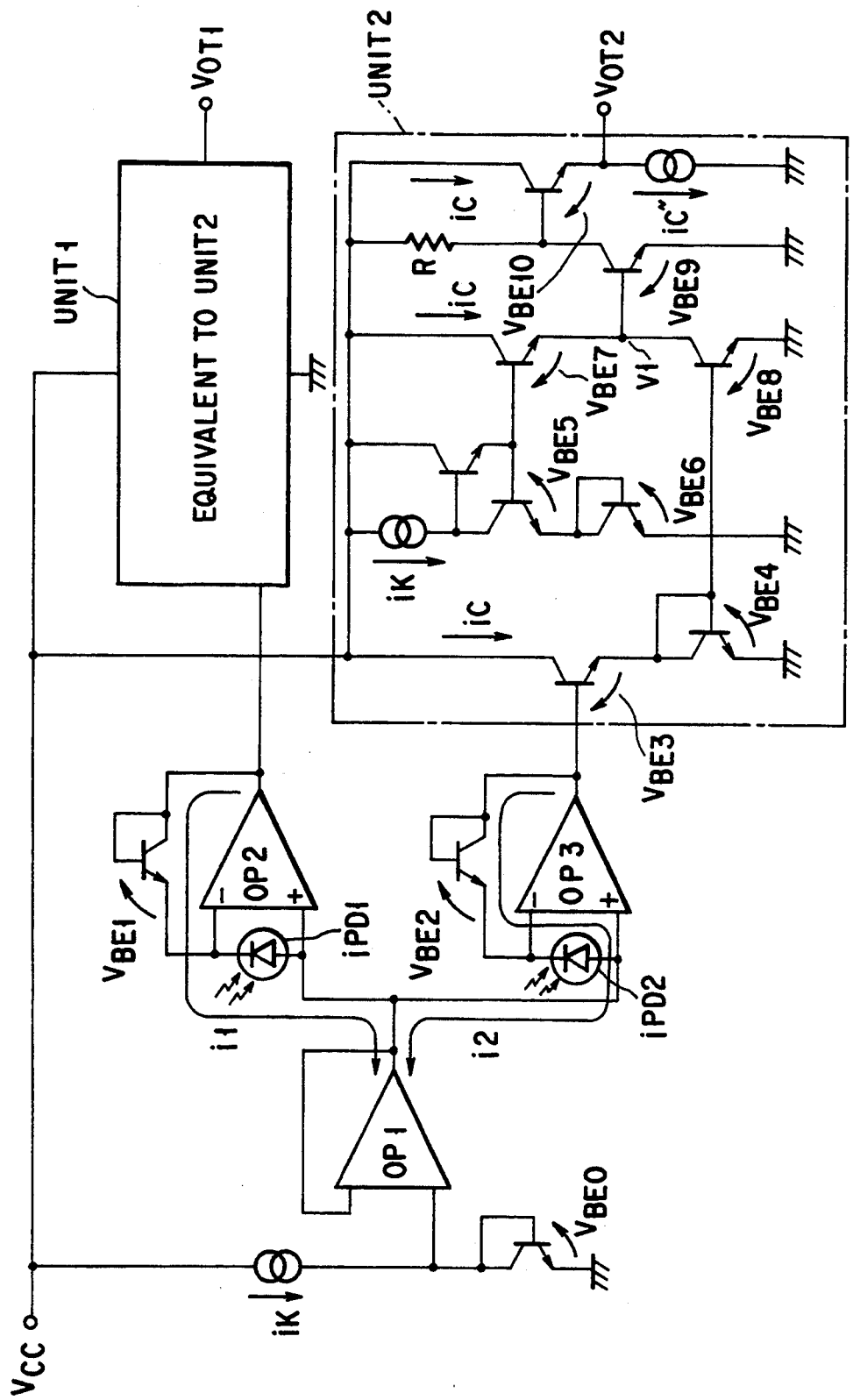
FIG. 5 is a diagram showing the detail construction of an inclination detecting circuit.

FIG. 5 is a diagram showing the detail construction of an actual inclination detecting circuit. An operating circuit in FIG. 5 effects equations described below.

The following equation can be obtained by effecting the equation (1) according to analog operations effected by use of transistor elements. In order to eliminate the root or power (in this example, reciprocal of square root) of the short-circuit currents $i_1$ and $i_2$, they are subjected to the logarithmic compression by use of ik (which is a desired constant current) and $i_1$ and subjected to the extension (inverse logarithmic process) by use of current ic.

$$V_T \ln(ik/is) + V_T \ln(i_1/is) = 2V_T \ln(ic/is)$$

where $V_T = kT/q$ is a thermal voltage and $\underline{is}$ is a reverse saturation current of a transistor.

$$\therefore ik \cdot i_1 = ic^2$$

Next, if current to be derived is $ic'$ and $V_{BE}$ obtained before the extension ($V_1 = V_{BE}$) is expressed by use of ic and ik, the following equation can be obtained.

$$V_1 = 2V_T \ln(ik/is) - V_T \ln(ic/is)$$
$$= V_T \ln(ic'/is)$$
$$ik^2/ic = ic'$$

Therefore, the following equation can be obtained.

$$ic' = \frac{ik^2}{\sqrt{ik} \cdot \sqrt{i_l}} = k1\frac{1}{\sqrt{i_1}}, \text{ where } \left(K_1 = \frac{ik^2}{\sqrt{ik}}\right)$$

Also, $i_2$ can be expressed in the same manner as the above equation. FIG. 5 shows a circuit based on the calculation as described above.

For example, an output $V_{OT2}$ of UNIT2 is derived. Current ic flowing in the current mirror can be expressed as follows.

$$V_T \ln(ik/is) + V_T \ln(i_2/is) = 2V_T \ln(ic/is) \text{ (that is}$$
$$V_{BE0} + V_{BE2} = V_{BE3} + B_{DE4})$$

As a result, the following equation can be obtained.

$$ik \cdot i_2 = ic^2$$

Since $VBE_4 = V_{BE8}$, $V_1$ can be obtained as follows.

$$V_1 = 2V_T \ln(ik/is) - V_T \ln(ic/is)$$
$$= V_T \ln(ic'/is)$$

(that is $V_{BE5} + V_{BE6} - V_{BE7} = V_{BE9}$)

Assuming that $V_1 = V_{BE9}$, $V_1$ can be obtained as follows.

$$V_T \ln(ik^2/ic \cdot is) = V_T \ln(ic'/is)$$

$$\therefore ic' = \frac{ik^2}{ic} = \frac{ik^2}{\sqrt{ik} \cdot \sqrt{i_2}} = K_2 \frac{1}{\sqrt{i_2}}$$

Therefore, $V_{OT2}$ can be obtained by the following equation.

$$V_{OT2} = V_{CC} - R \cdot ic' - V_{BE9} = V_2 - K_{O2} \cdot \frac{1}{\sqrt{i_2}}$$

where $(V_2 = V_{CC} - V_{BE9}, K_{O2} = K_2 \cdot R)$

An inclination output $x'$ can be derived by calculating $(V_{OT2} - V_{OT1})$ and a difference output $V_{OS}$ can be derived as follows.

$$V_{OS} = V_{OT2} - V_{OT1} =$$
$$\left(V_2 - K_{O2} \cdot \frac{1}{\sqrt{i_2}}\right) - \left(V_1 - K_{O1} \cdot \frac{1}{\sqrt{i_1}}\right)$$
$$= K_{On}\left(\frac{1}{\sqrt{i_1}} - \frac{1}{\sqrt{i_2}}\right) \text{where } \begin{array}{l} V_1 = V_2, \\ K_{On} = K_{O1} = K_{O2} \end{array}$$

Thus, the inclination $x'$ can be detected as a variation in $(V_{OT2} - V_{OT1})$ by use of a circuit shown in FIG. 6B, for example.

Currents flowing in light receiving elements iPD1 and iPD2 will be set into the relation of $i_2 > i_1$ or $i_1 < i_2$. The output voltages $V_{OT1}$ and $V_{OT2}$ of UNiT1 and UNiT2 are set into the relation of $V_{OT1} > V_{OT2}$ or $V_{OT1} < V_{OT2}$. Therefore, the direction of deviation and the absolute value of an output of $(V_{OT2} - V_{OT1})$ can be easily determined by changing the output with a reference voltage $V_{ref}$ set at the center (refer to FIG. 6A).

In FIG. 6B, since an output $V_{OS}$ of an operational amplifier OP4 is extremely small ($R_1 = R_2 = R_3 = R_4$), it is amplified to a necessary and sufficient level by an operational amplifier OP5. In this case, ripple components are suppressed by connecting a filter capacitor $C_L$ in parallel with a feedback resistor $R_5$.

Figure 7:
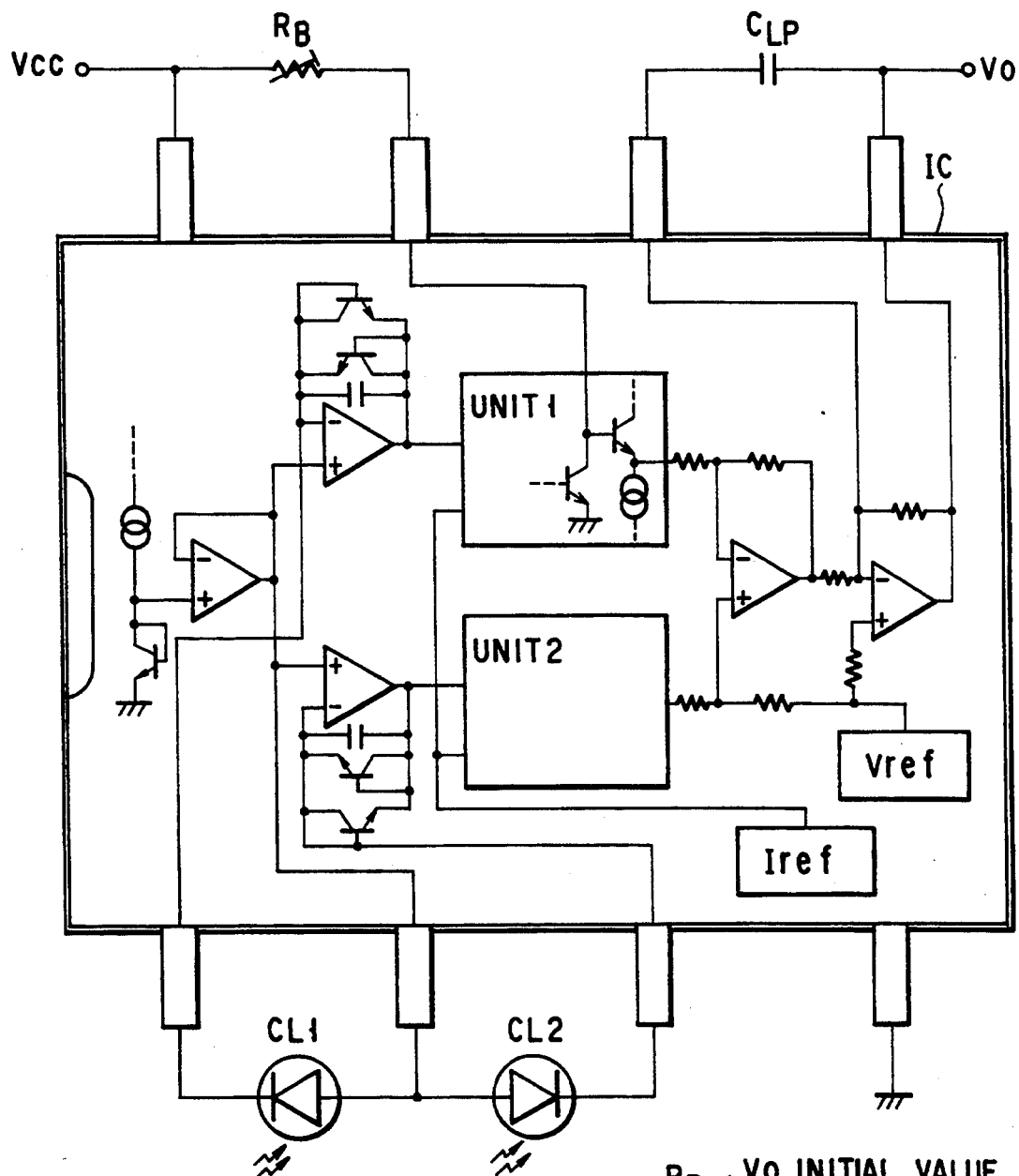
FIG. 7 is a diagram showing the function blocks which are at least required to form the circuits of FIGS. 5 and 6A in an IC form.

FIG. 7 shows a function block which is at least required to form the circuits of FIGS. 5 and 6B in an integrated circuit (IC) form. In FIG. 7, a constant current source ($i_{ref}$) and a constant voltage source ($V_{ref}$) for generating a constant current (ik, ic'') of FIG. 5 and a constant voltage ($V_{ref}$) of FIG. 6B are additionally provided.

Figure 9A:
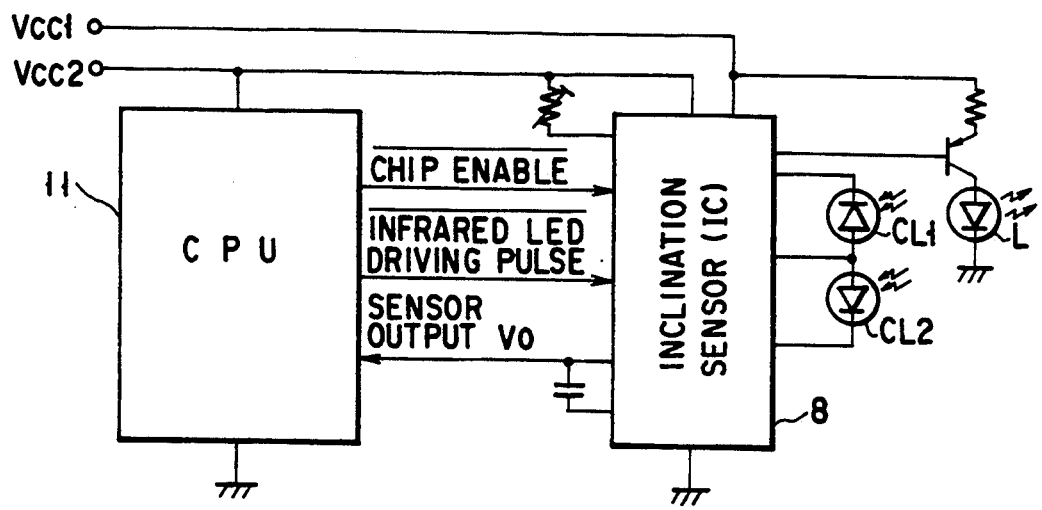
FIGS. 9A and 9B are diagrams showing the state in which the IC of FIG. 8 is connected to a CPU.
Figure 9B:
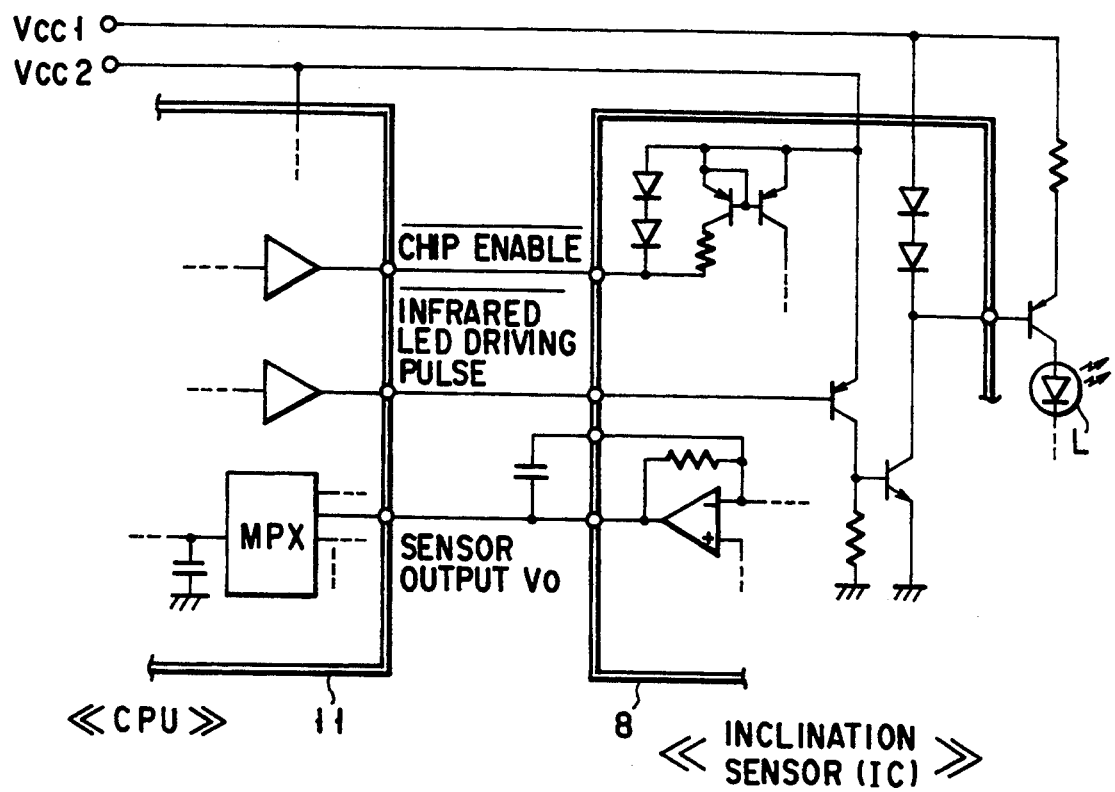

FIG. 8 shows a function block of an IC having a function of a driving circuit of the light emitting section (infrared LED) in addition to the function of FIG. 7. In FIG. 8, a chip enable terminal ($\overline{FUCE}$) is additionally provided by taking an interface with a CPU and the like into consideration. The state of the IC of FIG. 8 connected to the CPU 11 is shown in FIGS. 9A and 9B. The inclination sensor (IC) 8 drives the infrared LED (L) to emit infrared rays in response to an infrared driving pulse from the CPU 11, causes the photodiodes (CL1, CL2) to receive reflected light from the reflection surface, and outputs a sensor output Vo to the CPU 11 after effecting a preset operation process.

Figure 10:
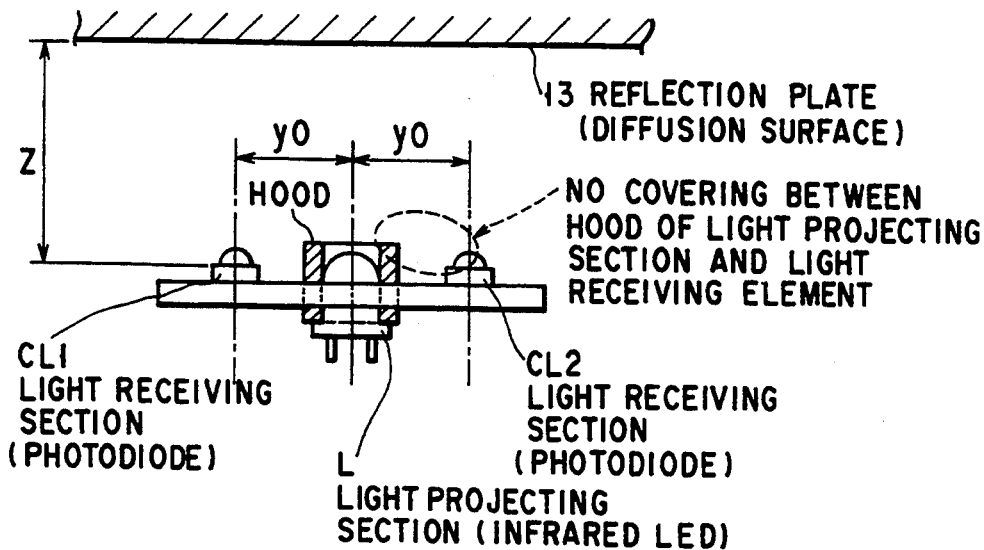
FIG. 10 is a diagram showing the construction of an inclination detecting sensor.
Figure 11:
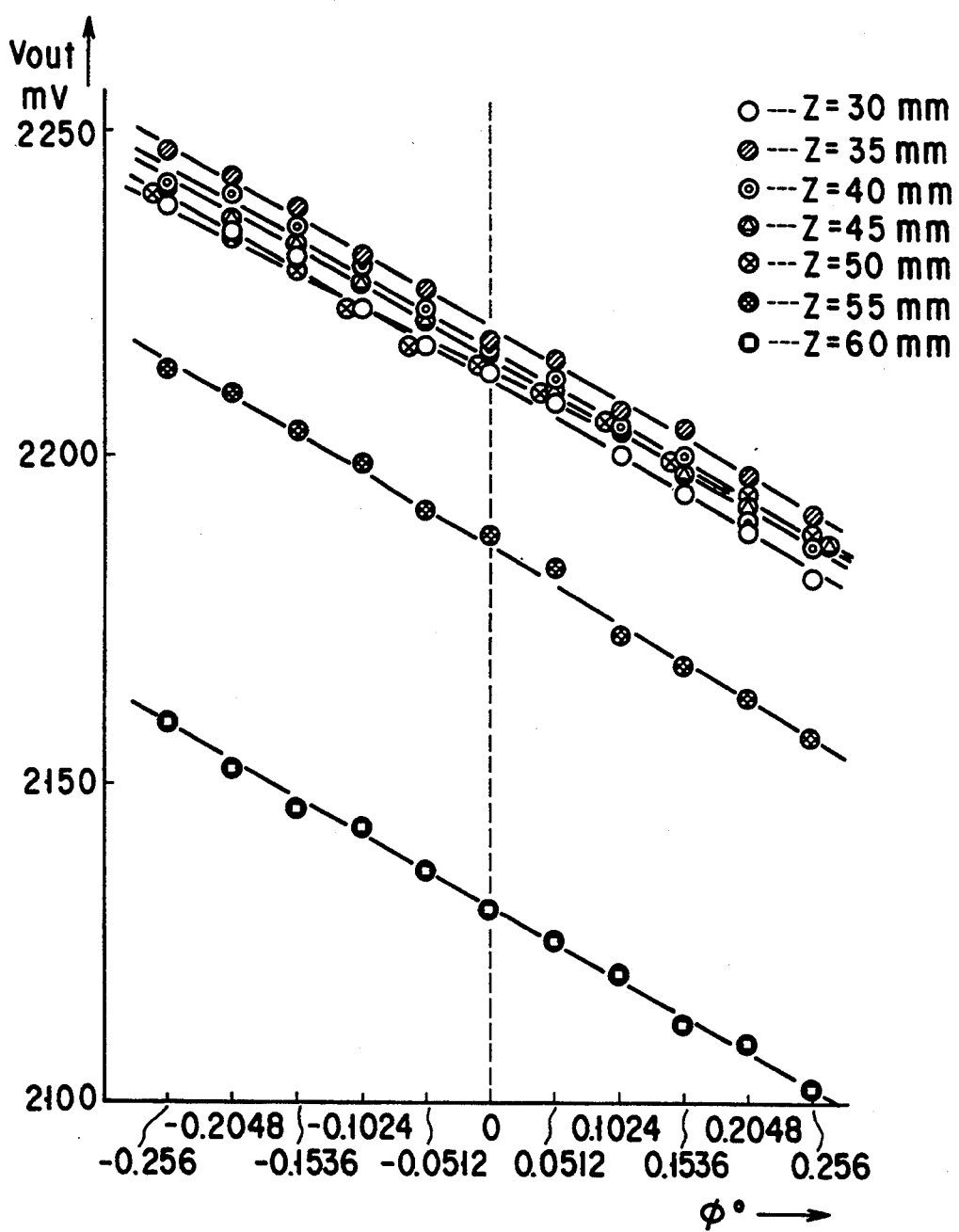
FIG. 11 is a diagram showing the $\phi$-$V_{OUT}$ characteristic indicating the relation between an inclination detecting circuit output $V_{OUT}$ and an inclination angle $\phi$ which are measured by use of the shake detection circuit of FIGS. 5 and 6A and the inclination detecting sensor of FIG. 10.

FIG. 10 is a diagram showing the construction of the inclination sensor 8 and FIG. 11 shows the $\phi$-$V_{OUT}$ characteristic showing the relation between an inclination angle $\phi$ and an inclination detecting circuit output $V_{OUT}$ which are respectively measured by use of the inclination sensor 8 ($y_0 = 13$ mm) of FIG. 10 and the shake detecting circuit of FIGS. 5 and 6B. The output $V_{OUT}$ for the inclination angle $\phi = \pm 0.256°$ varies by approx. 60 mV. Further, the output for the inclination angle 1° exhibits a variation of 234 mV/deg.

As is understood from FIG. 11, in a range from 30 to 50 mm of the distance Z between the inclination sensor 8 and the reflection plate 13, the values of $V_{OUT}$ take nearly equal values for the same inclination angle $\phi$ and vary at substantially the same rate ($V_{OUT}$/deg) with respect to the angle $\phi$ irrespective of the values of the distance Z. Therefore, if a range in which influence by a variation in the distance Z can be cancelled is set as an effective range, the inclination can be detected.

In practice, if the dynamic range of $V_{OUT}$ is set to $0 \leq V_{OUT} \leq 5.0$ V, the inclination angle up to $\phi = \pm 10.7°$ (assuming that $V_{OUT} = 2.5$ V and $\phi = \pm 0°$) can be detected.

When it is used for detecting the shake of a camera and if it is required to detect a permissible diffusion circle of 0.1 mm on the film surface with f=100 mm, it is only required to detect the shake with precision of less than 0.057° which can be derived from $\tan^{-1}(0.1/100) = 0.057$.

As is understood from FIG. 11, the inclination of 0.057° can be detected.

Data shown in FIG. 11 is obtained when a lens is disposed in front of the light projecting section L to reduce the diameter of a projection spot.

FIG. 12 is a diagram showing the $\phi$-$V_{OUT}$ characteristic obtained when no lens is disposed in front of the light projecting section L and the light projection angle is set to approx. $\pm 15°$.

In FIG. 12, data of wider angle range can be obtained. It is understood that since the deflection angle is large, the inclinations vary by small amounts according to a variation in the distance Z by variations in the light projecting angle, variations in the light receiving sensitivities of the light receiving sections $CL_1$, $CL_2$ and the like, but the inclinations are stable in the range of $Z > 60$. Unlike the case of FIG. 11, in the case of FIG. 12, the characteristics which constitute a group for a particular range of Z are not provided, but $V_{OUT}$ is more sensitive to a variation in the angle than to a variation in the distance so that satisfactory inclination detection can be effected.

Further, in the case of FIG. 12, a detection range in which Z can be neglected can be provided by increasing the current caused by the projection light or by disposing a light projecting lens like the case of FIG. 11 to equivalently increase the current by the projection light.

As shown in FIG. 12, detection of wide angle range can be effected in this embodiment.

In a case where the $\phi$-$V_{OUT}$ characteristic is made based on a difference ($i_1 - i_2$) between the currents $i_1$, $i_2$ caused in the light receiving sections $CL_1$, $CL_2$, the inclination of the characteristic curve varies according to the distance Z although not shown in the drawing, and therefore, it is necessary to effect the distance detection or use the same only for the constant distance.

Next, a case wherein the correlation with hand shake derived by using the inclination sensor 8 (which is hereinafter referred to as a shake sensor) of FIG. 10 is explained below.

Figure 13A:
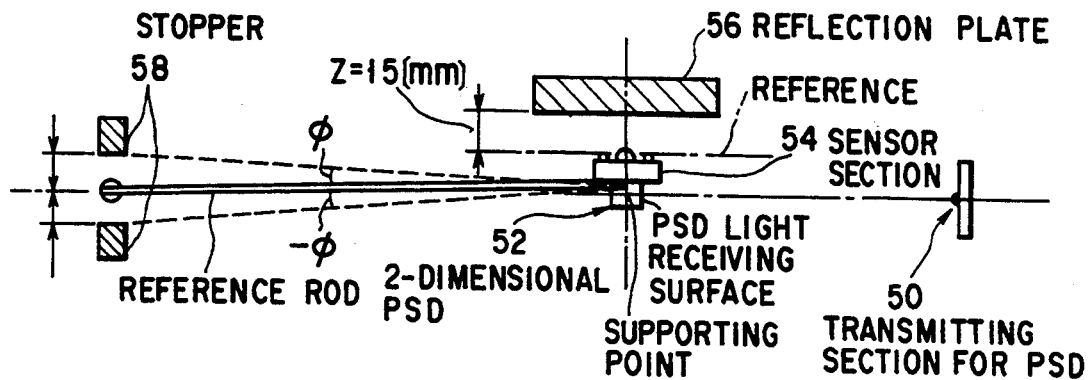
FIGS. 13A and 13B are diagrams showing the constructions of a PSD transmitting section, 2-dimensional PSD and a surrounding portion thereof.
Figure 13B:
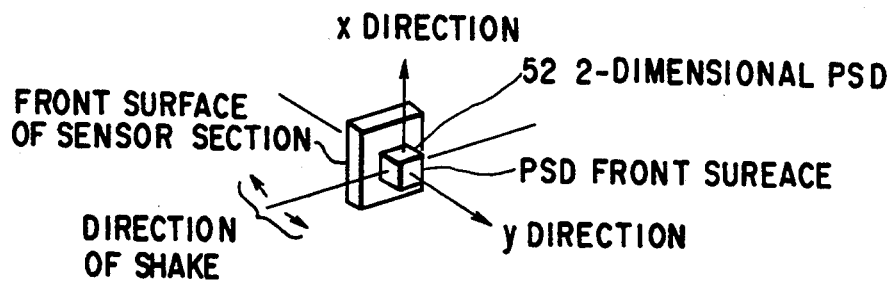

A hand shake signal is detected by causing a 2-dimensional PSD 52 to receive light from the LED of a transmitting section 50 for photosensitive device (PSD) as shown in FIGS. 13A and 13B.

A signal equivalent to the shake can be detected since a locus of one point (the LED of the transmitting section 50 for PSD) is traced on the 2-dimensional plane.

The shake sensor (sensor section 54) is rotated together with the 2-dimensional PSD 52 to detect an inclination with respect to a reflection plate 56 shown in FIG. 13A. The hand shake is caused by shaking the front end of a reference rod.

In this embodiment, the deflection or shake corresponding to $\phi = \pm 0.256°$ is adjusted by use of a stopper 58.

Figure 14A:
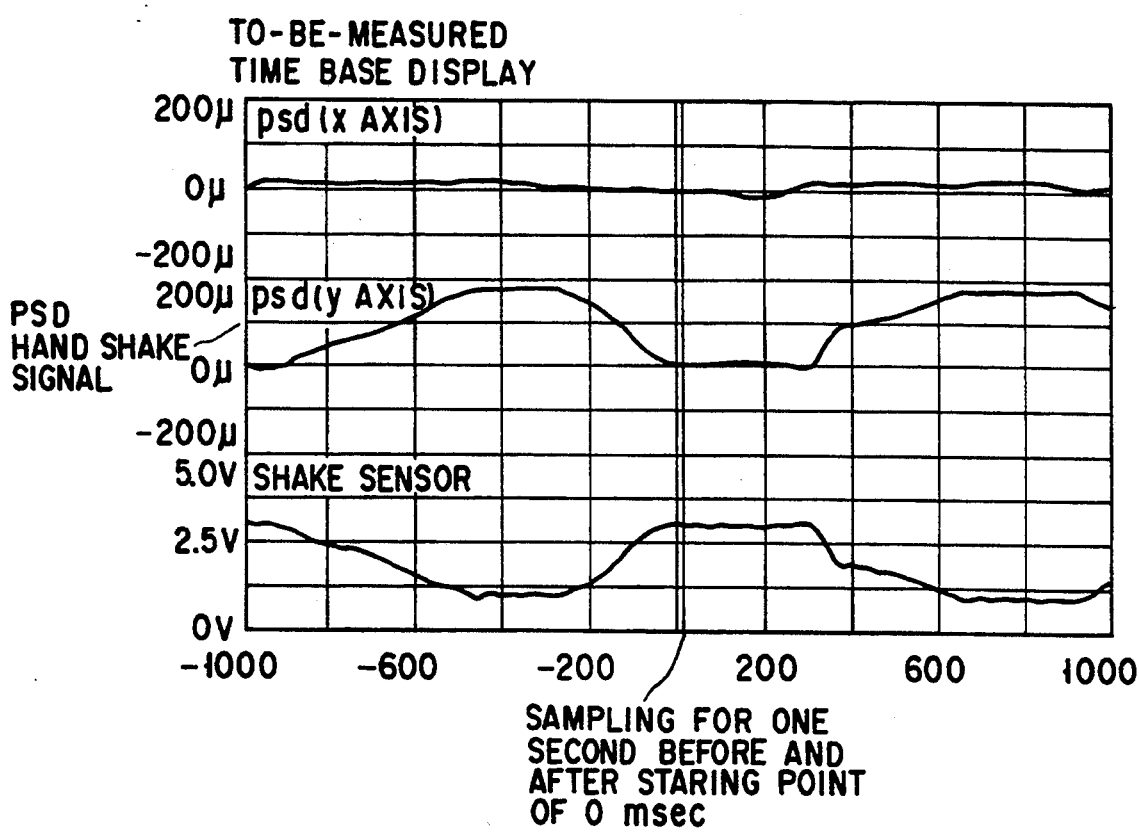
FIGS. 14A and 14B are diagrams showing the correlation between the shake sensor and the y axis of a hand shake signal when the reflection surface is flat.
Figure 14B:
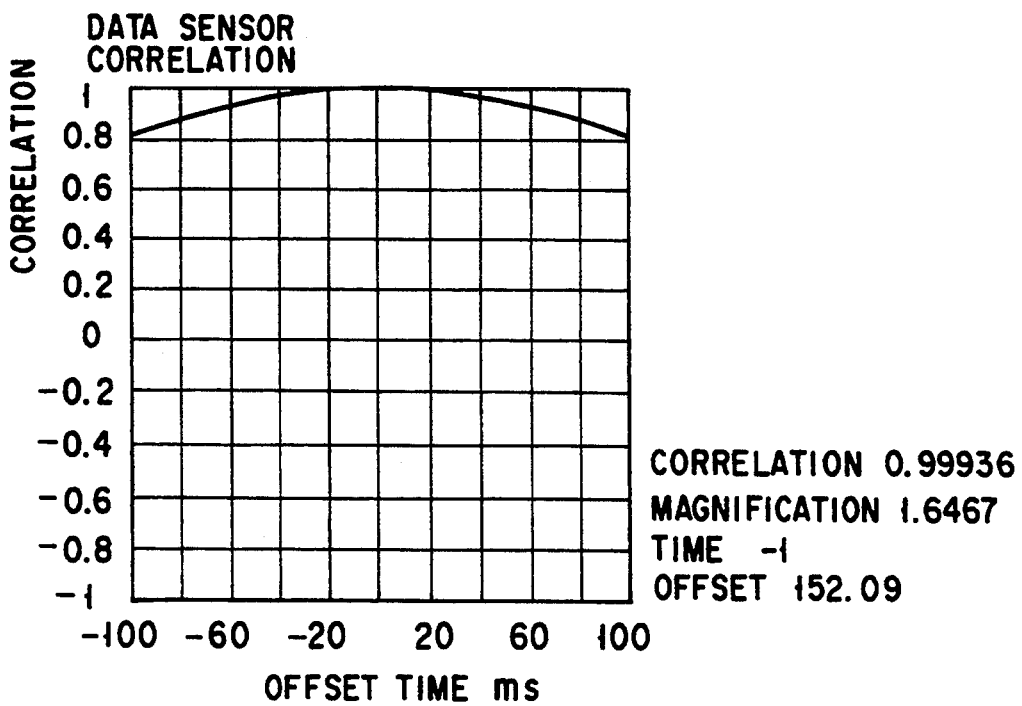

FIGS. 14A and 14B are diagrams showing the correlation between the shake sensor and the y axis of a hand shake signal (PSD) when the reflection surface of the reflection plate 56 is flat (the y axis direction of the PSD is aligned with the axes of the shake sensors $CL_1$-L-$CL_2$). An output of the shake sensor is set in the inverted relation with the hand shake signal but the extremely close correlation can be obtained between them. The abscissa of the correlation diagram indicates offset values obtained when the signal of the shake sensor is advanced or delayed on the time base and it is understood that there occurs no time delay of the shake sensor.

Next, the result of correlation between the hand shake signal and the shake sensor is explained while assuming a case wherein the user actually takes a picture by use of the camera.

Figure 15A:
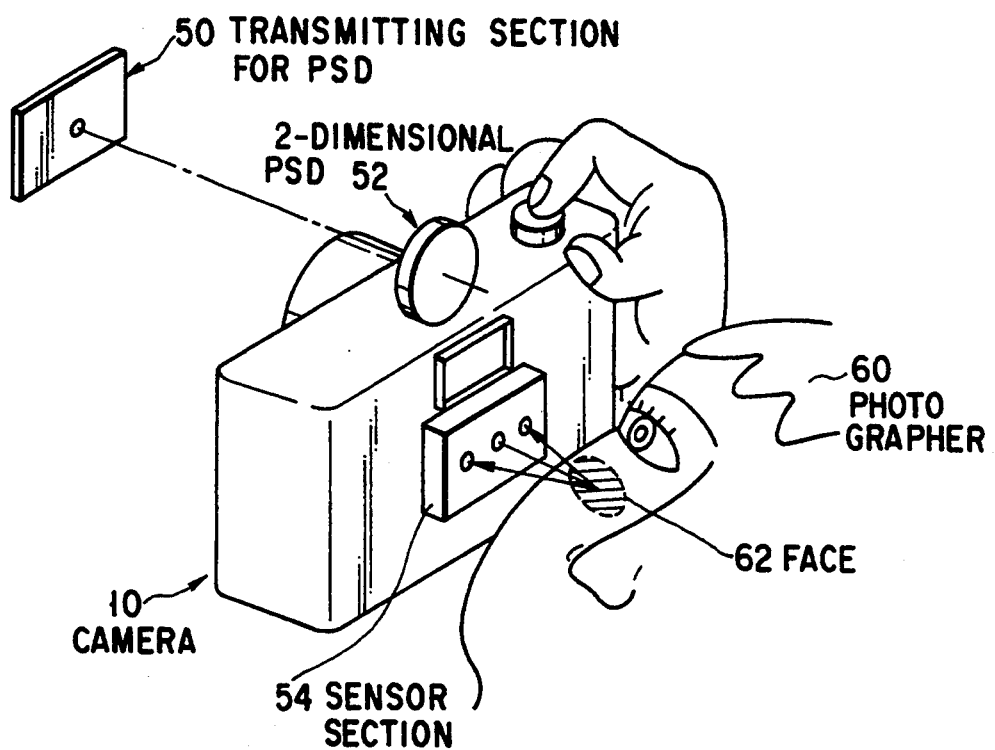
FIGS. 15A, 15B and 15C are diagrams showing examples of experiments for deriving the correlation between the shake sensor and the y axis of a hand shake signal.
Figures 15B, 15C:
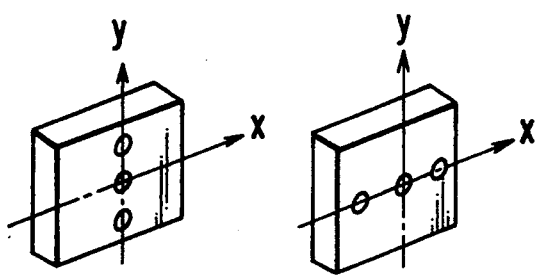

FIGS. 15A, 15B and 15C show examples of experiments for deriving the correlation. As shown in FIG. 15A, the 2-dimensional PSD 52 is disposed on the front surface of the camera 10 to receive a light signal projected from the LED of the transmitting section 50 for PSD and the received signal is processed as a hand shake signal. The shake sensor (sensor section 54) is disposed on the rear side of the camera 10 to detect a variation in an inclination angle with the face 62 of the photographer 60. The result of detection is as follows.

Figure 16A:
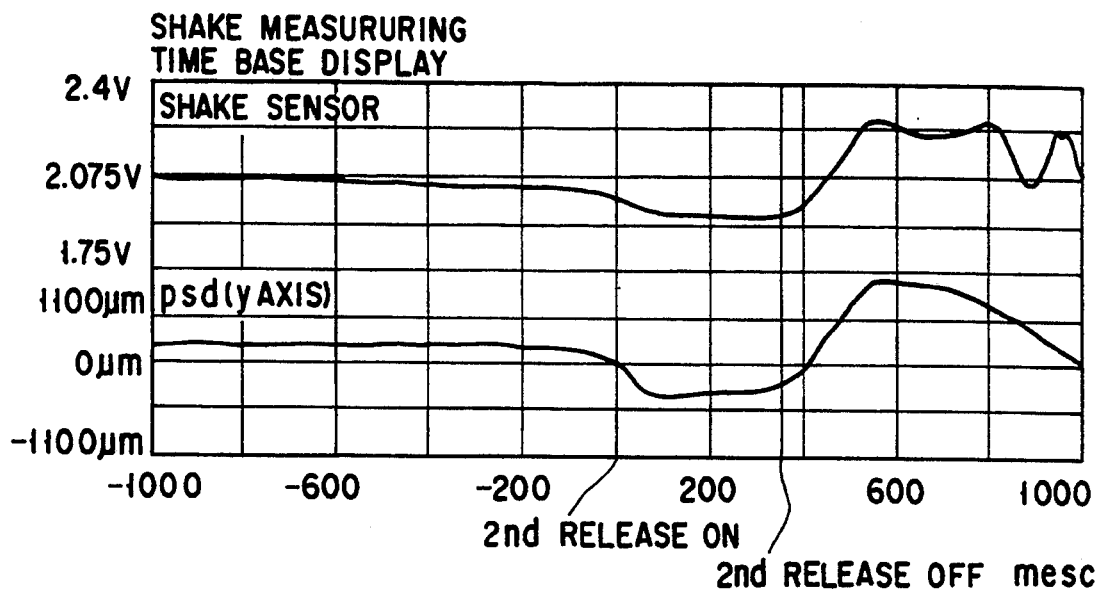
FIGS. 16A and 16B are diagrams showing the correlation between a PSD hand shake signal and the y-axis direction output (variation in the displacement in the y-axis direction) of the shake sensor.
Figure 16B:
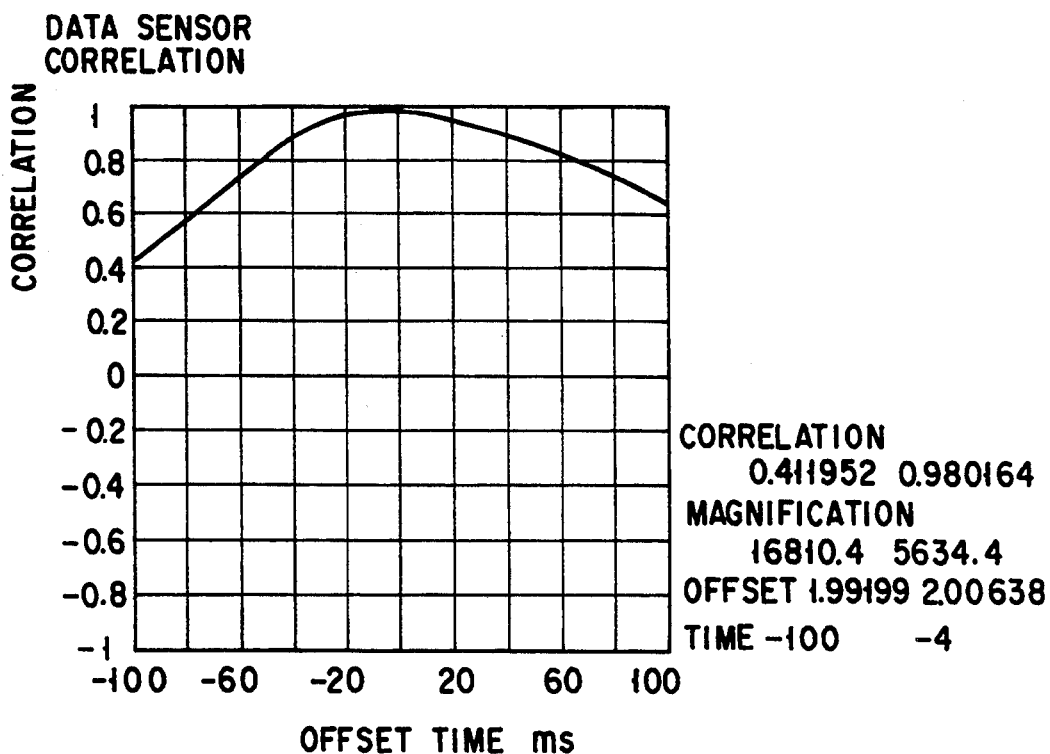
Figure 18A:
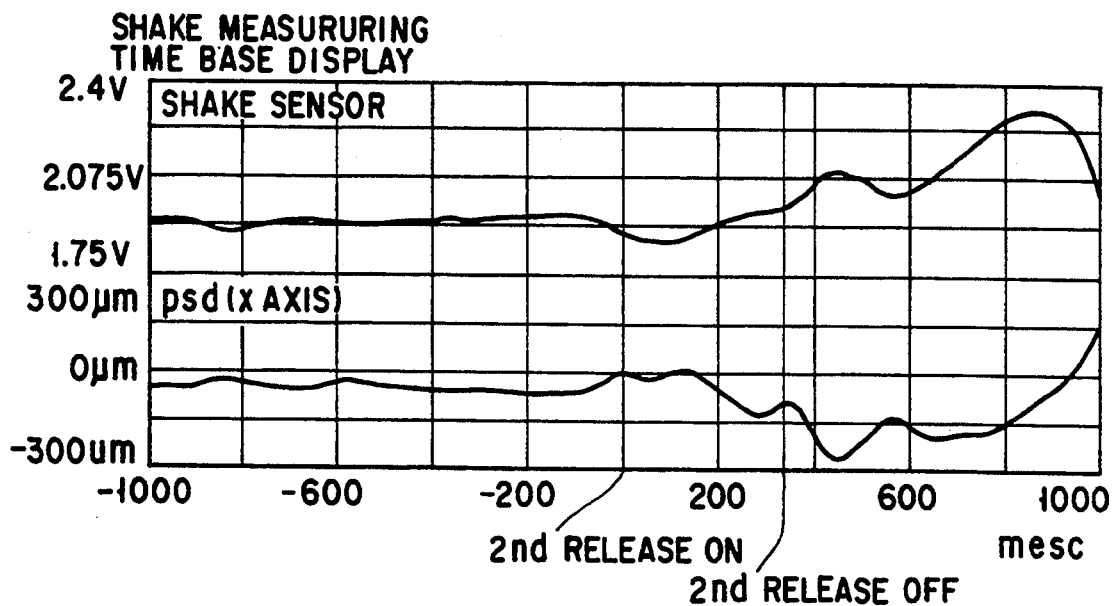
FIGS. 18A and 18B are diagrams showing the correlation between a PSD hand shake signal and a variation in the displacement in the x-axis direction of the shake sensor.
Figure 18B:
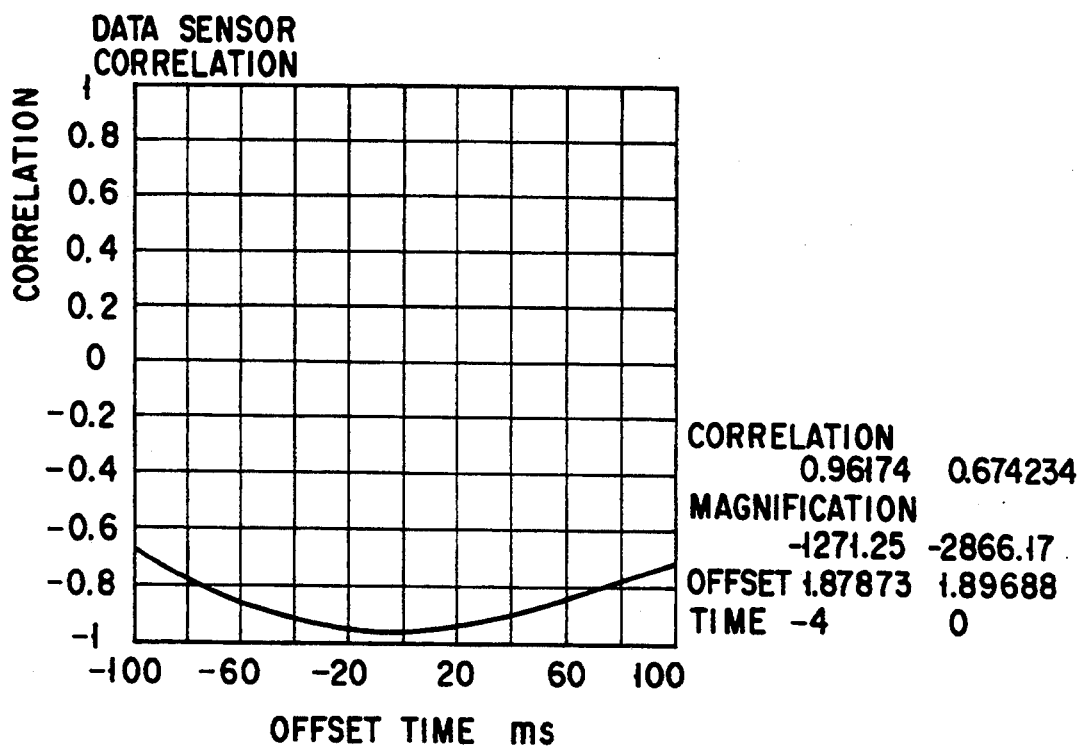
Figure 19A:
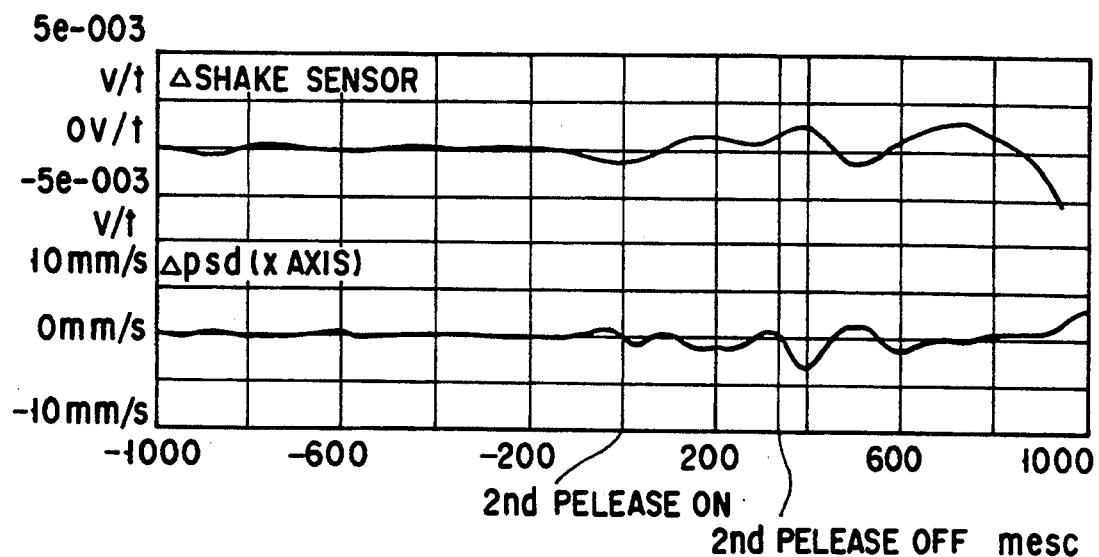
FIGS. 19A and 19B are diagrams showing the correlation between a PSD hand shake signal and a variation in the speed in the y-axis direction of the shake sensor.
Figure 19B:
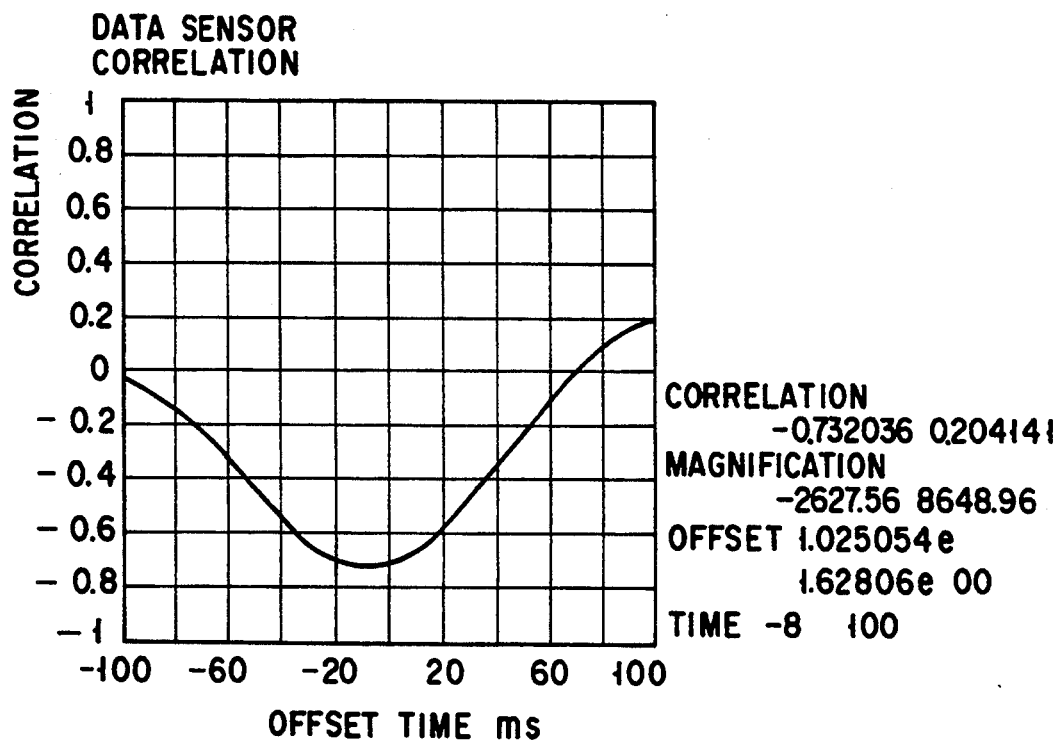

That is, FIGS. 16A and 16B show the correlation between the PSD hand shake signal and the y-axis direction output (variation in the displacement in the y-axis direction) of the shake sensor, FIGS. 17A and 17B show the correlation between the PSD hand shake signal and a differential (variation in the speed in the y-axis direction) of the y-axis direction output of the shake sensor, FIGS. 18A and 18B show the correlation between the PSD hand shake signal and a variation in the displacement in the x-axis direction of the shake sensor, and FIGS. 19A and 19B show the correlation between the PSD hand shake signal and a variation in the speed in the y-axis direction of the shake sensor.

The correlation is derived by use of data in the range of $-200$ and $+600$ ms and 2nd release ON/OFF timings are indicated for reference.

In each of the above cases, extremely close correlation can be obtained between the shake sensor and the PSD hand shake signal. This means that the inclination detecting sensor of this embodiment can be used as a shake sensor.

Next, another embodiment of the inclination sensor is explained. It is preferable to use infrared rays as the projecting and receiving lights of the inclination sensor, but when the environment is bright, noise light (stationary light) other than the reflection light of the projected light is also received by the light receiving sensor, thereby lowering the reliability of detected data. Therefore, an inclination sensor detecting circuit which can be used in such a condition is described below.

Figure 20:
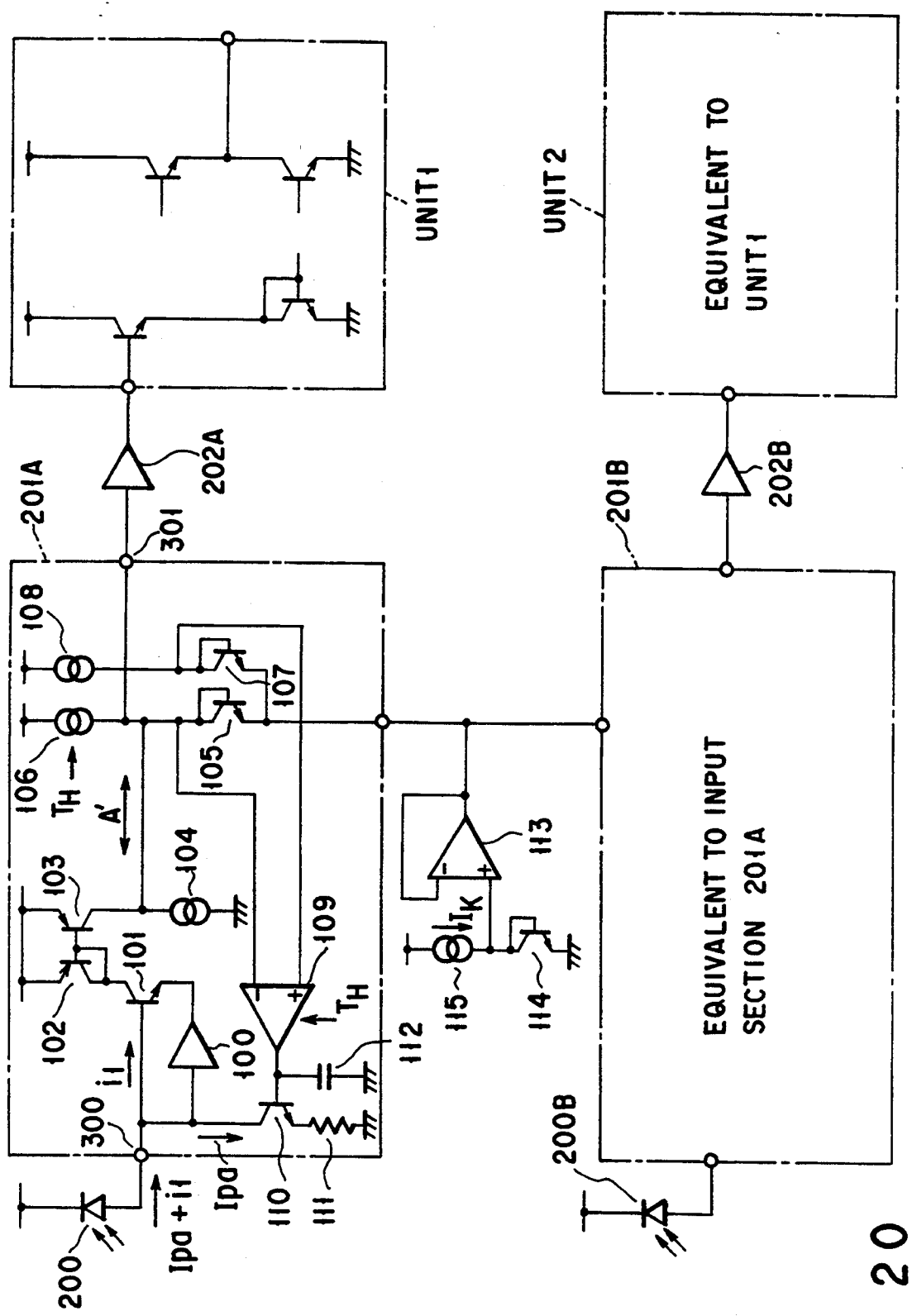
FIG. 20 is a diagram showing the circuit construction of a detection circuit having a stationary light eliminating function.

FIG. 20 is a diagram showing the circuit construction of a detection circuit having a stationary light eliminating function. Input sections 201A, 201B corresponding to silicon photodiodes (SPDs) 200, 200B have exactly the same construction and only the input section 201A is explained.

An output current $i_1$ from the SPD 200 is supplied to a pre-amplifier 100, amplifying transistor 101 via an input terminal 300 and amplified. The base of the amplifying transistor 101 is connected to the input of the pre-amplifier 100, the emitter thereof is connected to the output of the pre-amplifier 100, and the collector thereof is connected to the input of a current mirror circuit constructed by PNP transistors 102 and 103. The collector of the PNP transistor 103 which is an output of the current mirror circuit is connected to current sources 104,106, the anode of a compression diode 105, and the inverting input terminal of a hold amplifier 109, and to a buffer 202 via an output terminal 301 of the input section 201. The cathode of the compression diode 105 is connected to the cathode of a diode 107 and the output of a voltage follower 113 and the non-inverting input terminal of the voltage follower 113 is connected to a current source 115 and a diode 114.

An output of the voltage follower 113 is supplied to the input section 201B. The anode of the diode 107 is connected to a current source 108 and the non-inverting input terminal of the hold amplifier 109. The output of the hold amplifier 109 is connected to a hold transistor 110, hold resistor 111 and hold capacitor 112 as shown in FIG. 20.

Next, the operation of the input section 201A is explained below.

An output current $i_1$ from the SPD 200 is supplied to the pre-amplifier 100, amplifying transistor 101 via the input terminal 300 and amplified, but at this time, a stationary light current $I_{pa}$ caused by a stationary background light in the SPD 200 is also input. The operation of eliminating the stationary light current $I_{pa}$ is explained.

In this case, it is assumed that the compression diode 105, diode 107 and diode 114 have the same characteristic and the current values of the current sources 106 and 108 are set to the same value. First, the stationary light eliminating operation is effected prior to the light projection of the IRED and the reflection light detection. The hold amplifier 109 determines an output voltage thereof to set the anode potential of the compression diode 105 and the anode potential of the diode 107, that is, the input voltages to the inverting input terminal and non-inverting input terminal of the hold amplifier 109 equal to each other. When the stationary light current $I_{pa}$ is amplified by the pre-amplifier 100, amplifying transistor 101, the current flows into the compression diode 105 via the current mirror circuit constructed by the PNP transistors 102, 103 to raise the cathode potential of the compression diode 105. Then, the potential of the inverting input terminal of the hold amplifier 109 is also raised so that the output voltage of the hold amplifier 109, that is, the base potential of the hold transistor 110 will rise and the stationary light current $I_{pa}$ will flow as a collector current into the ground via the hold resistor 41A.

The stationary light current $I_{pa}$ is eliminated by the above feedback operation to flow into the ground and will not be amplified. An output voltage of the hold amplifier 109 corresponding to the level of the stationary light current $I_{pa}$ is stored in the hold capacitor 112. A bias current of the amplifying transistor 101 is given by the current source 104 and the state in which no current flows via a point A' in FIG. 20 is kept by the above-described stationary light eliminating operation.

Next, the operation effected at the time of IRED light emission and reflection light detection is explained.

The hold amplifier 109 interrupts the function thereof and the current source 106 is set into the OFF state by a hold off signal $T_H$ at the same time of light emission of the IRED. In this case, since the stationary light eliminating charge is stored in the hold capacitor 112 as described before, a signal current $i_1$ of the SPD caused by the reflection light is amplified by the pre-amplifier 100 and amplifying transistor 101 while the stationary light current $I_{pa}$ is being eliminated, and the signal current flows into the compression diode 105 via the current mirror circuit constructed by the PNP transistors 102, 103 and the point A' in FIG. 20.

Therefore, the anode potential of the compression diode 105, that is, the output voltage $V_0$ of the output terminal 301 of the input section 201 can be expressed by the following equation.

$$V_O = V_{Tln}\left(\frac{K \cdot i_1}{I_S}\right) + V_{Tln}\left(\frac{I_K}{I_S}\right)$$
$$= V_{Tln}\left(\frac{K \cdot i_1 \cdot I_K}{I_S^2}\right)$$

where $V_T(=KT/q)$ is a thermal voltage, $I_S$ is a reverse saturation current, $I_K$ is a current value of the current source 115, and K is an amplification factor of the amplifying transistor 101.

The output 301 of the input section 201 is input to UNiT$_1$ via the buffer 202A (refer to FIG. 5). A circuit provided at the succeeding stage of the UNIT$_1$ is the same as that shown in FIGS. 5 and 6, and therefore, the explanation therefor is omitted.

A case wherein the stationary light is cut off has been explained.

As another method of cutting off the stationary light, it is considered to significantly increase an amount of light from the light projecting section in comparison with the stationary light amount. However, in general, since current which is permitted to flow in the light projecting LED in the steady state is limited, the amount of light from the light projecting section can be increased by projecting light in a pulse form at the time of shake detection. The technique is not described here, but it is generally known as a method for increasing the amount of light for active auto focusing (AF).

FIG. 21 is a block diagram showing a TTL single-lens reflex camera in which a non-contact type inclination detecting apparatus according to one embodiment of this invention is incorporated.

A main CPU 901 effects the sequential control based on a program stored in a ROM provided therein so as to control the operations of the peripheral ICs and the like.

An AFIC 907 is a distance measuring IC based on the general phase difference detection and is designed to measure the distance to the object and transfer the measured distance-to-object information to the main CPU 901.

An EEPROM 913 is a nonvolatile memory element and adjustment data used for correcting, at the time of production, errors caused by a variation in the above distance information and a functional variation in the lens position occurring when distance measurement data is converted into lens position data is stored in the EEPROM 913.

In an IFIC 911, the luminance of the object is measured and the operation of a driver 927 is controlled. A light receiving element 912 measures the average luminance of the object or the luminance of the spot portion of the object and supplies the result of light measurement to the IFIC 911.

The driver 927 drives DC motors, stepping motor, magnets and the like. A DC motor 915 is used for driving a photographing lens, a DC motor 917 is used for zooming, and a DC motor 919 is used for charging the first and second blinds of the focal-plane shutter, driving the mirror and feeding the film. A stepping motor 921 drives the diaphragm and magnets 923, 925 are used to hold the first and second blinds of the focal-plane shutter, respectively.

A BIC 909 is a shake detecting IC and infrared rays emitted from an LED 929 are reflected on the face of a photographer and received by two pairs of light receiving elements 931, and the light reception result is supplied to the main CPU 901 via the BIC 909.

FIG. 22 is a flowchart for illustrating the release operation of a camera in which a non-contact type inclination detecting apparatus according to one embodiment of this invention is incorporated.

First, when a first release switch R1SW is depressed, the photographing lens is driven to a focused position derived from the distance measurement information in the LDRIV sub-routine (step S20). Next, whether a second release R2SW 905 is set in the ON state or not is checked (step S21), and if the second release R2SW is set in the ON state, the mirror is moved upwardly in the MUDRIV subroutine (step S22) and the diaphragm is set to a preset diaphragm position in the AVCDRIV subroutine (step S23). At this time, the shake of the camera is detected in the shake detecting sub-routine BSEN (step S24), and when the shake is suppressed, the SDRIV sub-routine (step S25) is effected to drive the focal-plane shutter and expose the film to light. Then, the diaphragm is set in the original position (open position) in the AVODRIV sub-routine (S26), the mirror is moved downwardly in the MDDRIV sub-routine (step S27) and the film is fed by one frame in the WIND sub-routine (step S28).

The shake detecting sub-routine BSEN (step S24) is explained in detail with reference to the flowchart of FIG. 23. First, the LED 929 is set into the ON state (step S30) and the timer is started (step S31). Next, the condition of the limiter is checked (step S32), and if the amount of shake is not suppressed after a preset time has elapsed, a warning flag is set and the LED 929 is de-activated (step S35), and then, the sub-routine is completed. Further, when the shake is suppressed to be less than a preset value in the limiter (step S34), the LED 929 is de-activated and the sub-routine is completed.

FIG. 24 shows a sub-routine of shake amount detection in FIG. 23.

First, an output from the BIC 909 is subjected to the A/D conversion to derive ADD (step S41). Then, INITFG is checked (step S42). INITFG is a flag which is initialized to "0" in the initial period of the main routine (not shown) and set when the sub-routine "detection of shake amount" is effected one time. At the first operation time, INITFG is set (step S46). At the second or succeeding operation time, whether a difference between an A/D conversion value ADOD derived at the preceding operation time and an A/D conversion value ADDT derived at this operation time is less than a preset value ADTH or not is checked (step S43). If the difference is less than or equal to the preset value, a flag OKFG indicating that the shake amount is a permissible amount is set (step S45), and then, this subroutine is completed. On the other hand, if the difference is larger than the preset value, the A/D conversion value ADDT derived at this operation time is stored (step S44), and then, this sub-routine is completed.

As described above, the shutter can be driven when the shake amount becomes minimum.

Further, it is possible to drive the shutter at timing which is determined based on the shake sensor output so that the shake amount will become minimum.

This technique is disclosed in detail in U.S. patent application Ser. No. 951,307 and therefore the detail explanation therefor is omitted here.

Next, the operation of mounting the shake sensor on the camera is explained.

Figure 25:
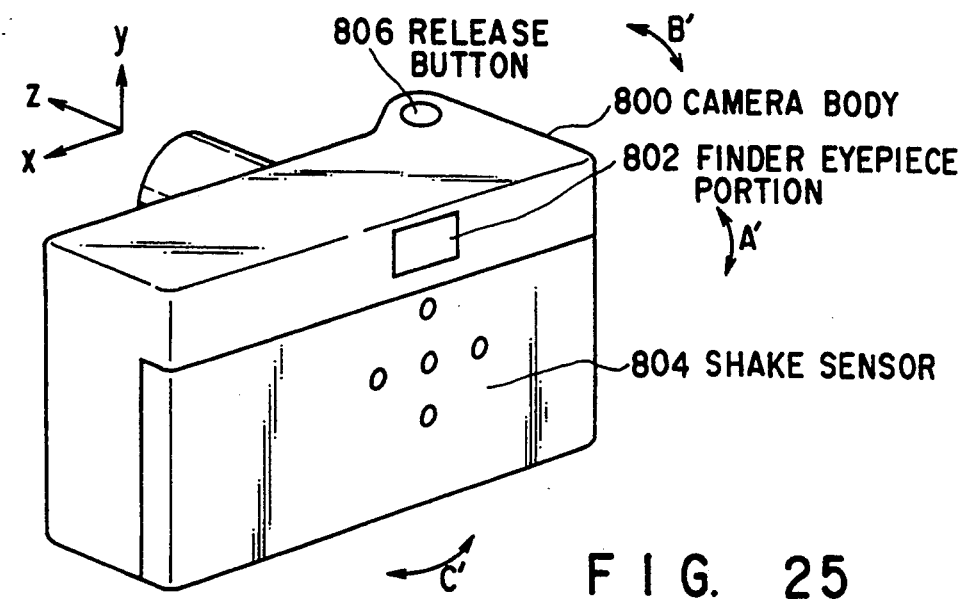
FIG. 25 is a perspective view of a camera having a shake sensor.

FIG. 25 is a perspective view of a camera having a shake sensor. In FIG. 25, 800 denotes a camera body, 802 denotes a finder eyepiece, 804 denotes a shake sensor, 806 denotes a release button and 810 denotes a photographing lens. Arrows x, y and z are imaginary axes of the camera and represent rotation axes used for indicating the direction of the shake. That is, the shake A' around the x axis indicates the shake in the rotation direction, and the shakes around the y and z axes indicate the shakes in the rotation directions of B' and C'.

Figure 26A:
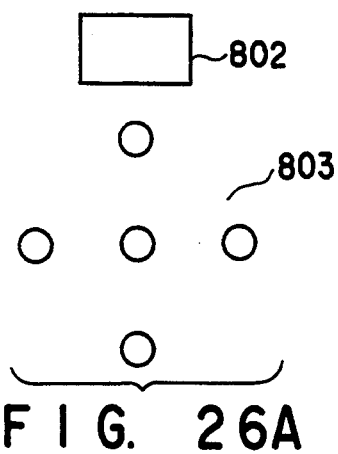
FIGS. 26A and 26B are diagrams showing the arrangements of a shake sensor used when shakes around the axes in two directions of x and y are detected.
Figure 26B:
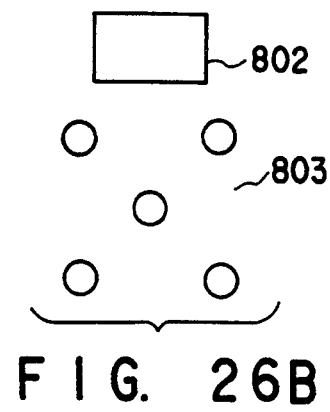

FIGS. 26A and 26B are diagrams showing the arrangements of the shake sensor used when shakes around the axes in two directions of x and y are detected.

Figure 27A:
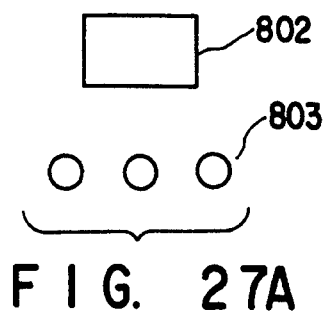
FIGS. 27A, 27B and 27C are diagrams showing the arrangements of a shake sensor used when shake around the axis in one direction of x, y or oblique direction is detected.
Figure 27B:
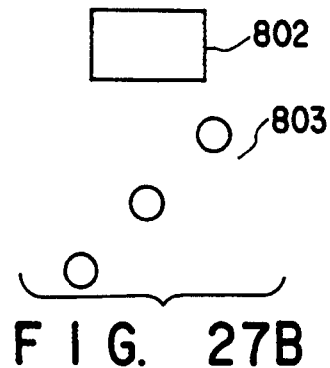
Figure 27C:
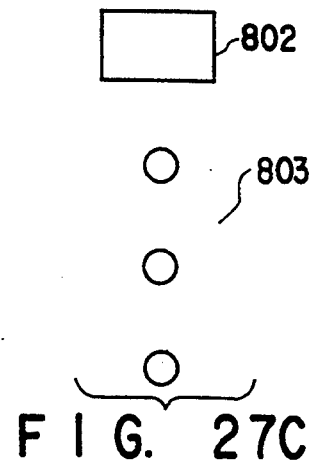

FIGS. 27A, 27B and 27C are diagrams showing the arrangements of the shake sensor used when shake around the axis in one direction of x, y or oblique direction is detected.

Figure 28A:
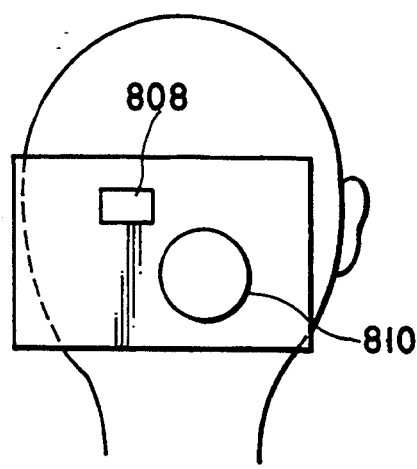
FIGS. 28A and 28B are views showing the positional relations between a photographer and a camera set by the photographer to look through the finder with his viewing eye.
Figure 28B:
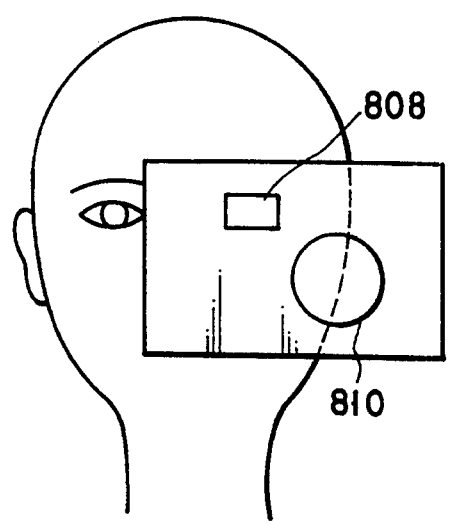

FIGS. 28A and 28B are views showing the positional relations between a photographer and a camera set by the photographer to look through the finder with his viewing eye.

Figure 29:
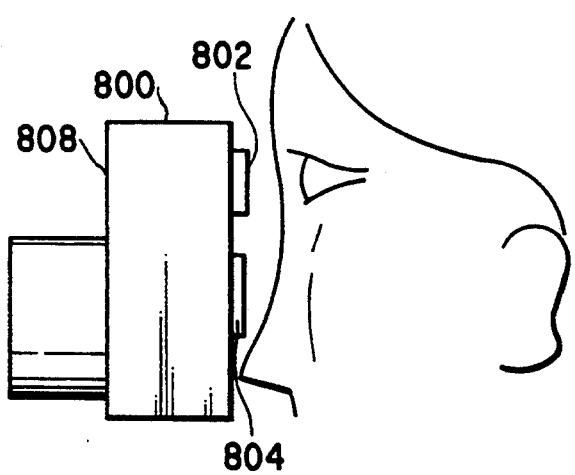
FIG. 29 is a view showing the state in which the photographer sets the camera in a photographing position and which is viewed from the side.

FIG. 29 is a view showing the state in which the photographer sets the camera in a photographing position and which is viewed from the side.

The shake sensor is used to detect a variation in the relative position (angle) between the sensor mounting surface and the face of the photographer and it is desirable that the light projecting section will have a stable flat surface. In the case of FIG. 28A, the photographer looks through the finder with his right eye, and in the case of FIG. 28B, the photographer looks through the finder with his left eye. In this example, the shake sensor 804 projects light on the cheek of the photographer to satisfy the above condition by disposing the sensor substantially directly under the finder. In FIG. 29, the positional relation between the shake sensor 804 and the photographer in the vertical direction is shown. Therefore, the positions of the shake sensor 804 and the finder eyepiece portion 802 are set in the positions as shown in FIG. 25, that is, the shake sensor 804 is disposed to be set substantially directly under the finder eyepiece portion 802.

The arrangements of the light projecting and receiving sections are explained with reference to FIGS. 26A, 26B, 27A, 27B, 27C.

In a case where shakes in the two axial directions are detected, the light receiving section is disposed in a direction perpendicular to the detection axis as shown in FIGS. 26A, 26B. For example, in the case of FIG. 26A, shakes around the x and y axes are detected, and in the case of FIG. 26B, shakes around two axes in oblique directions are detected. When shake around one axis direction is detected, shake around the axis in the x direction, oblique direction or y direction is detected by arranging the shake sensor as shown in FIG. 27A, 27B or 27C.

Whether the detection in the two axial directions or one axial direction is effected may be determined according to the precision or the direction in which the shake is detected.

Figure 30A:
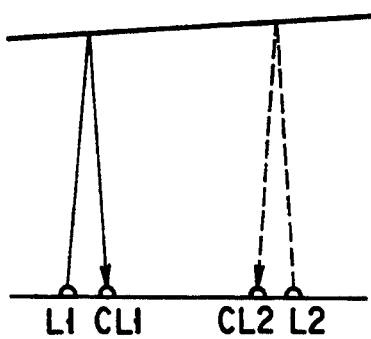
FIGS. 30A and 30B are diagrams showing other examples of the constructions of the light projecting section and light receiving section.
Figure 30B:
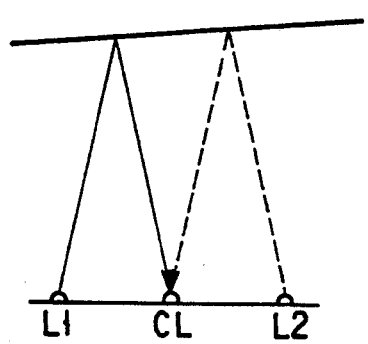

The above explanation has been made with respect to the construction having one light projecting section and two light receiving sections, but the arrangements as shown in FIGS. 30A, 30B may be considered. FIG. 30A shows an example in which two light projection sections and two light receiving sections are arranged and FIG. 30B shows an example in which two light projecting sections and one light receiving section are arranged. Since two light projecting sections $L_1$ and $L_2$ are provided, the above examples can be easily attained by time-sequentially activating the light projecting sections $L_1$ and $L_2$ to project light on the time series basis (as indicated by solid lines and broken lines), sampling and holding current in the light receiving section or sections and supplying the current to the detection circuit described before.

As described above, in the non-contact type inclination detecting apparatus according to the first embodiment of this invention, the shake detection can be effected even in the mirror-up state with a simple construction.

As described above, the first embodiment can be applied as a hand shake detecting apparatus of a camera.

In this case, the hand shake detecting apparatus of the camera of this invention is disposed behind the camera, includes light projecting and receiving means for projecting light towards the photographer, receiving reflection lights from at least two points on the light receiving element and generating photoelectric current signals for the respective points and operation means for deriving a difference between reciprocals of the square roots of the photoelectric currents output from the light receiving element, and uses an output of the operation means as a hand shake signal.

That is, in the hand shake detecting apparatus of the camera of this invention, reflection lights from at least two points on the photographer are received and photoelectric current signals for the respective points are output. Then, a difference between reciprocals of the square roots of the output photoelectric currents is derived and the result is used as a hand shake signal.

In the first embodiment described above, the sensor has two light receiving sections $CL_1$, $CL_2$ for one light projecting section L as shown in FIG. 4, the light receiving sections $CL_1$, $CL_2$ receive reflection lights from an object when the light projecting section L projects light, and then they output corresponding light reception currents $i_1$, $i_2$.

As shown in FIG. 1, the light reception currents $i_1$, $i_2$ from the light receiving sections $CL_1$, $CL_2$ are respectively converted into forms shown in the equation (2).

$$\frac{1}{\sqrt{i_1}}, \frac{1}{\sqrt{i_2}} \quad (2)$$

Further, the values are supplied to the subtraction circuit 7 for subtracting operation to derive an inclination output as indicated by the following equation (1').

$$\frac{1}{\sqrt{i_1}} - \frac{1}{\sqrt{i_2}} \quad (1')$$

Figure 32:
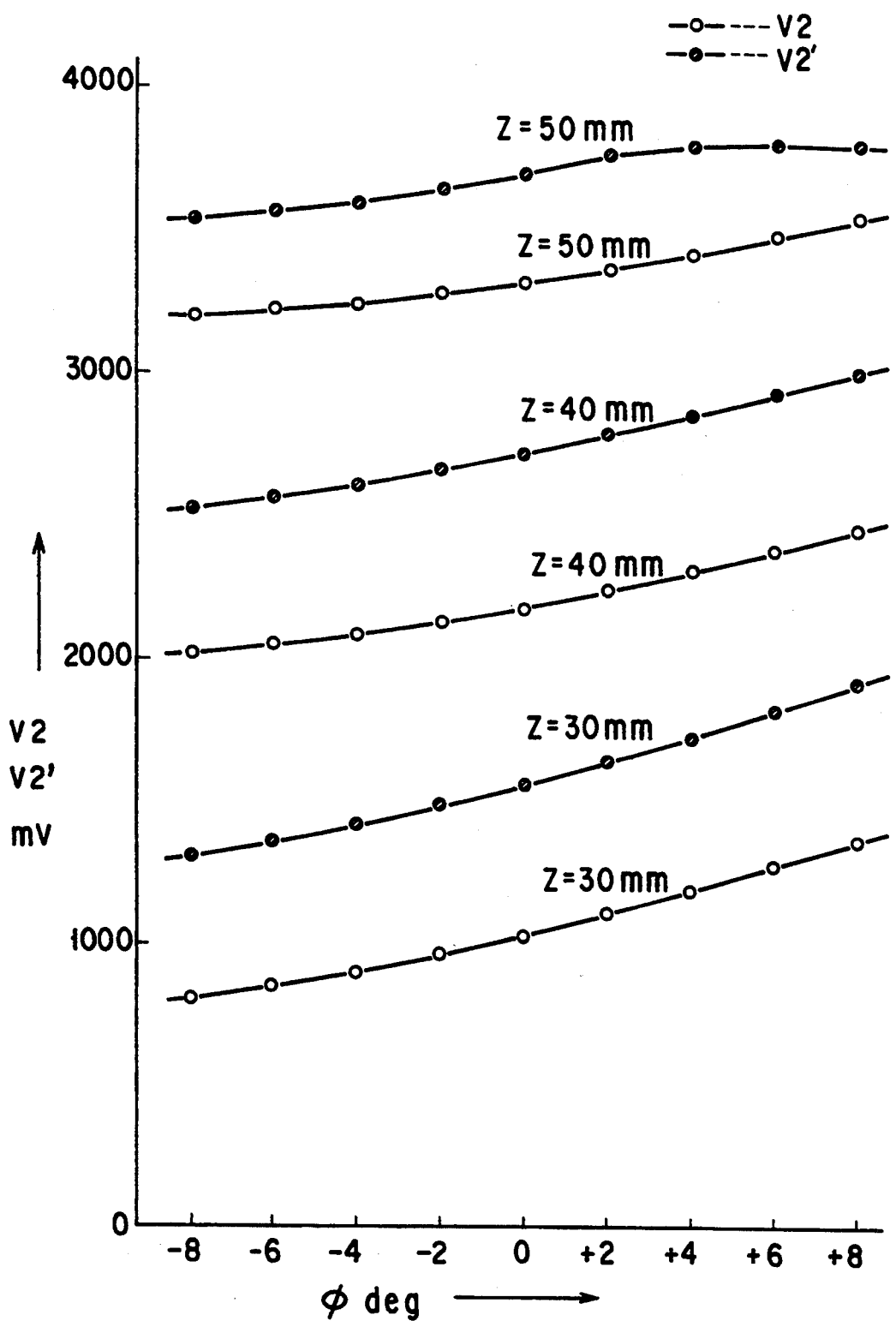
FIG. 32 is a diagram showing the characteristic of outputs $V_2$, $V_2'$ of the light receiving section $CL_2$ with respect to the inclination angle $\phi$.

FIGS. 31 and 32 show an output $V_1$ of the light receiving section $CL_1$ and outputs $V_2$, $V_2'$ of the light receiving section $CL_2$ with respect to the inclination angle $\phi$. In FIGS. 31, 32, the output variation is monitored at the time of inclination angle $\phi = \pm 8$ deg. with the distance Z (Z=50, 40, 30 mm) to the reflection surface used as a parameter.

$V_1$ and $V_2$ are output values obtained when the light receiving sections $CL_1$, $CL_2$ are arranged on the left and right positions of and at the same distance from the light projecting section L.

$V_1'$ is an output value obtained when only the light receiving section $CL_2$ is outwardly moved by 2 mm from the preset position with respect to the light projecting section L.

The sensor of the first embodiment is superior to the conventional sensor, but since the sensitivities of the light receiving sections $CL_1$, $CL_2$ are not constant and the mounting position thereof may be deviated, it is difficult to obtain a precise inclination output if errors caused by the above differences in the sensitivity and mounting position are not corrected. Further, as shown in FIGS. 31 and 32, an error caused by the variation in the mounting position causes a variation in the output.

When the sensor with the construction shown in FIG. 4 is formed, it is substantially impossible to set the sensitivities of the light receiving sections $CL_1$, $CL_2$ to exactly the same value and suppress the mounting error to $\pm 0$, and it becomes more difficult to satisfy the above requirement as a larger number of sensors are formed.

Next, a second embodiment obtained by improving the first embodiment with the above problems taken into consideration is explained.

First, the outline of the second embodiment is explained. In an inclination detecting apparatus according to a first aspect of the second embodiment of this invention, there are provided light projecting means for projecting light towards the photographer, at least first and second light receiving means for receiving reflection lights from at least two points on the photographer and outputting corresponding photoelectric currents, operating means for deriving reciprocals of the square roots of the photoelectric currents output from the first and second light receiving means, correction value storing means for storing preset correction values corresponding to the photoelectric currents output from the first and second light receiving means, correcting means for correcting the photoelectric currents or the reciprocals of the square roots of the photoelectric currents by use of the preset correction values stored in the correction value storing means, and inclination signal deriving means for deriving a difference signal between values corresponding to the outputs of the first and second light receiving means and corrected by the correcting means and outputting the difference signal as an inclination signal.

In an inclination detecting apparatus according to a second aspect of the second embodiment of this invention, there are provided light projecting means for projecting light towards the photographer, at least first and second light receiving means for receiving reflection lights from at least two points on the photographer and outputting corresponding photoelectric currents, first operating means for deriving reciprocals of the square roots of the photoelectric currents output from the first and second light receiving means, inclination signal deriving means for deriving a difference signal between the reciprocals of the square roots of the photoelectric currents derived by the first operating means and outputting the difference signal as an inclination signal, second operating means for deriving the sum of the reciprocals of the square roots of the photoelectric currents derived by the first operating means, correction value storing means for storing correction values corresponding to the values derived by the second operating means, correcting means for correcting the inclination signal output from the inclination signal deriving means by use of the preset correction values stored in the correction value storing means.

That is, in the inclination detecting apparatus according to the first aspect of the second embodiment of this invention, the light projecting means projects light towards the photographer, and the first and second light receiving means receive reflection lights from at least two points on the photographer and output corresponding photoelectric currents. Then, the operating means derives reciprocals of the square roots of the photoelectric currents output from the first and second light receiving means, the correction value storing means stores the preset correction values corresponding to the photoelectric currents output from the first and second light receiving means, and the correcting means corrects the photoelectric currents or the reciprocals of the square roots of the photoelectric currents by use of the preset correction values stored in the correction value storing means. Further, the inclination signal deriving means derives a difference signal between values corresponding to the outputs of the first and second light receiving means and corrected by the correcting means and outputs the difference signal as an inclination signal.

Further, in the inclination detecting apparatus according to the second aspect of the second embodiment of this invention, the light projecting means projects light towards the photographer and the first and second light receiving means receive reflection lights from at least two points on the photographer and output corresponding photoelectric currents. The first operating means derives the reciprocals of the square roots of the photoelectric currents output from the first and second light receiving means and the inclination signal deriving means derives a difference signal between the reciprocals of the square roots of the photoelectric currents derived by the first operating means and outputs the difference signal as an inclination signal. The second operating means derives the sum of the reciprocals of the square roots of the photoelectric currents derived by the first operating means, the correction value storing means stores correction values corresponding to the values derived by the second operating means, and the correcting means corrects the inclination signal output from the inclination signal deriving means by use of the preset correction values stored in the correction value storing means.

The second embodiment of this invention is explained in detail with reference to the accompanying drawings.

Figure 33:
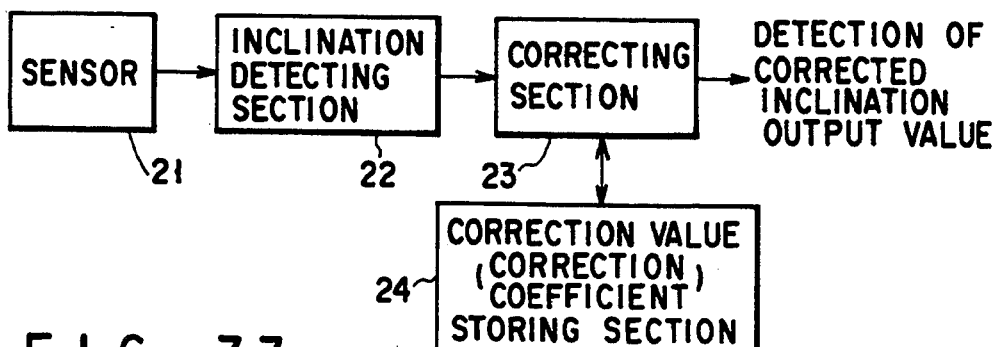
FIG. 33 is a diagram showing the construction of an inclination detecting apparatus according to a first aspect of a second embodiment of this invention.

FIG. 33 is a diagram showing the construction of an inclination detecting apparatus according to the first aspect of the second embodiment of this invention.

As shown in FIG. 33, a sensor 21 is connected to an inclination detecting section 22 which is connected to a correcting section 23. The correcting section 23 is connected to a correction value storing section 24.

With the above construction, the sensor 21 corresponds to the light projecting section L and light receiving sections $CL_1$, $CL_2$ of FIG. 1, and the inclination detecting section 22 corresponds to the driving circuit 1, circuits 3, 5, 7 of FIG. 1. In the inclination detecting section 22, the subtraction circuit 7 is not included and an output value indicated by the equation (2) is derived therefrom.

The correcting section 23 uses the correction value given from the correction value storing section 24 to convert the output value of the inclination detecting section 22 to such an output value that variation in the sensor 1 will not affect the inclination angle $\phi$. The correction value storing section 24 stores correction values or correction coefficients necessary for correcting the output of the inclination detecting section 22 and outputs the correction value to the correcting section 23 when required.

Figure 34:
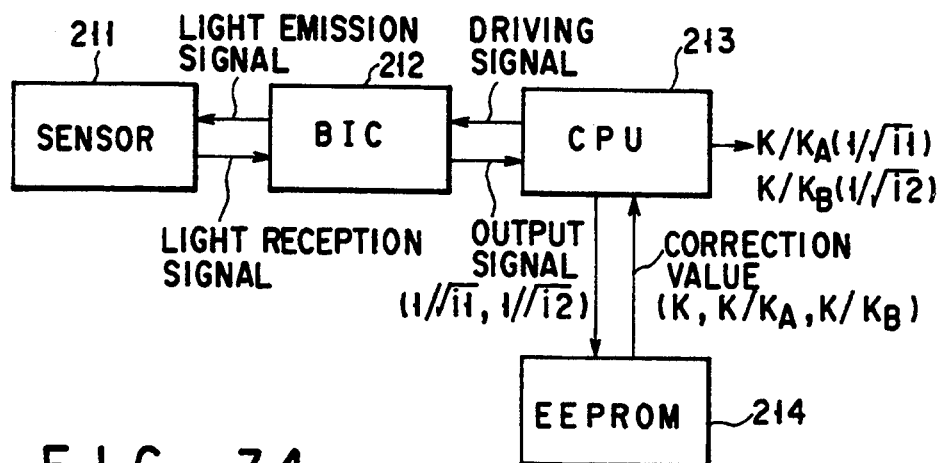
FIG. 34 is a diagram showing the detail construction of the inclination detecting apparatus according to the first aspect of the second embodiment of this invention.

FIG. 34 is a block diagram showing the concrete construction of the inclination detecting apparatus according to the second embodiment.

In FIG. 34, a main CPU 213 effects the sequential control according to a program stored in a ROM provided therein to control the operations of the peripheral integrated circuit (IC) and the like.

A EEPROM 214 is a nonvolatile memory element and stores adjustment data for correcting errors caused by mechanical variations in the system and the correction values (k, $k/k_A$, $k/k_B$).

Further, a BIC 212 is an interface IC of a sensor 211, generates a light emission signal of the light emitting element, receives signals received by the light receiving elements $CL_1$, $CL_2$ and outputs the same to the CPU 213 as an output signal. Then, the CPU 213 outputs a corrected inclination output value according to the output signal.

Figure 35:
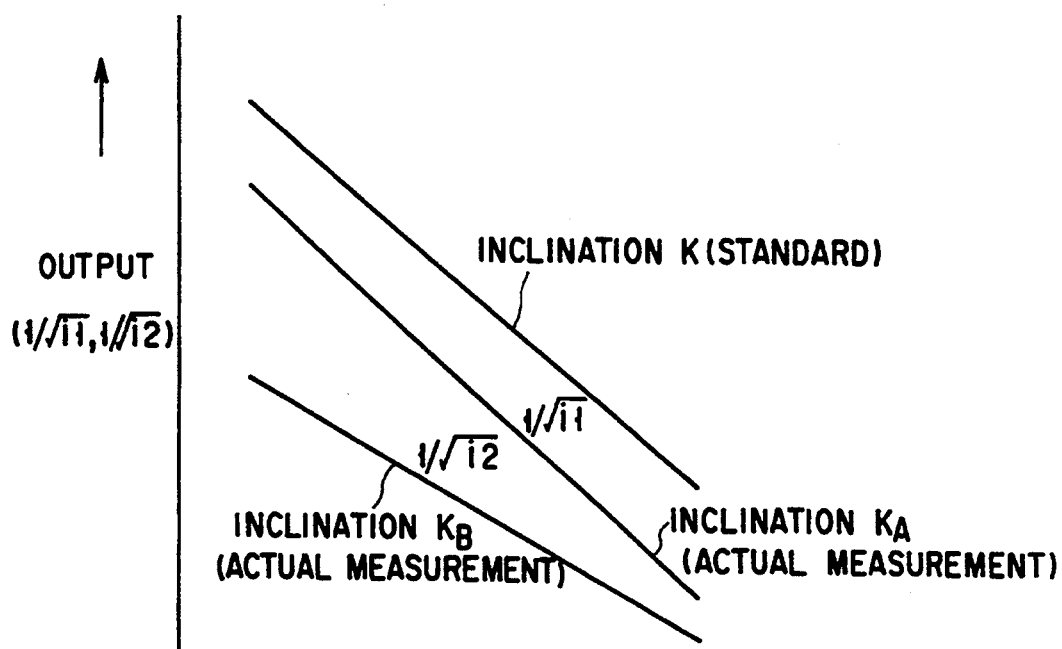
FIG. 35 is a conceptional diagram for illustrating a correction method according to a first aspect of the first embodiment.

FIG. 35 is a conceptional diagram for illustrating the correction method according to a first aspect of this embodiment. That is, FIG. 35 is a diagram for illustrating the correction method effected by use of the correction values (k, $k/k_A$, $k/k_B$) and the output signal indicated by the equation (2).

In FIG. 35, k indicates the inclination of a characteristic curve obtained when the outputs of the light receiving elements $CL_1$, $CL_2$ indicated by the equation (2) vary in an ideal manner with respect to the inclination angle $\phi$. That is, it indicates output values when the sensor functions to exactly follow the required specification, or when the sensitivity and the mounting errors are set as required by the specification.

In contrast, in the case of an actual output, the inclination is not always constant ($k_A = k_B$), and in most cases, the relation of $k_A < k < k_B$ or $k_B < k < k_A$ will be obtained.

Therefore, in this embodiment, the inclinations $k_A$, $k_B$ are calculated from the output characteristic indicated by the equation (2) obtained from the actually measured values and the actually measured output characteristic is corrected so as to always have a constant inclination with respect to the output characteristic of the standard inclination k. By this correction, the inclinations of the actually measured output characteristics become $k/k_A$, $k/k_B$ and the output values can be expressed by the equation (3). In this case, it is assumed that the reflection factor of the reflection surface is constant.

$$\frac{K}{K_A}\left(\frac{1}{\sqrt{i_1}}\right), \frac{K}{K_B}\left(\frac{1}{\sqrt{i_2}}\right) \quad (3)$$

Next, actual correction is explained based on the definition shown in FIG. 35.

Figure 37:
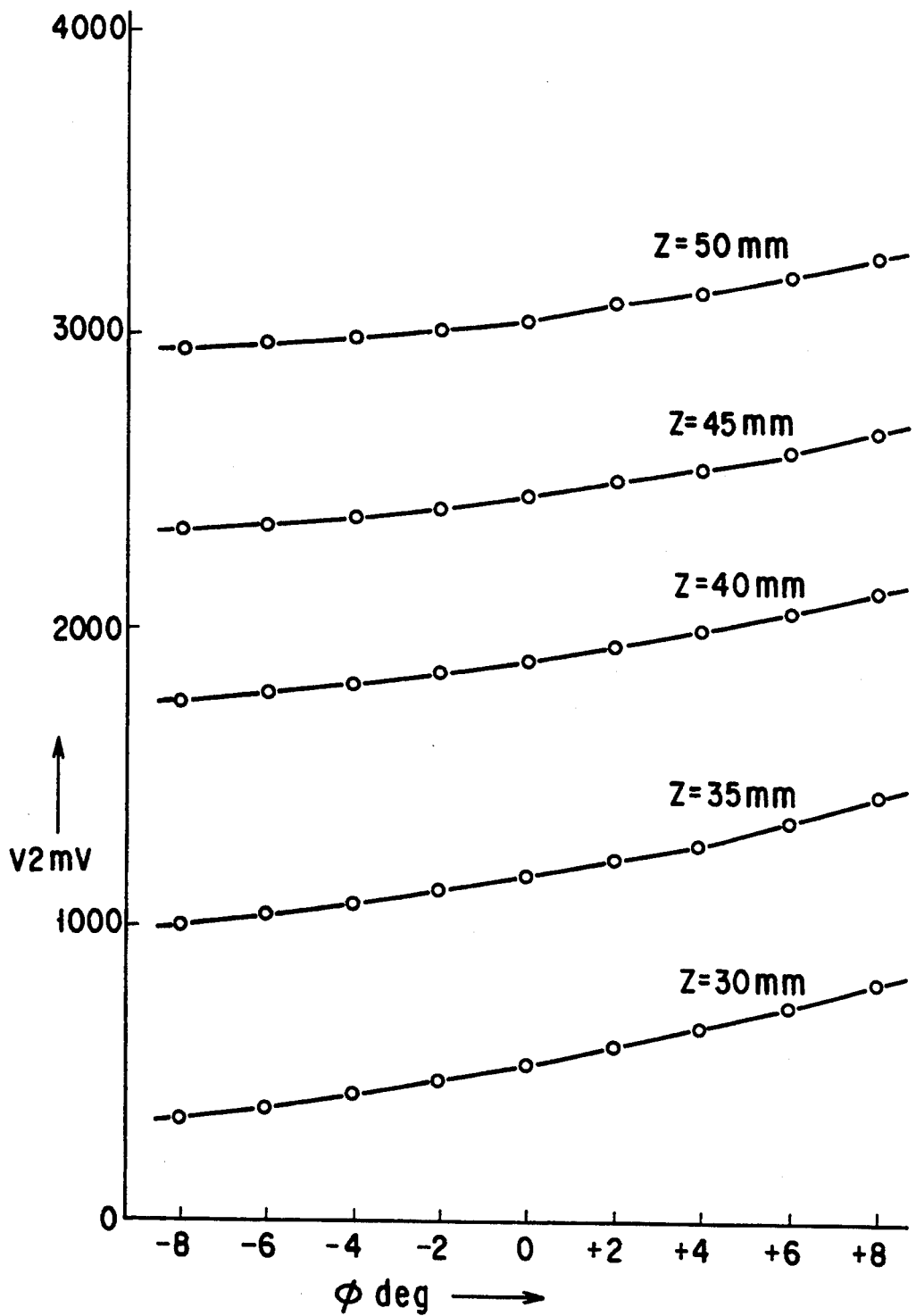
FIG. 37 is a diagram showing the relation between the inclination angle $\phi$ [deg] and the output $V_2$ [mV]

FIGS. 36 and 37 show examples of characteristic diagrams indicating variations in the output indicated by the following equation (4) with respect to the inclination angle $\phi$ deg.

$$V_1 = \frac{1}{\sqrt{i_1}}, V_2 = \frac{1}{\sqrt{i_2}} \quad (4)$$

In FIGS. 36, 37, the distance Z (Z is set to values set at the interval of 5 mm in the range of 30 to 50 mm) is used as a parameter and the inclination angle $\phi = \pm 8$ deg. is used.

As is clearly understood from FIGS. 36 and 37, the inclination $k_A$ of the output $V_1$ is slightly steeper than the inclination $k_B$ of the output $V_2$.

Figure 38:
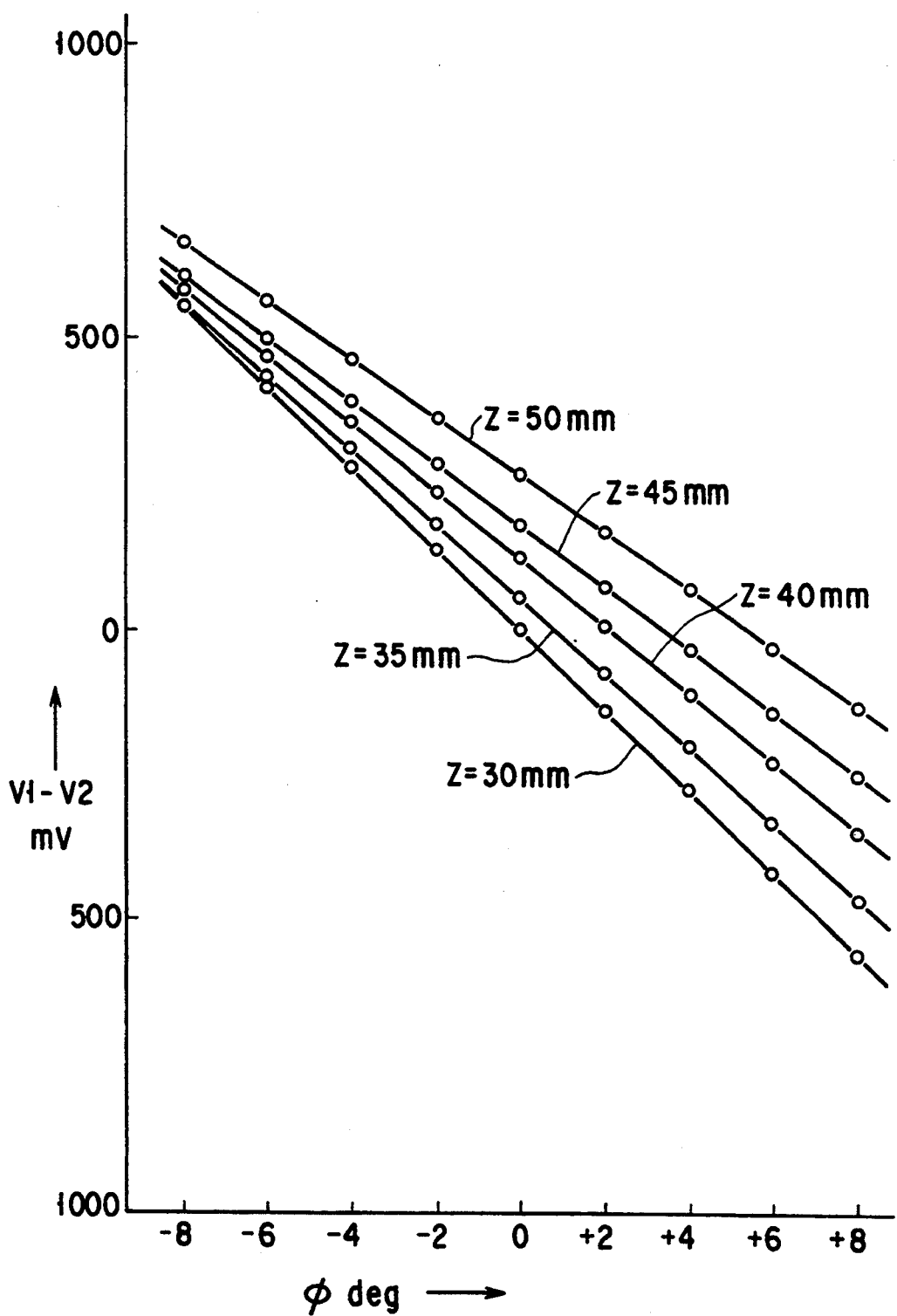
FIG. 38 is a diagram showing the relation between the inclination angle $\phi$ [deg] and the output ($V_1$-$V_2$) [mV]

If, in this condition, a variation in the inclination is calculated based on the equation (1'), the inclinations of variations in the difference ($V_1 - V_2$) are different for the respective distances Z as is clearly seen from FIG. 38. That is, the inclination becomes steeper as the distance Z becomes shorter. Therefore, even if the inclination angle $\phi$ is detected in this condition, a precise value or angle cannot be obtained.

Therefore, at the first correction stage, the inclinations $k_A$, $k_B$ of the respective outputs ($V_1$, $V_2$) are derived.

First, in the case of FIG. 36, since the number of parameters is five (Z=30, 35, 40, 45, 50 mm) and the absolute value of the inclination angle $\phi$ is 16 deg, the inclination $k_A$ of the output $V_1$ which is the average the inclinations for the respective parameters can be expressed by the following equation (5).

$$K_A = \frac{\{V_{1(\phi=+8)} - V_{1(\phi=-8)}\}_{Z=30} + \ldots + \{V_{1(\phi=+8)} - V_{1(\phi=-8)}\}_{Z=50mV}}{5 \times 16 \text{ deg}} \quad (5)$$

Likewise, in the case of FIG. 37, the inclination $k_B$ of the output $V_2$ can be expressed by the following equation (6).

$$K_B = \frac{\{V_{2(\phi=+8)} - V_{2(\phi=-8)}\}_{Z=30} + \ldots + \{V_{2(\phi=+8)} - V_{2(\phi=-8)}\}_{Z=50mV}}{5 \times 16 \text{ deg}} \quad (6)$$

In the above equations (5), (6), the inclinations $k_A$, $k_B$ are derived based only on a difference between outputs on the two points of the inclination angle $\phi = -8$ deg, +8 deg. for each of the parameters, but when the higher precision is required, the average of variations in the outputs with respect to smaller inclination angles may be derived.

That is, for example, the inclinations are derived for each of the parameters according to differences between outputs on two points of $\phi = -6$ deg. and +6 deg, - - -, and outputs on two points of $\phi = -2$ deg. and +2 deg. and then the average of the inclinations is derived.

The inclinations $k_A$, $k_B$ indicated by the equations (5), (6) are respectively set to $k_A = 35$ mV/deg and $k_B = 24$ mV/deg. At this time, the standard inclination is set to k=30 mV/deg. Then, the calculated inclinations of the output values after correction become substantially equal to one another.

Figure 41:
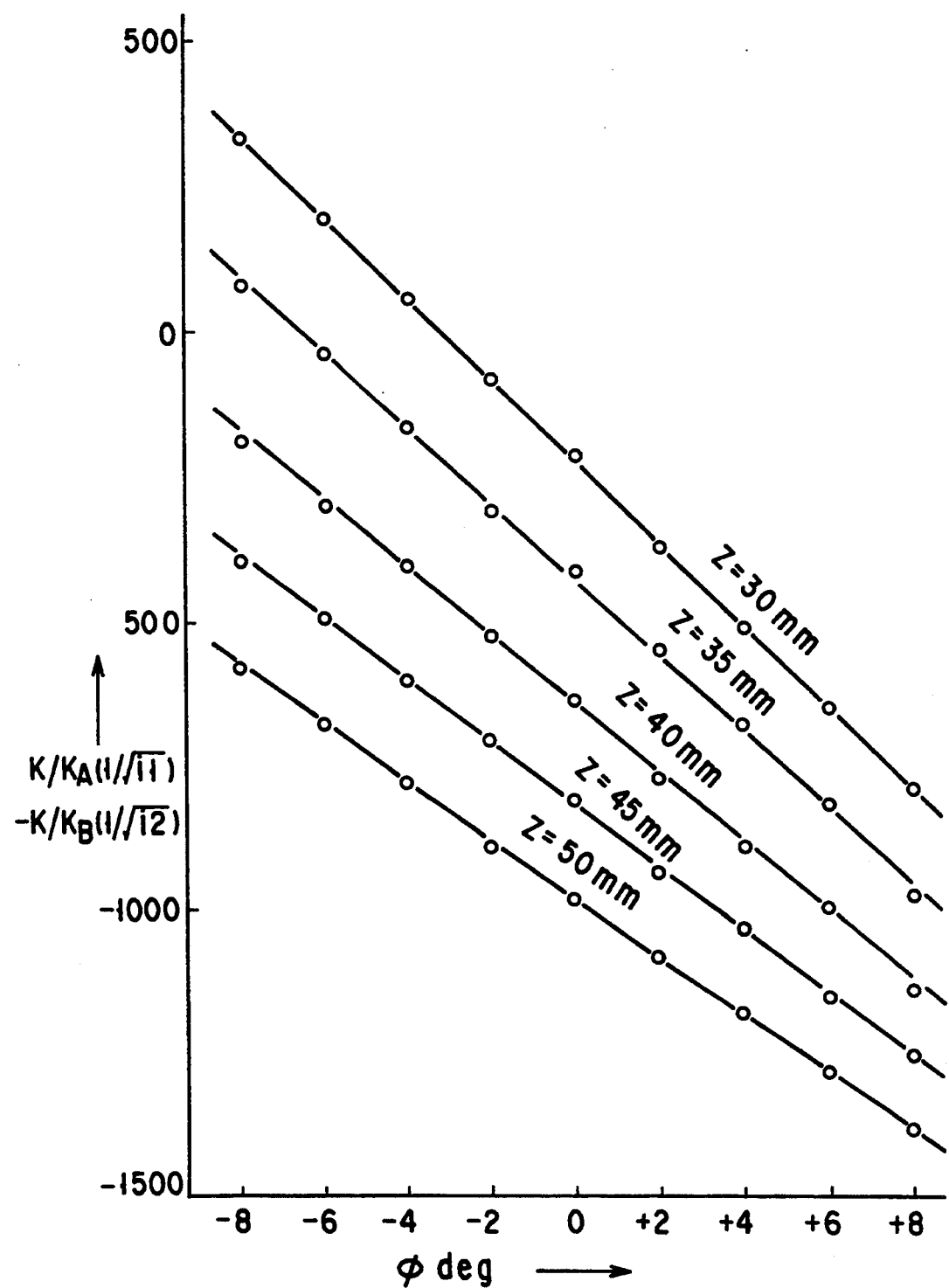
FIG. 41 is a diagram showing the relation between the inclination angle $\phi$ [deg] and a difference between output values after correction.

In the case of FIG. 38, the inclinations for the respective distances Z are different from one another, but the inclinations after correction become substantially constant irrespective of a variation in the distance Z as shown in FIG. 41 and the value of inclination angle $\phi$ can be stably detected.

In this embodiment, the correction is effected in the range of $\phi = \pm 8$ deg. However, the practical range for shake detection of the camera may be determined with the precision of detection expressed by the following equation (7) in a case where a permissible blur circle $\delta = 0.1$ mm on the film surface is detected when a long focal distance of $\zeta = 100$ mm is used, for example.

$$\tan^{-(0.1/100)} = 0.057 \text{ deg} \quad (7)$$

Figure 39:
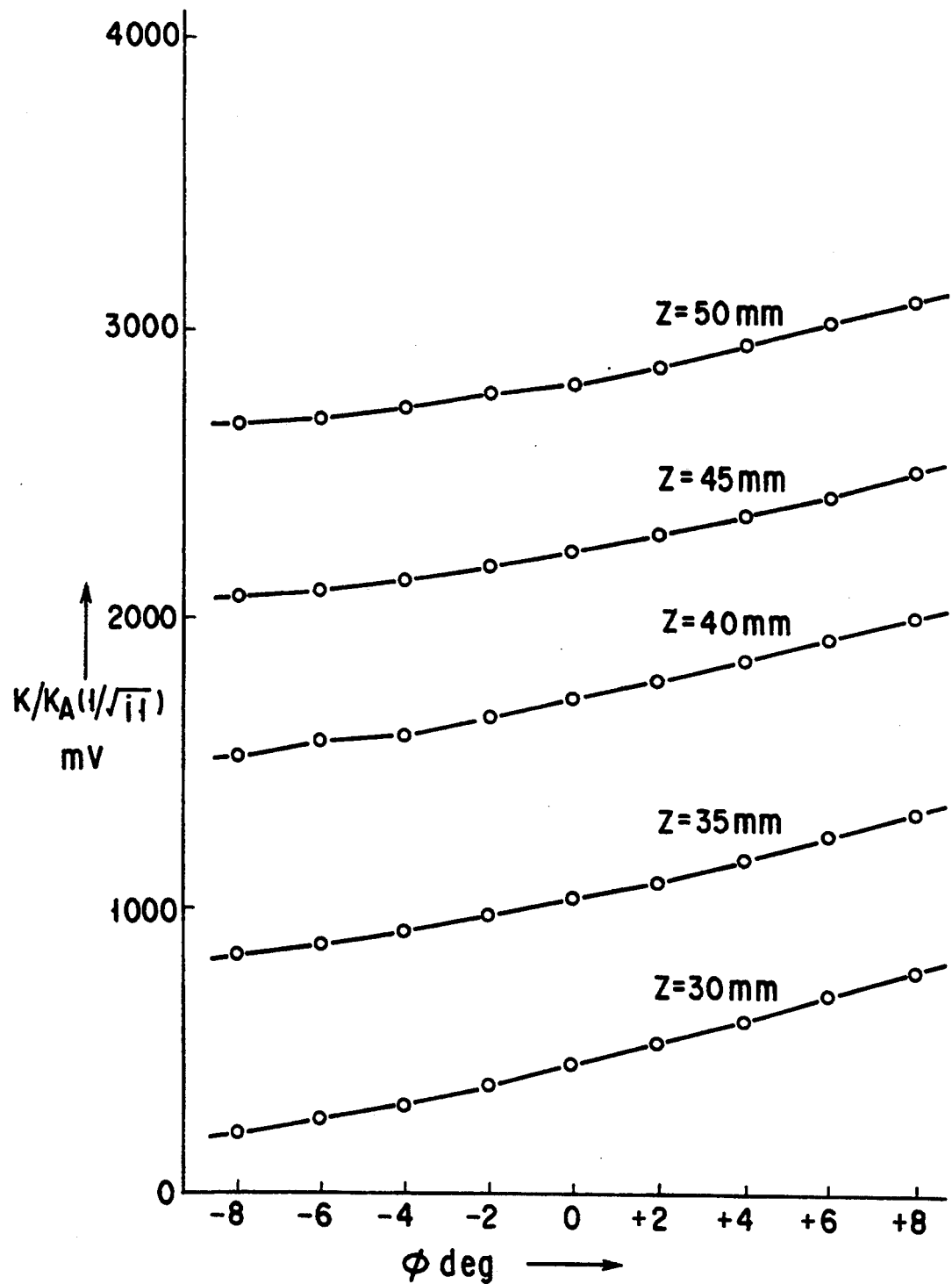
FIG. 39 is a diagram showing the relation between the inclination angle $\phi$ [deg] and an output value after correction.

Therefore, the correction precision can be enhanced by limiting the correction range to a narrow range of inclination (for example, $\phi = \pm 8$ deg.) as shown in FIGS. 39, 40.

Thus, by using the above correction method, a variation in the magnitude of the output or variation in the inclination caused when the light receiving section $CL_2$ is deviated by 2 mm from the preset position M towards the outside can be precisely corrected.

Figure 47:
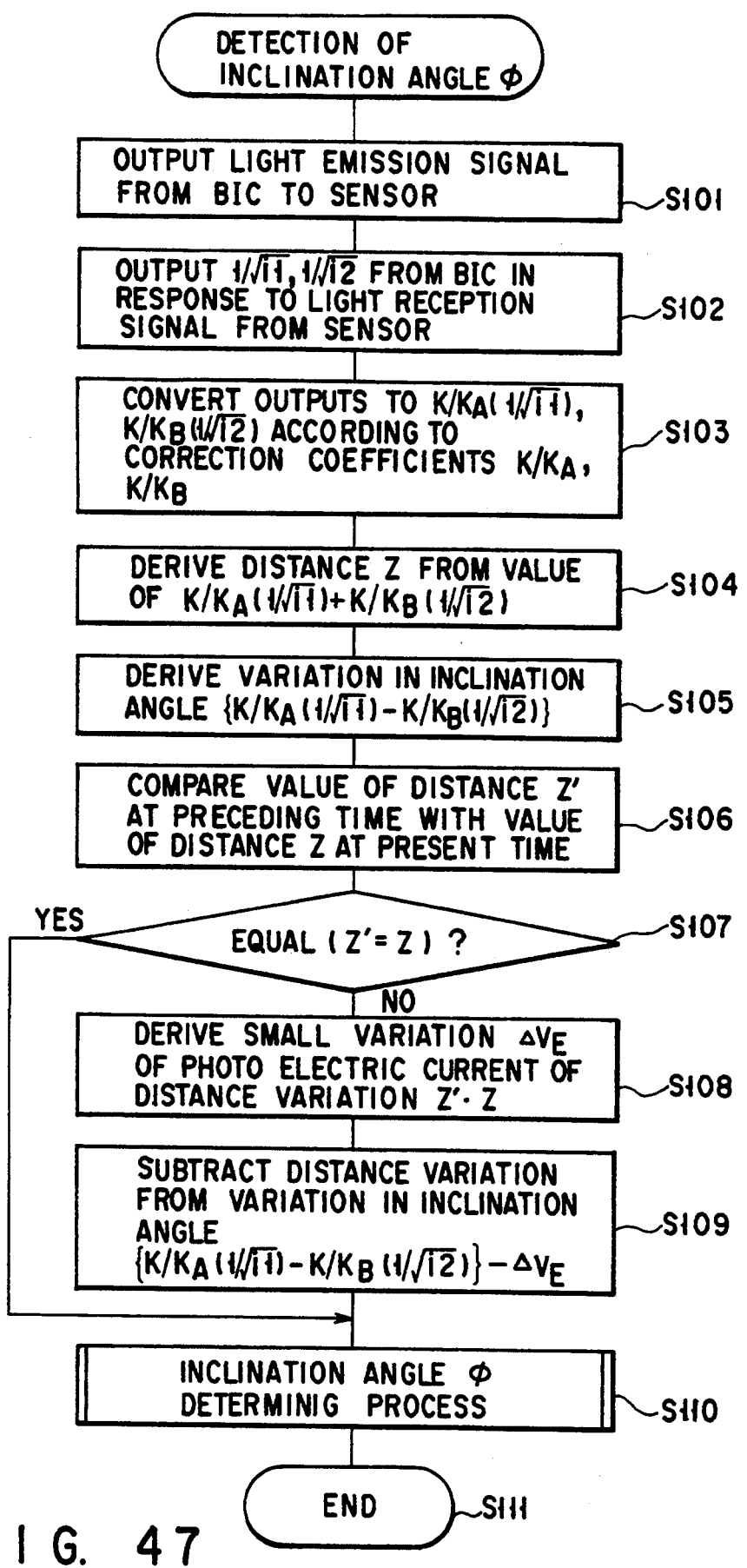
FIG. 47 is a flowchart for concretely illustrating a method of actually detecting an inclination angle based on an output value after correction.

Next, the method of actually detecting the inclination angle based on the corrected output values is explained in detail with reference to the flowchart shown in FIG. 47.

When a light emission signal is output from the BIC 212 to the sensor 211 (step S101), the BIC 212 receives a light reception signal from the sensor 211 and an output value expressed by the equation (2) is derived (step S102).

Then, the CPU 213 converts the output value to a corrected value indicated by the equation (3) by use of the correction coefficients $k/k_A$, $k/k_B$ stored in the EEPROM 214 (step S103).

Figure 42:
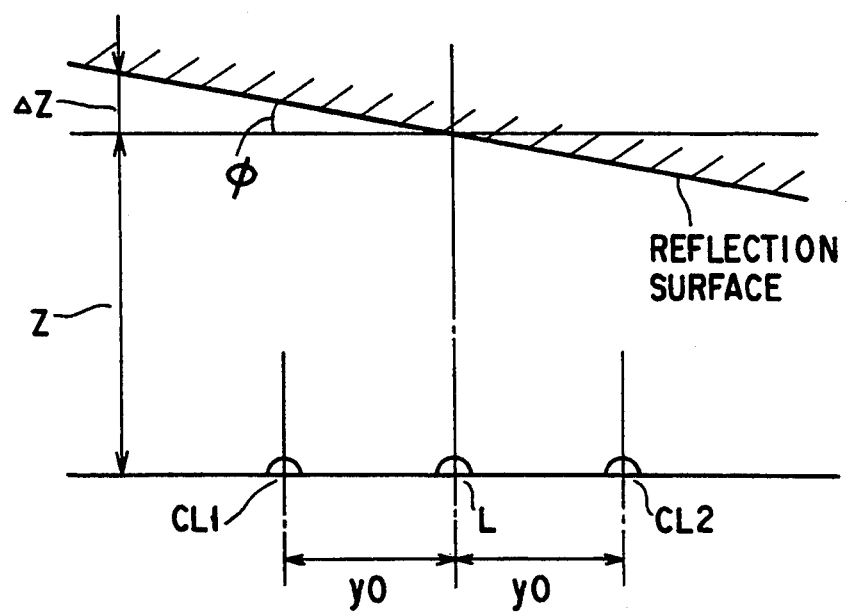
FIG. 42 is a diagram showing a condition in which the reflection surface is inclined by an angle $\phi$.

For example, as shown in FIG. 42, if the total sum $V_E$ of photoelectric currents of the light receiving sections $CL_1$, $CL_2$ caused when the reflection surface is inclined by an angle $\phi$ is used as the total sum of outputs indicated by the equation (3) and when the reflection factor of the reflection surface is constant, the total sum $V_E$ can be expressed by the following equation (8). Further, as described before, the total sum $V_E$ of the output values after correction varies with the distance Z.

$$V_E = \frac{K}{K_A}\left(\frac{1}{\sqrt{i_1}}\right) + \frac{K}{K_B}\left(\frac{1}{\sqrt{i_2}}\right) \tag{8}$$

Therefore, the distance Z can be calculated by adding together the corrected outputs of the sensor which repeatedly effects the sampling operation in a preset period. A variation in the inclination angle $\phi$ can be calculated by subtracting the corrected output values (steps S104, S105).

The reason why the value of the distance Z is derived in the step S104 is that a variation in the distance Z may be contained in the output value of variation in the inclination angle $\phi$.

Therefore, the value of the distance Z′ at the preceding sampling time is compared with the value of the distance Z at the present sampling time, and if the value of the distance Z′ is not equal to the value of the distance Z, a value obtained by subtracting a variation in the distance Z from a variation in the inclination angle $\phi$ is processed as a pure inclination angle $\phi$ and then the entire operation is completed (steps S106 to S111).

Even if a variation in the distance Z is not taken into consideration, a precise relative angle for sufficiently satisfying the precision necessary for detection of the hand shake of the camera can be detected by effecting the correction of inclination ($k/k_A$, $k/k_B$) when the sensitivity of the inclination component is lowered in the short period of sampling time. That is, since the sampling is effected in a preset period, variations in the inclination angle $\phi$ and the distance Z can be used as relative values.

The above method is extremely effective since the distance can be cancelled over a wide range when the inclination angle is large and the dynamic range of the distance Z to the reflection surface is wide.

Figure 48:
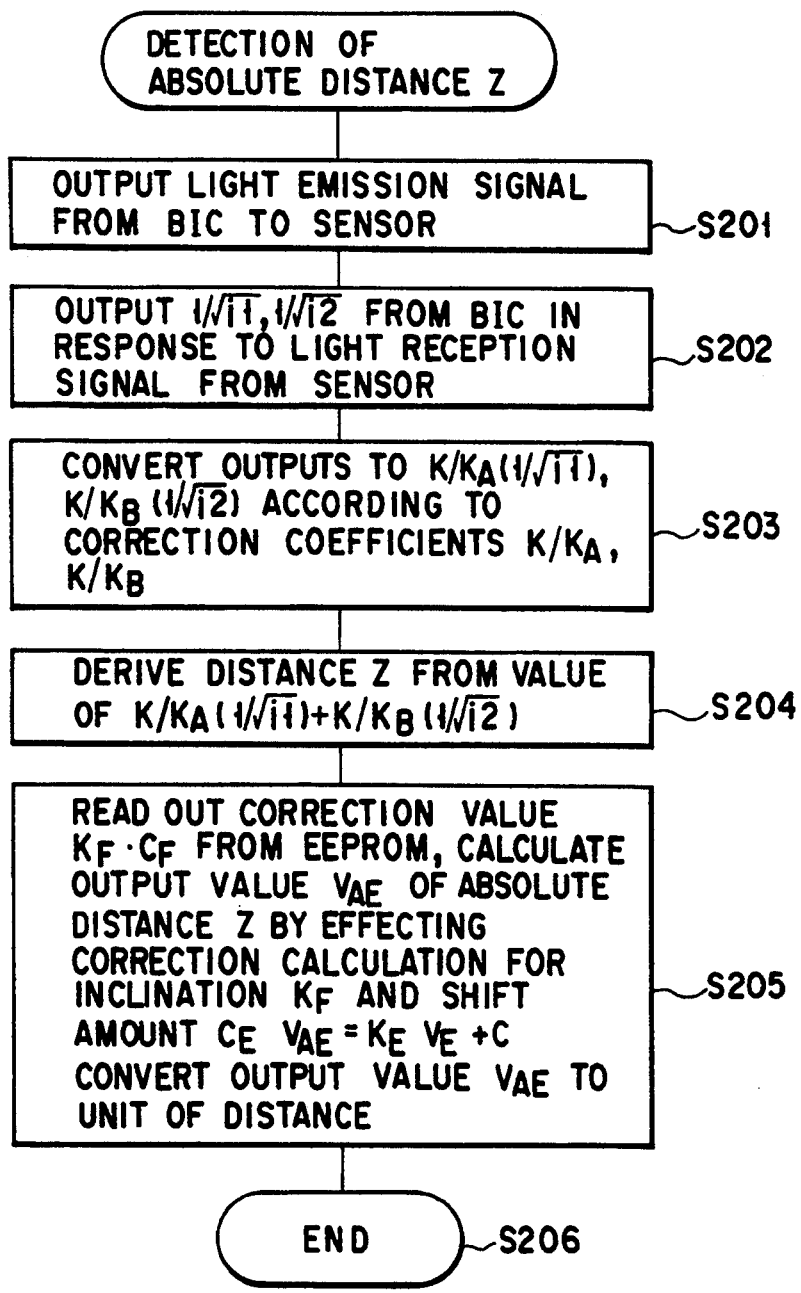
FIG. 48 is a flowchart for concretely illustrating a method of actually deriving the distance Z.

Next, a method for actually deriving the distance Z is explained with reference to the flowchart of FIG. 48.

When a light emission signal is output from the BIC 212 to the sensor 211 (step S201), the BIC 212 receives a light reception signal from the sensor 211 and an output value expressed by the equation (2) is derived (step S202). Then, the CPU 213 converts the output value to a corrected value indicated by the equation (3) by use of the correction coefficients $k/k_A$, $k/k_B$ stored in the EEPROM 214 (step S203).

The relation between the distance Z and the total sum $V_E$ of the photoelectric currents is kept linear as shown in FIG. 43. Since the characteristic is constant irrespective of $\phi$, a variation in the distance Z can be detected by monitoring the deterioration in $V_E$ (step S204).

However, there occurs a problem that the output characteristics such as the inclinations cannot be constant because of differences of the sensitivities of the sensors and mounting errors.

In order to solve the above problem, inclinations $k_E$ inherent to the respective sensors and shift amounts $C_E$ of the output values are stored in the EEPROM and the correction calculation is effected according to the following equation (9) to determine an output value $V_{AE}$ for the precise distance Z (absolute distance $Z_A$).

$$K_{AE} = K_E V_E + C_E = \tag{9}$$
$$K_E\left\{\frac{k}{k_A}\left(\frac{1}{\sqrt{i_1}}\right) + \frac{k}{k_B}\left(\frac{1}{\sqrt{i_2}}\right)\right\} + C_E$$

Then, the output value $V_{AE}$ is converted into the unit of distance (step S205) and the entire operation is completed (step S206). The output value $V_{AE}$ itself varies substantially in proportion to the distance between the sensor and the reflection surface and the extremely short distance can be detected by use of the above feature. For example, it is effective for fine distance adjustment at the time of enlarging close-up photographing and it becomes possible to adjust the focus with high distance measurement precision in the unit of micron.

Figure 49:
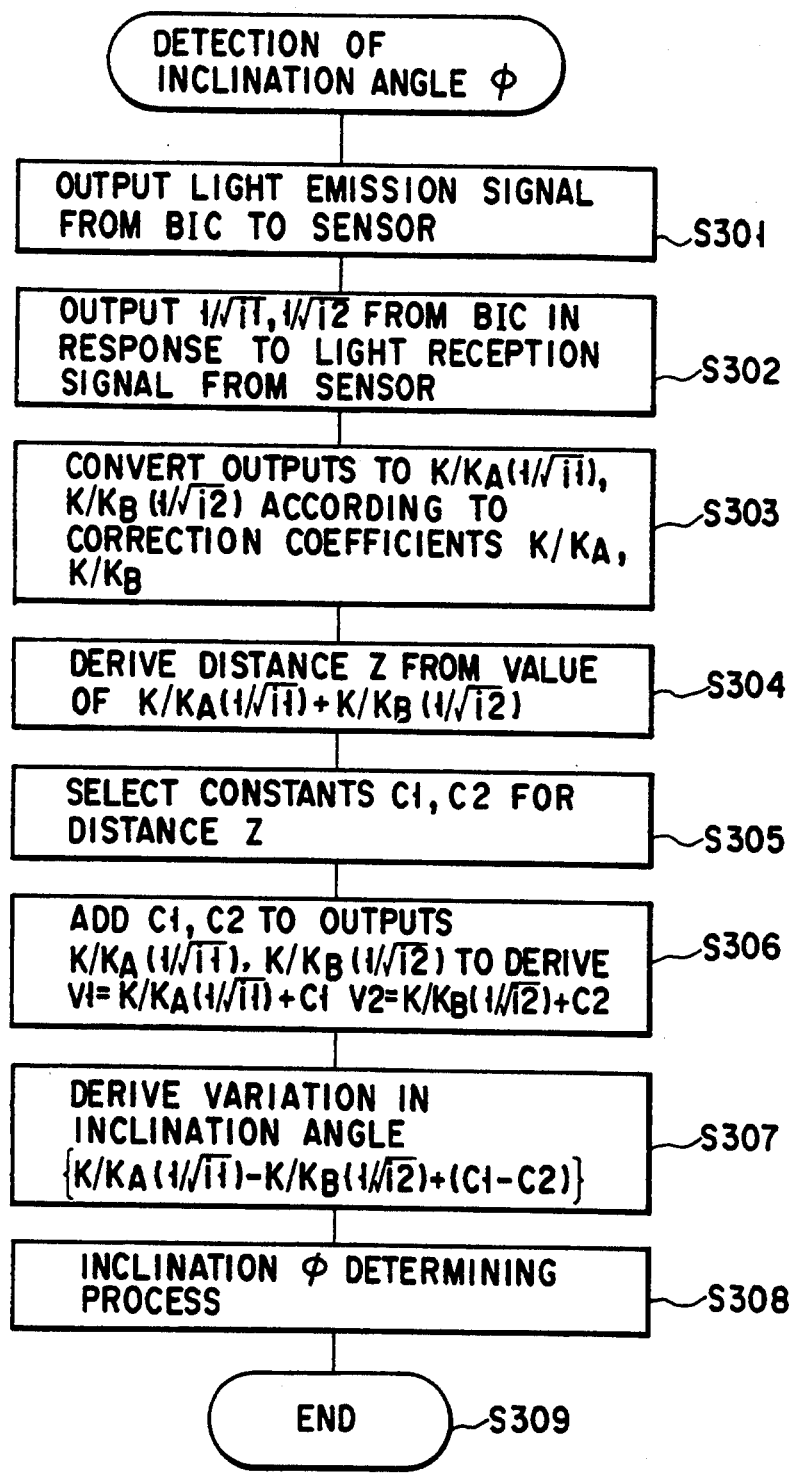
FIG. 49 is a flowchart for concretely illustrating a method of detecting an absolute angle $\phi$.

Next, a detection method for an absolute angle $\phi$ is explained in detail with reference to the flowchart shown in FIG. 49.

When a light emission signal is output from the BIC 212 to the sensor 211 (step S301), the BIC 212 receives a light reception signal from the sensor 211 and an output value expressed by the equation (2) is derived (step S302). Then, the CPU 213 converts the output value to a corrected value indicated by the equation (3) by use of the correction coefficients $k/k_A$, $k/k_B$ stored in the EEPROM 214 (step S303). Then, the distance Z can be calculated by deriving the corrected output values (step S304).

The corrected output values of the inclinations $k_A$, $k_B$ does not always coincide with the output value of the standard inclination k. That is, in some cases, the corrected output values of the inclinations $k_A$, $k_B$ are shifted in the upward or downward direction with respect to the respective characteristic curves of the inclination k.

For example, the range thereof can be expressed by the following equation (10) when $k_A < k < k_B$ or by the following equation (11) when $k_B < k < k_A$.

$$\left.\begin{array}{l} k\left(\frac{1}{\sqrt{i_1}}\right) < \frac{k}{k_A}\left(\frac{1}{\sqrt{i_1}}\right) \\ \frac{k}{k_B}\left(\frac{1}{\sqrt{i_2}}\right) < k\left(\frac{1}{\sqrt{i_2}}\right) \end{array}\right\} \tag{10}$$

$$\left.\begin{array}{l} \frac{k}{k_A}\left(\frac{1}{\sqrt{i_1}}\right) < k\left(\frac{1}{\sqrt{i_1}}\right) \\ k\left(\frac{1}{\sqrt{i_2}}\right) < \frac{k}{k_B}\left(\frac{1}{\sqrt{i_2}}\right) \end{array}\right\} \tag{11}$$

Therefore, it is only necessary to shift $V_1$, $V_2$ by a preset amount in order to set the characteristic curves of the inclinations after correction shown in FIGS. 39 and 40 to be coincident with the characteristic curve of the standard inclination k. Therefore, constants $C_1$, $C_2$ for the distance Z are selected (step S305) and added to the corrected output values expressed by the equation (3) to derive the following equations (12), (13) (step S306).

$$V_1 = \frac{k}{k_A}(1/\sqrt{i_1}) + C_1 \tag{12}$$

-continued $$V_2 = \frac{k}{k_B}(1/\sqrt{i_2}) + C_2 \tag{13}$$

The constants $C_1$, $C_2$ in the equations (12), (13) indicate shift amounts for the characteristic curve of the standard inclination.

For example, in the cases of FIGS. 39, 40, since it is only necessary to derive the average of the output values at the nine points of the inclination angles ($\phi = -8, -6, -4, -2, 0, +2, +4, +6, +8$ deg.) for each of the parameters of the distance Z, the values ($C_1$, $C_2$) can be easily obtained by using the following equations (14), (15).

$$C_1 = \frac{\{V_{1S(\phi=+8)} - V_{1(\phi=+8)}\}_{Z=n} + \cdots + \{V_{1S(\phi=-8)} - V_{1(\phi=-8)}\}_{Z=nmV}}{9} \tag{14}$$

$$C_2 = \frac{\{V_{2S(\phi=+8)} - V_{2(\phi=+8)}\}_{Z=n} + \cdots + \{V_{2S(\phi=-8)} - V_{2(\phi=-8)}\}_{Z=nmV}}{9} \tag{15}$$

where n indicates a parameter value 30, 35, 40, 45, or 50, and $V_{1S}$, $V_{2S}$ indicate output values of the standard inclination for each of the parameters of the distance Z.

When the output values $V_{1S}$ and $V_{2S}$ of the standard inclination k for the inclination angle $\phi = 0$ deg. at the time of $Z = 40$ mm are set to $V_{1S} = V_{2S} = 2000$ mV in an actual case, the constants $C_1$, $C_2$ are set to $C_1 = 265$ mV, $C_2 = 384$ mV.

Thus, the constants $C_1$, $C_2$ for the respective parameters are determined, but the outputs $V_1$ and $V_2$ at the time of $Z = 40$ mm are expressed by the following equations (16), (17).

$$V_1 = \frac{30}{35}\left(\frac{1}{\sqrt{i_1}}\right) + 265 \text{ mV} \tag{16}$$

$$V_2 = \frac{30}{24}\left(\frac{1}{\sqrt{i_2}}\right) - 385 \text{ mV} \tag{17}$$

Figure 44:
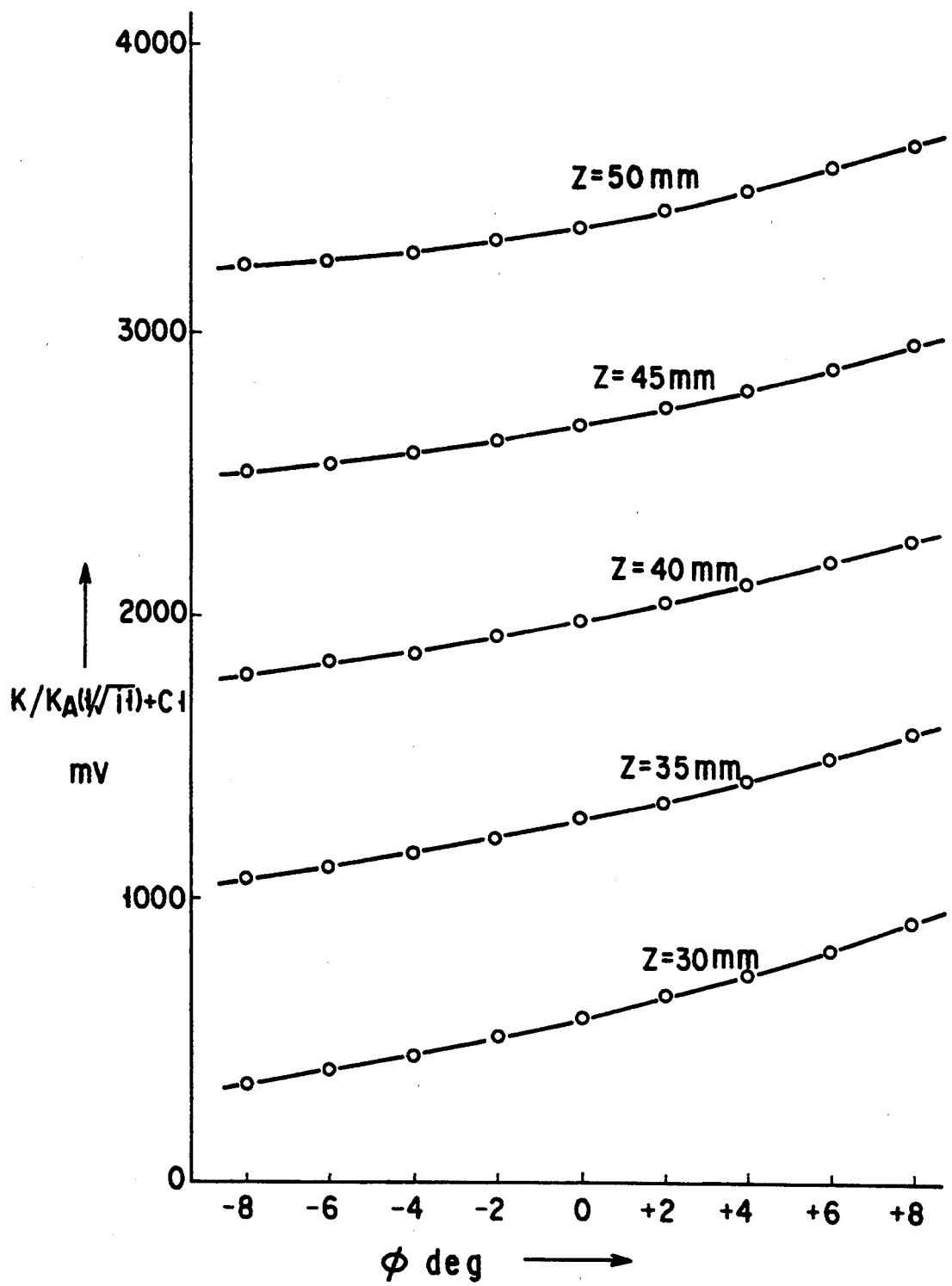
FIG. 44 is a diagram showing the relation between the inclination angle $\phi$ [deg] and an output value after correction.
Figure 45:
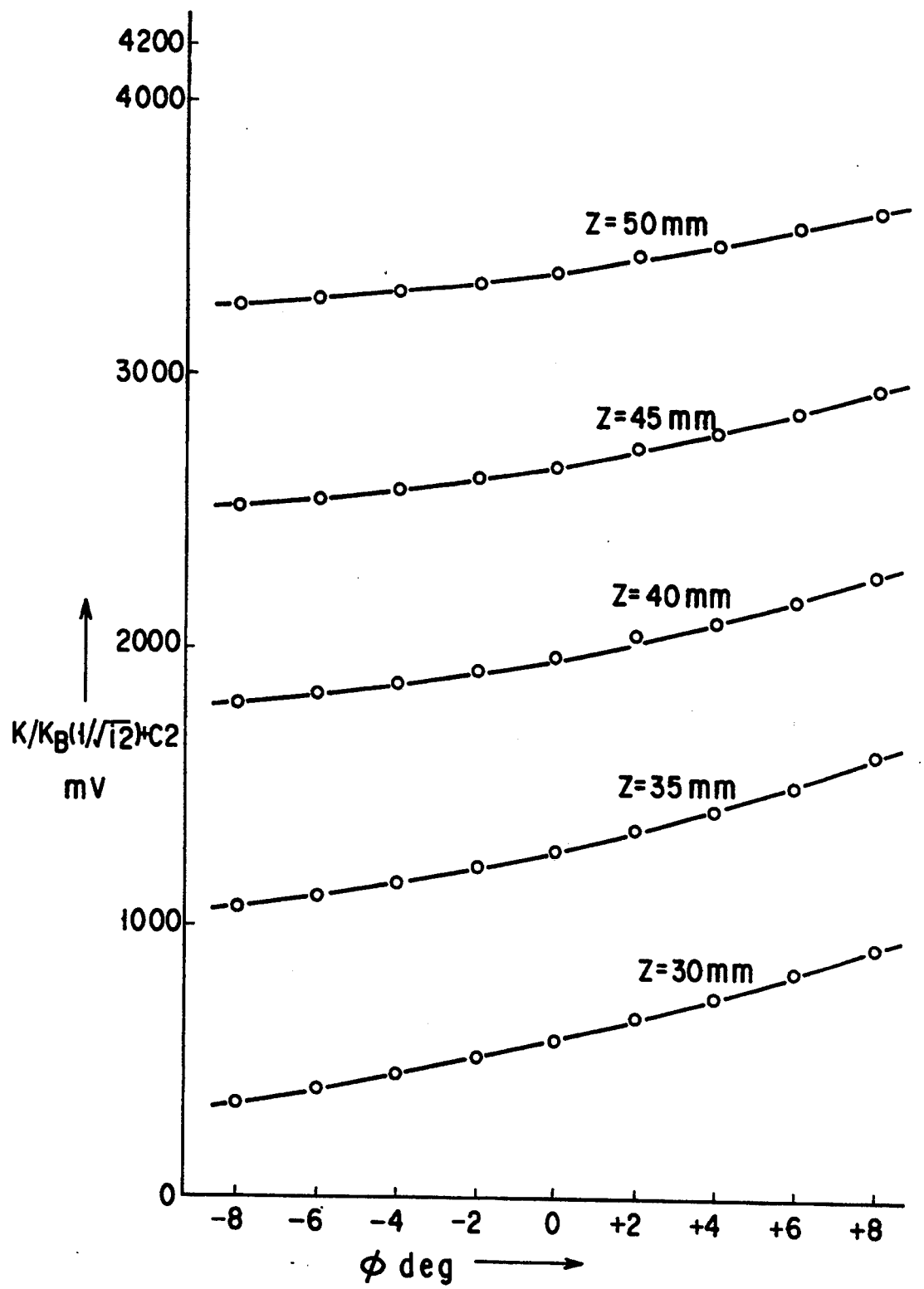
FIG. 45 is a diagram showing the relation between the inclination angle $\phi$ [deg] and an output value after correction.

FIGS. 44 and 45 are diagrams indicating output values expressed by the equations (12), (13) derived by means of the correcting section. In this case, $C_1$, $C_2$ are determined for the respective distances with the distance Z used as parameters. By applying the constants $C_1$, $C_2$, the outputs $V_1$, $V_2$ obtained with the respective distances Z used as parameters are substantially coincident with the characteristic curve of the standard inclination k so that several tens of constants $C_1$, $C_2$ can be automatically changed according to the distance Z if the constants $C_1$, $C_2$ for a variation in the absolute distance $Z_A$ are previously stored in the EEPROM 214.

In this case, the detection precision of the inclination angle $\phi$ becomes higher with an increase in the number of switching points of $C_1$, $C_2$.

Figure 46:
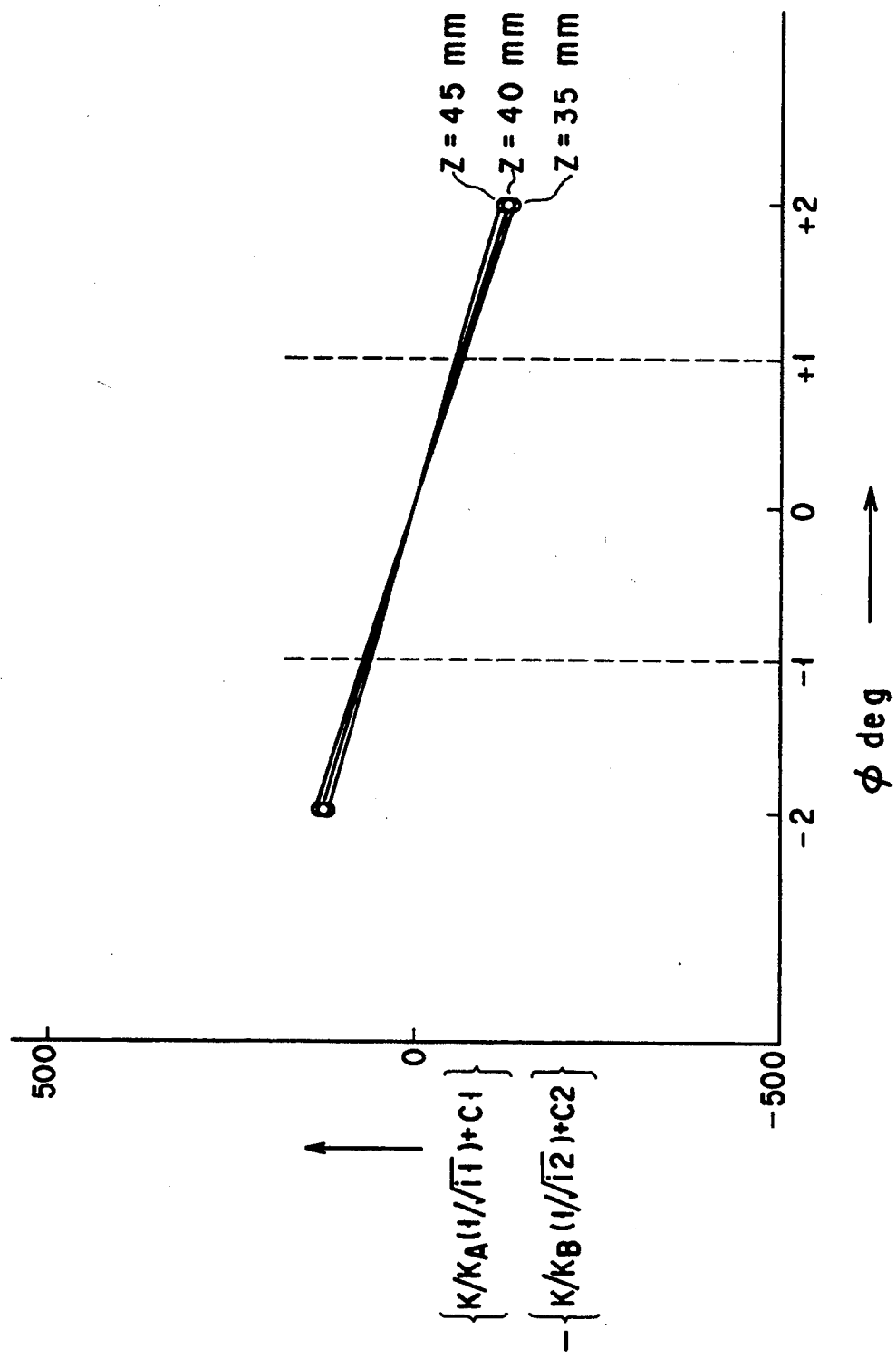
FIG. 46 is a diagram showing the relation between the inclination angle $\phi$ [deg] and a difference between output values after correction.

In the case of shake detection of the camera, if the dynamic range of the distance Z is set to 10 mm, then a difference shown in FIG. 46 can be obtained. That is, if the distance is set in the range of 35 to 45 mm, the range of the inclination angle $\phi = \pm 2.0$ deg. can be derived according to a variation in the inclination angle expressed by the following equation (18) in the same manner as in the case of FIG. 41 since it is only necessary to detect an inclination angle of $\phi = \pm 1.0$ deg. with high precision (step S307).

$$\frac{k}{k_A}\left(\frac{1}{\sqrt{i_1}}\right) - \frac{k}{k_B}\left(\frac{1}{\sqrt{i_2}}\right) - (C_1 + C_2) \tag{18}$$

At this time, several tens of constants $C_1$ and $C_2$ are averages of output values on three points of $\phi = -2, 0, +2$ deg, and outputs $V_1$ and $V_2$ obtained when $Z = 40$ mm are respectively expressed by the following equations (19) and (20) and $C_1$ and $C_2$ are respectively expressed by the following equations (21) and (22).

$$V_1 = \frac{30}{35}\left(\frac{1}{\sqrt{i_1}}\right) + 281 \text{ mV} \tag{19}$$

$$V_2 = \frac{30}{24}\left(\frac{1}{\sqrt{i_2}}\right) - 364 \text{ mV} \tag{20}$$

$$C_1 = \frac{\{1940 - 1662\}_{Z=40} + \{2000 - 1716\}_{Z=40} + \{2060 - 1779\}_{Z=40}}{3} \tag{21}$$
$$= 281 \text{ mV}$$

$$C_2 = \frac{\{2060 - 2436\}_{Z=40} + \{2000 - 2355\}_{Z=40} + \{1940 - 2303\}_{Z=40}}{3} \tag{22}$$
$$= 364 \text{ mV}$$

Likewise, $C_1$, $C_2$ for $Z = 35, 45$ can be obtained.

After the inclination angle $\phi$ is thus determined (step S308), the entire operation is completed (step S309).

As described above, since the shift amount of the output for each parameter can be suppressed to 0 by the above correction and a variation in the inclination angle $\phi$ can be expressed by substantially a single characteristic curve, the absolute value of the inclination angle $\phi$ can be directly derived from the output value.

The first aspect of the second embodiment of this invention has been described, but a correction method effected when the reflection factor of the reflection surface is different from a standard reflection factor is explained as a second aspect of the second embodiment.

In the first aspect of the second embodiment, the correction is effected under a condition that the reflection factor of the object is constant. However, in the practical case, the reflection factor cannot be constant and some correction means must be used.

Therefore, in the second aspect of the second embodiment, modes in each of which the reflection factor of the object is selectively set into one of a plurality of divided ranges are provided and one of the modes is previously set for each case.

For example, the reflection factor is divided into three ranges, one of the three modes including a first mode (large reflection factor: $\rho B$), second mode (medium reflection factor: $\rho M$) and third reflection factor: $\rho S$) is previously selected.

Figure 50:
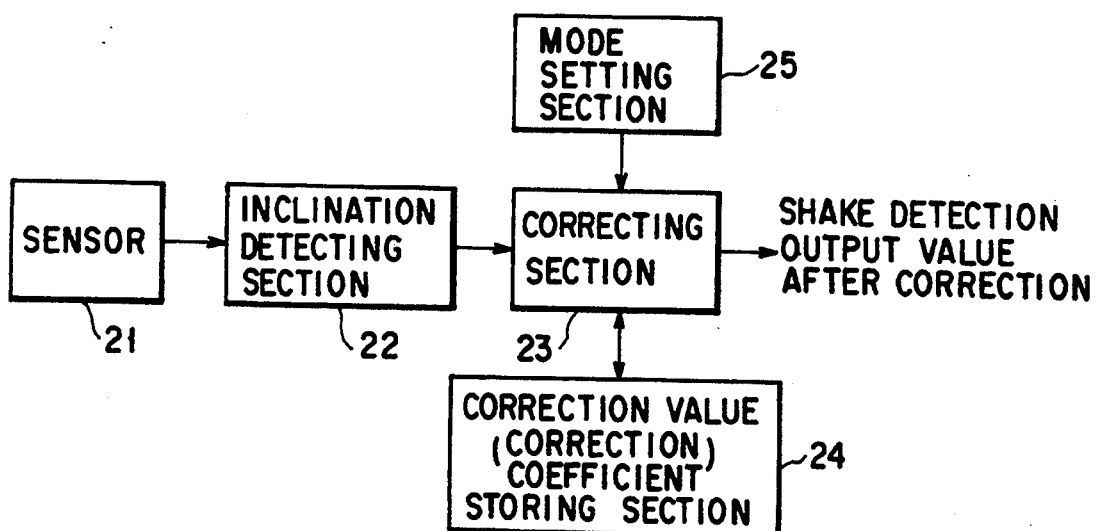
FIG. 50 is a diagram showing the construction of an inclination detecting apparatus according to a second aspect of the second embodiment of this invention.

FIG. 50 is a diagram showing the construction of an inclination detecting apparatus according to the second aspect of the second embodiment.

As shown in FIG. 50, a sensor 21, inclination detecting section 22, correcting section 23, and correction value (correction coefficient) storing section 24 are connected in the same manner as in the construction of FIG. 33, and a reflection factor correction coefficient of a mode setting section 25 for setting a mode according to the reflection factor is input to the correcting section 23.

Figure 51:
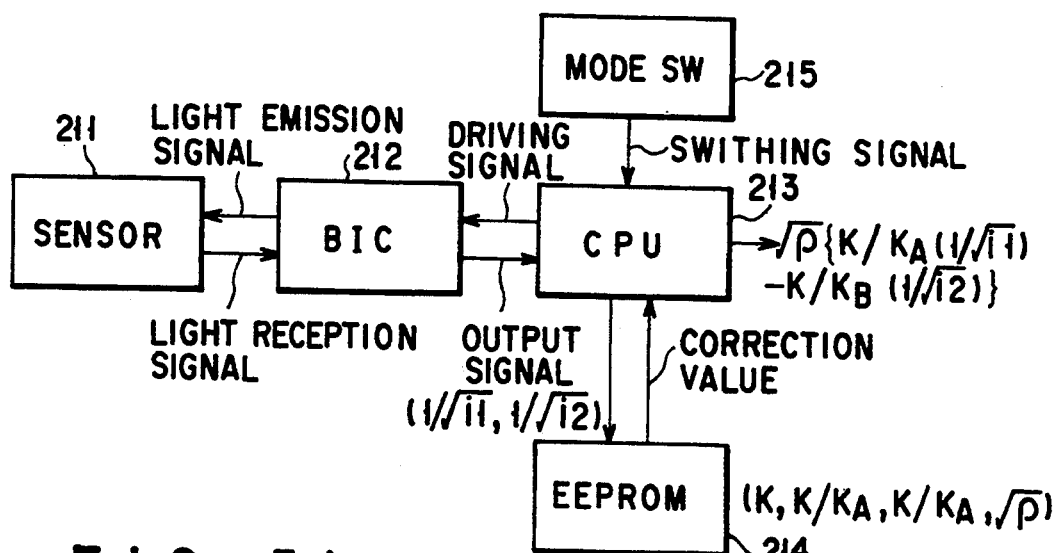
FIG. 51 is a diagram showing the detail construction of the inclination detecting apparatus according to the second aspect of the second embodiment of this invention.

FIG. 51 is a block diagram showing the detail construction of the second aspect of the second embodiment.

As shown in FIG. 51, a sensor 211, BIC 212, CPU 213, and EEPROM are connected in the same manner as in the construction of FIG. 34, and a mode SW 215 for setting a mode according the reflection factor is connected to the CPU 213.

With the above construction, if the reflection factor of the object is $\rho$, the sensitivities of the light receiving sections $CL_1$, $CL_2$ are $k_1$, $k_2$, and ideal photoelectric currents $I_1$, $I_2$ of the light receiving sections $CL_1$, $CL_2$, the following equations can be obtained.

$$i_1 = \rho k_1 I_1, \quad i_2 = \rho k_2 I_2 \tag{23}$$

At this time, since an ideal output can be obtained by deriving the value expressed by the equation (1'), the following equation (24) can be derived by substituting $I_1$, $I_2$ into the equation (1').

$$\frac{1}{\sqrt{I_1}} - \frac{1}{\sqrt{I_2}} = \sqrt{\rho}\left(\sqrt{k_1}\,\frac{1}{\sqrt{i_1}} - \sqrt{k_2}\,\frac{1}{\sqrt{i_2}}\right) \tag{24}$$

If coefficients $\sqrt{k_1}$, $\sqrt{k_2}$ are set to such values that the equation (24) can be rewritten as the following equation (25) when the inclination angle $\phi=0$, then the influence by the distance can be cancelled.

$$\frac{1}{\sqrt{I_1}} - \frac{1}{\sqrt{I_2}} = 0 \tag{25}$$

Thus, the influence of the reflection factor increases with a square root of $\rho$. Therefore, the influence of the reflection factor can be suppressed to minimum by adequately selecting the reflection factor of the mode (large reflection $\rho B$, medium reflection factor $\rho M$, small reflection factor $\rho S$) by use of the mode setting section 25.

The values of the square roots of $\rho B$, $\rho M$, $\rho S$ may be stored in the correction value storing section 24, and this can be easily attained by using a memory element such as an EEPROM or RAM.

Now, the hand shake detection of the camera is considered. When it is applied to the hand shake detection of the camera, the reflection factor $\rho$ becomes different depending on the skin of the photographer since the reflection light from the face of the photographer is used as is described in the first embodiment.

Therefore, a method of setting the reflection factor according to the skin color "white", "black" or "yellow" of the user is considered. In this case, it is only necessary to select "white", "black" or "yellow" by use of a mode SW or the like and set a corresponding reflection factor by use of a microcomputer provided in the camera.

As described above, in both of the first and second embodiments, the inclination detecting section 2 is disposed between the correcting section 3 and the sensor 1 to convert the photoelectric current of the sensor 1 into an inclination angle $\phi$.

One of the functions of the inclination detecting section 2 is to convert a light reception signal (photoelectric currents $i_1$, $i_2$ of the light receiving sections $CL_1$, $CL_2$) of the sensor 21 into an output signal which is indicated by the equation (2) and can be easily processed by the CPU 213 as shown in FIGS. 34 and 51.

The process for calculating the output signal is described in detail in the first embodiment and the explanation therefor is omitted here, but in general, when the arithmetic operation using square roots is partly effected in an analog manner, the arithmetic operation may be effected in an extremely simplified manner and at a high speed in comparison with the digital operation process.

By taking the above fact into consideration in the shake detection operation in this embodiment, the operation of the square root is effected by the BIC 212 and the post-process such as multiplication and addition is effected in a digital manner by the CPU 213.

However, when the high operation speed is not strongly required, the circuit construction can be made simple and it is convenient for interface when the entire operation is effected in a digital manner.

Figure 52:
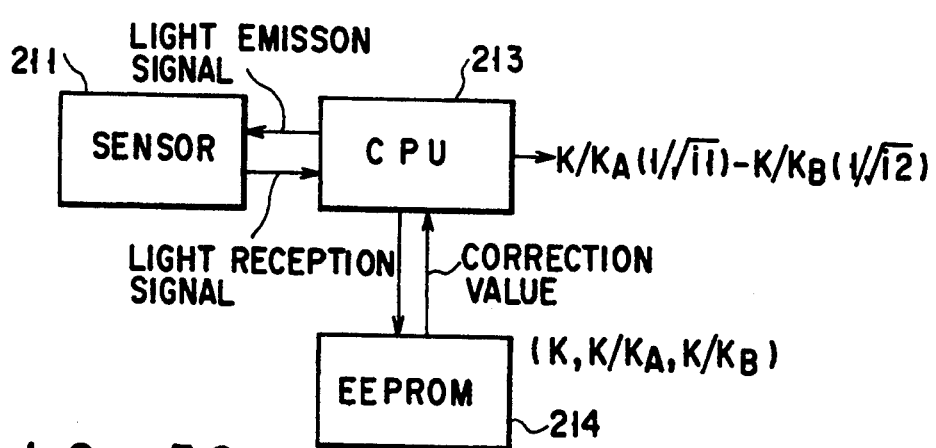
FIG. 52 is a diagram showing the construction of an improved example in which a light reception signal of a sensor 211 of FIG. 34 is directly subjected to the A/D conversion by use of a CPU 13 to detect an inclination angle $\phi$.
Figure 53:
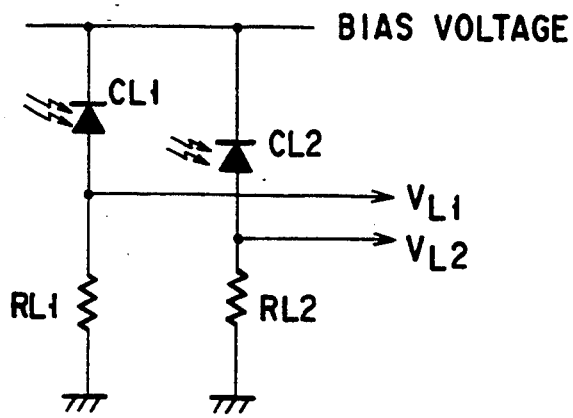
FIG. 53 is a diagram showing the detail construction of the improved example.

For example, FIG. 52 is a diagram showing the construction which is improved to directly convert the light reception signal of the sensor 211 of FIG. 34 to a digital signal by the CPU 213 and derive an inclination angle $\phi$ indicated by the following equation (26).

$$\phi = \left\{ \frac{k}{k_A}\left(\frac{1}{\sqrt{i_1}}\right) - \frac{k}{k_B}\left(\frac{1}{\sqrt{i_2}}\right) \right\} \tag{26}$$

The photoelectric currents of the light receiving sections $CL_1$ and $CL_2$ are converted to terminal voltages $V_{L1}$ and $V_{L2}$ of resistors $R_{L1}$ and $R_{L2}$ and converted to digital values by the A/D converter of the CPU 213. Therefore, extremely simple shake detection can be attained by adding the operation of the equation (2) to the function of the CPU 213.

As described above, the inclination detecting apparatus of this invention calculates inclinations $k_A$, $k_B$ based on output characteristics obtained by actual measurement and corrects the actually measured output characteristics with respect to the output characteristic of the standard inclination k. Then, the inclinations of the corrected output characteristics are set to $k/k_A$, $k/k_B$ and the output values are indicated by the expression (3). At this time, the reflection factor is regarded as being constant.

Further, a variation in the distance for unit of time can be detected and the distance can be cancelled according to a difference between the detection value of variation in the inclination and the detection value of variation in the distance by monitoring a variation in the total sum of the values indicated by the expression (3).

As described above, according to the second embodiment of this invention, an inclination detecting apparatus having a simple construction and capable of correcting variations in the output characteristics of a plurality of sensors by effecting simple calculations can be provided.

In the hand shake detecting camera of the first embodiment, the inclination between the object which is an reflection surface and the camera is detected by use of the sensor. That is, the sensor detects the inclination between the reflection surface and the sensor by deriving currents of the two light receiving elements according to lights projected from the light emitting element and reflected from the reflection surface and deriving a difference between reciprocals of the square roots of the output photoelectric currents.

The above sensor for detecting the inclination detects the inclination in one-axial direction which is one of the x and y directions by use of one light emitting element and two light receiving elements. However, when it is required to detect inclinations in the two axial directions of x and y, two series of the above inclination sensors must be provided.

Figure 54:
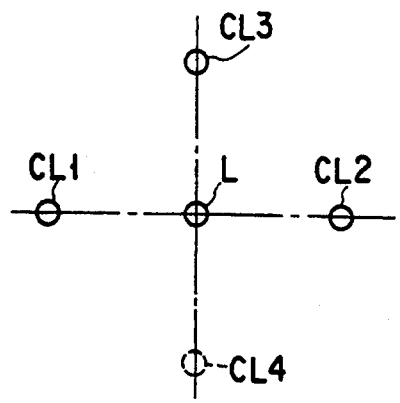
FIG. 54 is a diagram showing an example of the arrangement of light projecting and receiving elements.

In this case, the light emitting element can be commonly used and use of one light element is sufficient. However, as shown in FIG. 54, four light receiving elements including two light receiving elements $CL_3$ and $CL_4$ in addition to the light receiving elements $CL_1$ and $CL_2$ are provided around one light emitting element L. The light receiving elements $CL_1$ and $CL_2$ are set on a line which is perpendicular to a line on which the light receiving elements $CL_3$ and $CL_4$ are disposed.

Next, a third embodiment of this invention improved by taking the above problem into consideration is explained.

First, the outline of the third embodiment is explained. A two-axial inclination sensor according to the third embodiment of this invention includes a light projecting element, and first, second and third light receiving elements for receiving light projected from the light projection element and reflected from a reflection surface, the third light receiving element and the light projecting element are arranged on a perpendicular passing an intermediate point between the first and second light receiving elements, the inclination of the first axial direction with respect to the reflection surface is detected based on photoelectric currents of the first and second light receiving elements, and the inclination of the second axial direction which is perpendicular to the first axial direction with respect to the reflection surface is detected based on currents associated with the photoelectric currents of the first and second light receiving elements and a photoelectric current of the third light receiving element.

That is, the two-axial inclination sensor according to the third embodiment of this invention includes the light projecting element for projecting light to the reflection surface and the three light receiving elements for receiving light projected from the light projecting element and reflected from the reflection surface. The three light receiving elements are arranged such that the third light receiving element is disposed on a perpendicular passing an intermediate point between the first and second light receiving elements and the light projecting element is also disposed on the perpendicular. The inclination of the first axial direction with respect to the reflection surface is detected based on the photoelectric currents of the first and second light receiving elements and the inclination of the second axial direction which is perpendicular to the first axial direction with respect to the reflection surface is detected based on currents associated with the photoelectric currents of the first and second light receiving elements and a photoelectric current of the third light receiving element.

The third embodiment of this invention is explained in detail with reference to the accompanying drawings.

Figure 55:
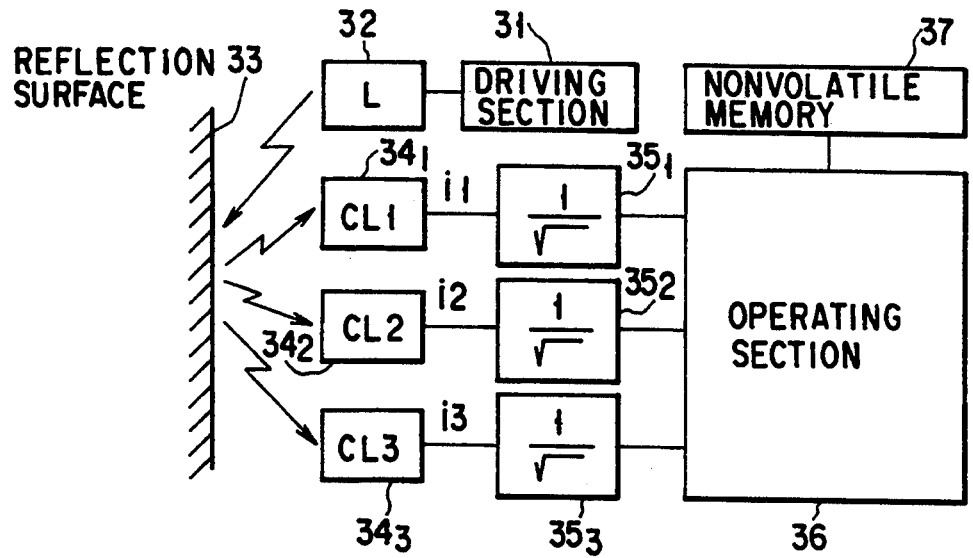
FIG. 55 is a block diagram showing the construction of a two-axial inclination sensor according to a third embodiment of this invention.

FIG. 55 is a block diagram showing the construction of a two-axial inclination sensor according to the third embodiment of this invention. The construction of this embodiment is similar to that of the second embodiment except that a light receiving element $CL_3$ and circuits for deriving the reciprocals of square roots are additionally provided.

That is, a light emitting element 32 is connected to a driving section 31 to project light on a reflection surface 33. The reflection light is received by light receiving elements $34_1$, $34_2$, $34_3$ whose outputs are supplied to an operating section 36 via reciprocal deriving circuits $35_1$, $35_2$, $35_3$ for deriving the reciprocals of square roots. A nonvolatile memory 37 stores preset coefficients calculated in the operating section 36.

With the two-axial inclination sensor of the above construction, the light emitting element 32 projects light to the reflection surface 33 in response to a driving signal from the driving section 31. The light emitted from the light emitting element 32 and reflected from the reflection surface 33 are received by the three light receiving elements $34_1$, $34_2$, $34_3$. The lights received by the light receiving elements $34_1$, $34_2$, $34_3$ are converted into electrical signals and currents $i_1$, $i_2$, $i_3$ are obtained.

In the reciprocal calculating circuits $35_1$, $35_2$, $35_3$, reciprocals of the square roots of the respective currents $i_1$, $i_2$, $i_3$ are calculated and the result of calculation is supplied to the operating circuit 36. In the operating circuit 36, the above result of calculation is multiplied by a preset correction operating coefficient stored in the nonvolatile memory 37 to derive an inclination angle.

Figure 56:
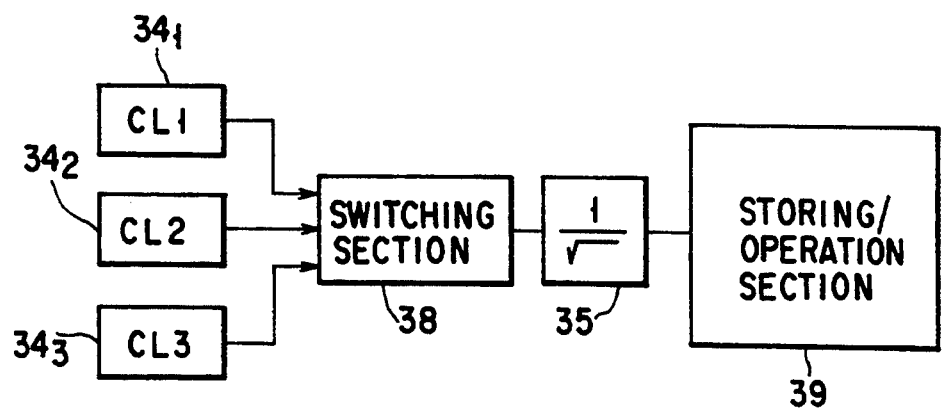
FIG. 56 is a block diagram showing another construction of the two-axial inclination sensor according to the third embodiment of this invention.

FIG. 56 shows an example in which a single reciprocal calculating circuit is commonly used instead of the reciprocal calculating circuits of FIG. 55 to sequentially process outputs of $CL_1$, $CL_2$, $CL_3$ supplied via a switching circuit. That is, lights are received by the light receiving elements $34_1$, $34_2$, $34_3$ and converted to photoelectric currents which are selected by the switching section 38 and supplied to the reciprocal calculating circuit 35 for deriving the reciprocal of the square root of an input. The result of preset calculation in the reciprocal calculating circuit 35 is processed by and stored into a storing/operating section 39.

As described in the second embodiment, the operations of the above circuit sections can be effected by use of an analog circuit, digital circuit or microcomputer.

Next, the principle of detecting inclinations in two axial directions by use of three light receiving elements in the two-axial inclination sensor according to the third embodiment of this invention is explained.

Figure 57:
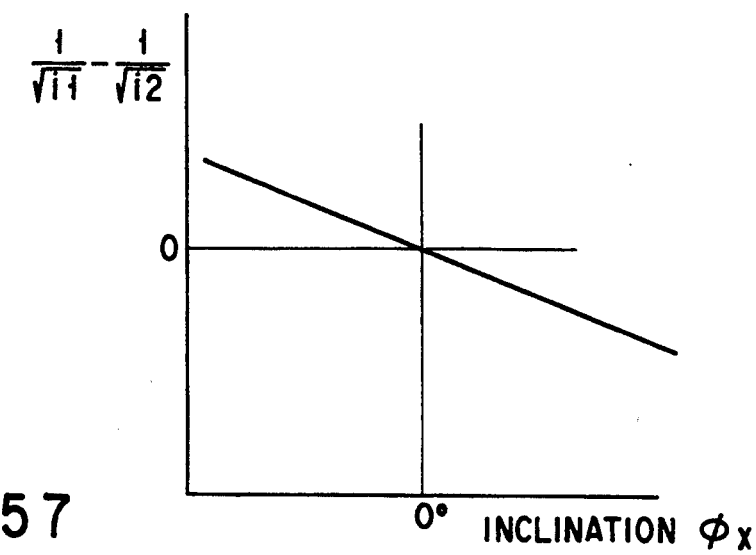
FIG. 57 is a characteristic diagram showing the relation between the inclination angle of the sensor and an inclination output.

First, for simplifying the explanation, a case wherein there occurs no variation in the sensitivity of the sensor and no mounting error (L, $CL_1$, $CL_2$ are used) is considered. Then, an inclination output expressed by the following expression (27) becomes constant irrespective of the distance Z between the sensor and the reflection surface as shown in FIG. 57.

$$\frac{1}{\sqrt{i_1}} - \frac{1}{\sqrt{i_2}} \qquad (27)$$

Figure 58:
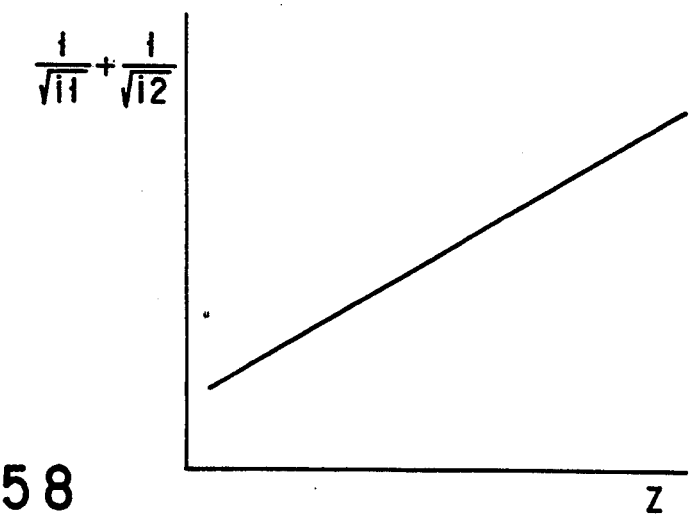
FIG. 58 is a characteristic diagram of a distance between the reflection surfaces of the light receiving elements $CL_1$ and $CL_2$.

Further, a value expressed by the following expression (28) varies in proportion to the distance Z between the sensor and the reflection surface as shown in FIG. 58.

$$\frac{1}{\sqrt{V_{i_1}}} + \frac{1}{\sqrt{V_{i_2}}} \quad (28)$$

If $CL_3$, $CL_4$ are disposed on a line perpendicular to a line on which $CL_1$, $CL_2$ are disposed as shown in FIG. 54, the distance Z between $CL_1$, $CL_2$ and the reflection surface and that between $CL_3$, $CL_4$ and the reflection surface are equal to each other and therefore the following equation (29) can be obtained.

$$\left(\frac{1}{\sqrt{V_{i_1}}} + \frac{1}{\sqrt{V_{i_2}}}\right) = \left(\frac{1}{\sqrt{V_{i_3}}} + \frac{1}{\sqrt{V_{i_4}}}\right) \quad (29)$$

The equation (29) can be rewritten as indicated by the following equation (30).

$$\frac{1}{\sqrt{V_{i_4}}} = \left(\frac{1}{\sqrt{V_{i_1}}} + \frac{1}{\sqrt{V_{i_2}}}\right) - \frac{1}{\sqrt{V_{i_3}}} \quad (30)$$

The inclination with respect to a direction perpendicular to a line on which $CL_1$, $CL_2$ are disposed can be expressed by the following expression (31).

$$\frac{1}{\sqrt{V_{i_3}}} - \frac{1}{\sqrt{V_{i_4}}} \quad (31)$$

By substituting the equation (30) into the expression (31) and using the outputs of $CL_1$, $CL_2$ instead of the output of $CL_3$, the inclination angle with respect to the direction perpendicular to the line on which $CL_1$, $CL_2$ are disposed can be derived as indicated by the following equation (32).

$$\frac{1}{\sqrt{V_{i_3}}} - \frac{1}{\sqrt{V_{i_4}}} = \frac{2}{\sqrt{V_{i_3}}} - \left(\frac{1}{\sqrt{V_{i_1}}} + \frac{1}{\sqrt{V_{i_2}}}\right) \quad (32)$$

In practice, as is disclosed in the second embodiment, the sensor is not ideal, the inclination angle is influenced by various variations.

Next, correction for variation in the sensor is described.

Figure 59:
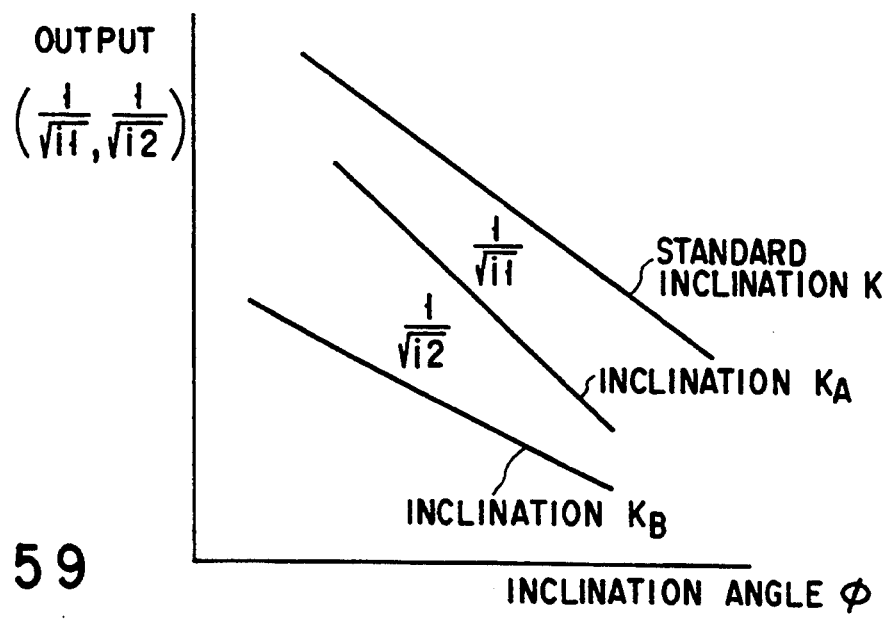
FIG. 59 is a characteristic diagram showing the relation between the inclination angle of the sensor and an inclination output.

As shown in FIG. 59, values expressed by the following expressions (33) and (34) are set to correspond to the standard inclination k. That is, the inclination output of the sensor is set to a value expressed by the expression (35).

$$\frac{1}{\sqrt{V_{i_1}}} \quad (33)$$

$$\frac{1}{\sqrt{V_{i_2}}} \quad (34)$$

$$\frac{k}{k_A} \cdot \frac{1}{\sqrt{V_{i_1}}} - \frac{k}{k_B} \cdot \frac{1}{\sqrt{V_{i_2}}} \quad (35)$$

The relation with the distance Z between the sensor and the reflection surface is derived by use of the correction coefficients $k_E$, $C_E$ according to the following equation (36).

$$V_{AE} = K_E V_E + C_E \quad (36)$$

$V_E$ is derived by use of the following equation (37) and substituted into the above equation (36).

$$V_E = \frac{k}{k_A} \cdot \frac{1}{\sqrt{V_{i_1}}} + \frac{k}{k_B} \cdot \frac{1}{\sqrt{V_{i_2}}} \quad (37)$$

Then, the distance Z is derived based on $V_{AE}$ by use of the conversion table shown in FIG. 60.

The following equation (38) can be obtained by rewriting the equation (32) according to the correction process using the above equations (35), (36), (37).

$$\frac{k}{k_C} \cdot \frac{1}{\sqrt{V_{i_3}}} - \frac{k}{k_D} \cdot \frac{1}{\sqrt{V_{i_4}}} = 2 \cdot \frac{k}{k_C} \cdot \quad (38)$$

$$\frac{1}{\sqrt{V_{i_3}}} - \frac{k}{k_D} \left\{ K_E \left( \frac{k}{k_A} \cdot \frac{1}{\sqrt{V_{i_1}}} + \frac{k}{k_B} \cdot \frac{1}{\sqrt{V_{i_2}}} \right) + C_E \right\}$$

The above equation (38) can be expressed by the following expression (39) by standardizing the coefficients.

$$2 \frac{k}{k_C} \frac{1}{\sqrt{V_{i_3}}} - \left\{ K \left( \frac{k}{k_A} \frac{1}{\sqrt{V_{i_1}}} + \frac{k}{k_B} \frac{1}{\sqrt{V_{i_2}}} \right) + C \right\} \quad (39)$$

In the above expression, K, C may be set to values such that the value indicated by the expression (39) is set to 0 or a standard value when the inclination is 0.

FIG. 61 is a flowchart for concretely illustrating the operation effected when reciprocals of the square roots of outputs of the light receiving elements $CL_1$, $CL_2$, $CL_3$ described in the second embodiment are derived and converted to voltages and the result of voltage conversion is fetched by the A/D conversion of the CPU. It is assumed that the results of voltage conversion for the values expressed by the above expressions (33), (34) and the following expression (40) are $V_1$, $V_2$, $V_3$.

$$\frac{1}{\sqrt{V_{i_3}}} \quad (40)$$

First, in the step S1, the light emitting element L is activated to emit light, and in the step S2, $V_1$, $V_2$, $V_3$ are read. After the data is read, the light emission of the light emitting element is interrupted for energy saving in the step S3. Then, in the step S4, the result of $(K_A V_1 - K_B V_2)$ is substituted into the inclination $\phi_1$. $K_A$, $K_B$ correspond to $k/k_A$, $k/k_B$.

Next, in the step S5, $(K_A V_1 + K_B V_2)$ is substituted into Z. After this, in the step S6, $\{2K_C V_3 - (KZ+C)\}$ is substituted into $\phi_2$. That is, the inclination outputs in the $CL_1$ and $CL_2$ directions are substituted into $\phi_2$ and the inclination output of the axis in the direction perpendicular to $\phi_1$ is substituted into $\phi_2$.

Figure 62:
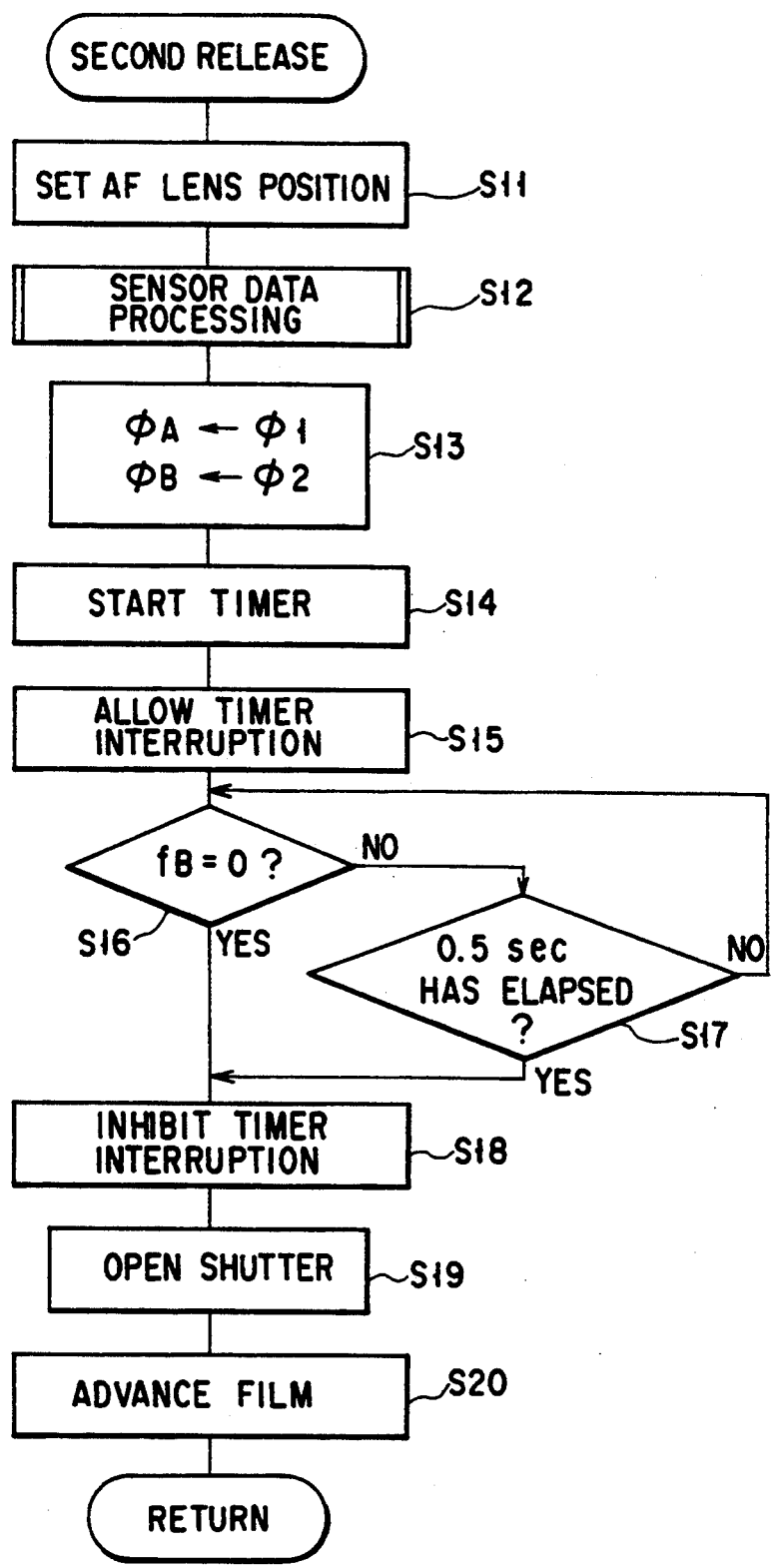
FIG. 62 is a flowchart for illustrating the second releasing operation for reducing easy hand shake of a camera.
Figure 63:
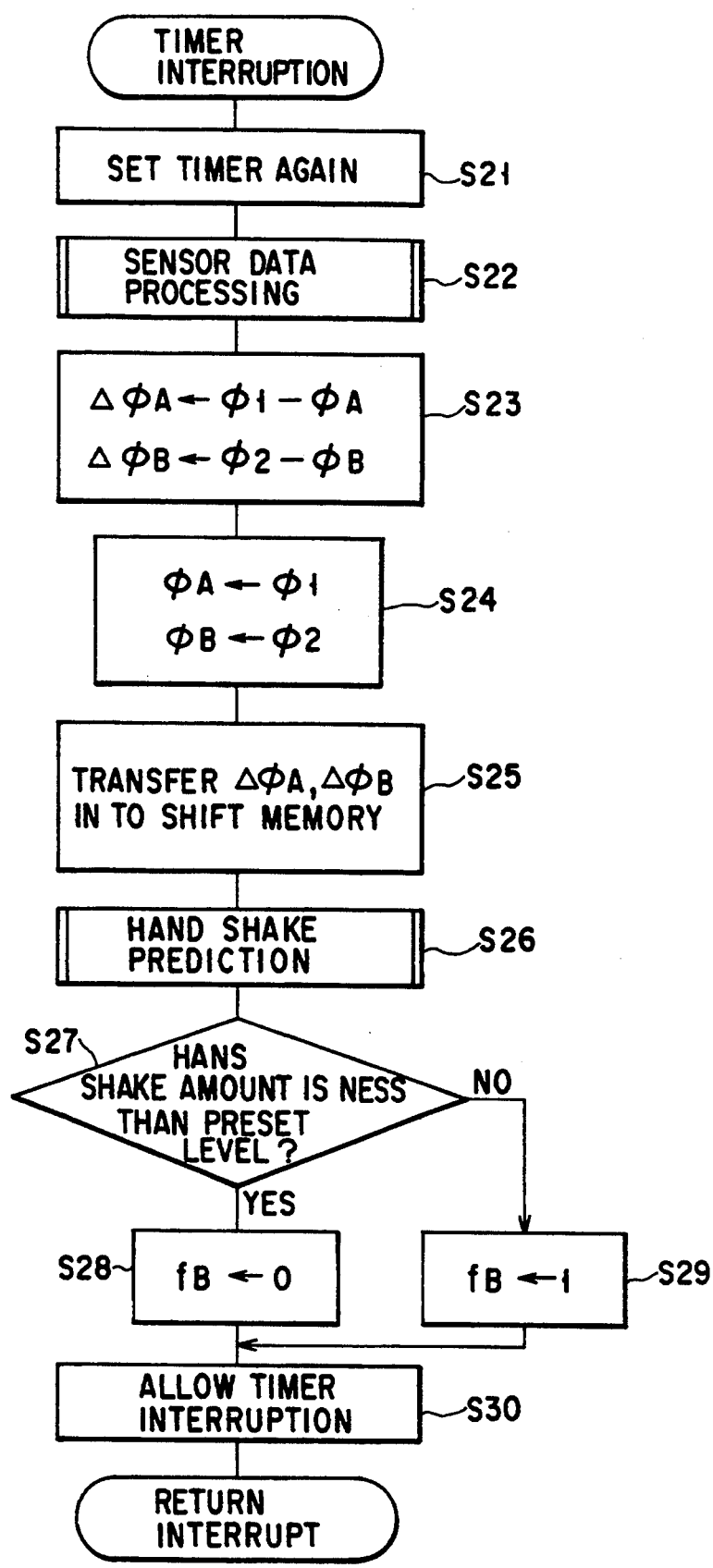
FIG. 63 is a flowchart for illustrating the timer interruption operation for reducing easy hand shake of a camera.

FIGS. 62 and 63 are flowcharts for reducing the hand shake of the camera by use of the sub-routine "sensor data processing" shown in FIG. 61.

FIG. 62 illustrates the operation of second release in the case of a compact camera used as an example.

First, when the second release is set ON, an AF lens is moved to a focused position and set into a wait state for opening of the shutter in the step S11. Then, in the step S12, the sub-routine "sensor data processing" is effected, and after this, the inclination outputs $\phi_1$, $\phi_2$ in the two axial directions are substituted into $\phi_A$, $\phi_B$ in the step S13.

Next, in the step S14, the timer is started, and then, the timer interruption is allowed in the stem S15. The timer interruption will be described later. Next, in the step S16, the inclination output is sampled at each preset time and a flag $f_B$ is set to "0" when the hand shake amount is suppressed to be less than a preset value. When $f_B$ is attained, the timer interruption is inhibited and the next step S18 is effected. It can also be considered that the hand shake will not be suppressed for a long time, and in this case, if $f_B$ is not set to "0" when 0.5 sec. has elapsed after the timer interruption occurred, the next step is effected.

In the step S18, the timer interruption is inhibited and the shutter is opened in the step S19. Then, in the step S20, the film is advanced and the second release sequence is completed.

FIG. 63 is a flowchart for illustrating the operation of timer interruption.

First, in the step S21, time to the next interruption is set again to measure an inclination output at every preset time. Next, in the step S22, an inclination output is derived in the sub-routine "sensor data processing".

In the case of hand shake, it is only necessary to detect a variation in the relative angle from the preceding value. Therefore, in the step S23, differences between the inclination outputs $\phi_1$, $\phi_2$ at the present time and the inclination outputs $\phi_A$, $\phi_B$ are derived and substituted into $\Delta\phi_A$, $\Delta\phi_B$. Then, in the step S24, the values $\phi_1$, $\phi_2$ are substituted into $\phi_A$, $\phi_B$ for the next operation. After this, in the step S25, $\Delta\phi_A$, $\Delta\phi_B$ are transferred into a shift memory and converted into time-series data.

Next, in the step S26, hand shake is predicted by using data in the shift memory. The method of hand shake prediction can be effected by use of the technique disclosed in U.S. patent application Ser. No. 951,307 filed by the same applicant, for example, and therefore, the explanation therefor is omitted here.

In the step S27, whether the hand shake amount is not more than a preset level or not is checked. Then, the flag f B is set to "0" or "1" in the step S28 or S29, respectively, according to the result of check. Then, in the step S30, the timer interruption is allowed and the interruption process is completed.

In the second embodiment described above, the calculation is effected according to the following equation (41) after outputs of the light receiving elements $CL_1$, $CL_2$ are corrected.

$$\frac{k}{k_A} \cdot \frac{1}{\sqrt{i_1}} - \frac{k}{k_B} \cdot \frac{1}{\sqrt{i_2}} \tag{41}$$

In the above correction, $K_X$, $C_X$ in the following equation (42) are used since the values of the expressions (33) and (34) vary linearly with the inclination angle $\phi$.

$$K_x\left(\frac{1}{\sqrt{i_1}} - \frac{1}{\sqrt{i_2}}\right) - C_x = \frac{k}{k_A} \frac{1}{\sqrt{i_1}} - \frac{k}{k_B} \frac{1}{\sqrt{i_2}} \tag{42}$$

Therefore, the inclination can be calculated by effecting the correction by use of $K_X$, $C_X$ after the value of the expression (27) is calculated. However, in the case of hand shake output, it is only necessary to detect the relative angle and a value expressed by the following expression (43) may be used as an inclination output ($C_X$ is not necessary).

$$K_x\left(\frac{1}{\sqrt{i_1}} - \frac{1}{\sqrt{i_2}}\right) \tag{43}$$

The relation with respect to the distance Z between the sensor and the reflection surface as indicated in FIG. 60 may be expressed by the following expression (44).

$$K_x\left(\frac{1}{\sqrt{i_1}} + \frac{1}{\sqrt{i_2}}\right) + C_2 \tag{44}$$

Figure 64:
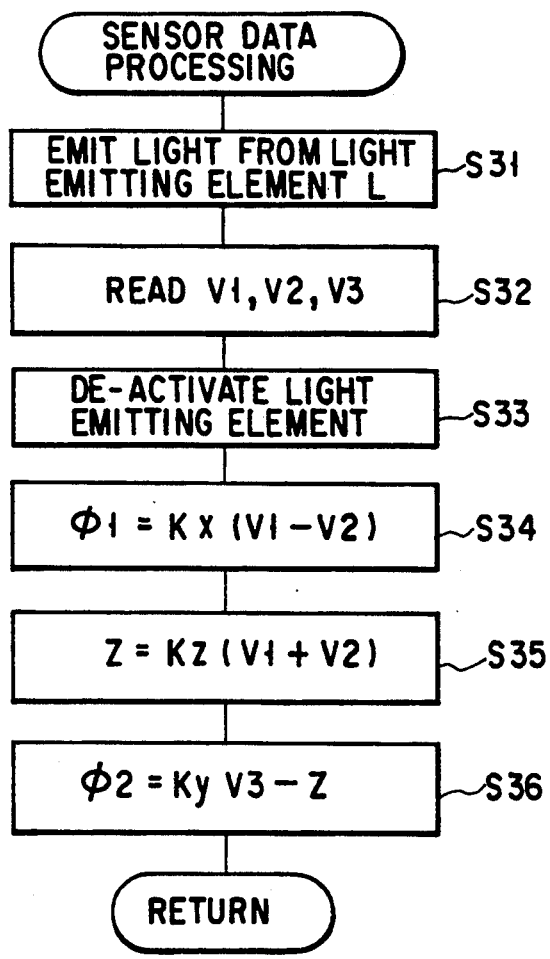
FIG. 64 is a flowchart for illustrating another example of the sensor data processing operation using the correction coefficient.

FIG. 64 is a flowchart for illustrating the operation of detecting inclinations in the two axial directions by applying the above correction process. The steps S31 to S33 in the flowchart of FIG. 64 are the same as the steps S1 to S3 of the flowchart of FIG. 61 and only the process of the step S34 and the succeeding steps is different, and therefore, the explanation for the process of the steps S31 to S33 is omitted.

In the step S34 of FIG. 64, a value obtained by multiplying $(V_1-V_2)$ by the correction coefficient $K_X$ is substituted into $\phi_1$. Next, in the step S35, a value obtained by multiplying $(V_1-V_2)$ by the correction coefficient $K_Z$ is substituted into Z. Further, in the step S36, $(K_yV_3-Z)$ is substituted into $\phi_2$.

In the flowchart of FIG. 61, a value corresponding to $K_y$ is $2K_c$, but this is permissible if information of double amount is contained in $K_y$. Further, a value corresponding to Z is KZ, but this is acceptable if information of k is contained in the correction coefficient $K_z$ for the Z calculation. In addition, various applications of the correction coefficient can be provided, but the explanation therefor is omitted here.

FIG. 64 is a flowchart for illustrating the operation of detecting the relative angle due to camera shake, but the absolute angle can be derived only by adding $C_x$, $C_y$ expressed by the following equations (45), (46) to the correction coefficients.

$$\phi_1 = K_x(V_1-V_2) + C_x \tag{45}$$

$$\phi_2 = K_yV_3 - Z + C_y \tag{46}$$

Next, an embodiment in which an analog circuit is used to effect the signal processing of the two-axial inclination sensor according to this invention is explained.

Figure 65:
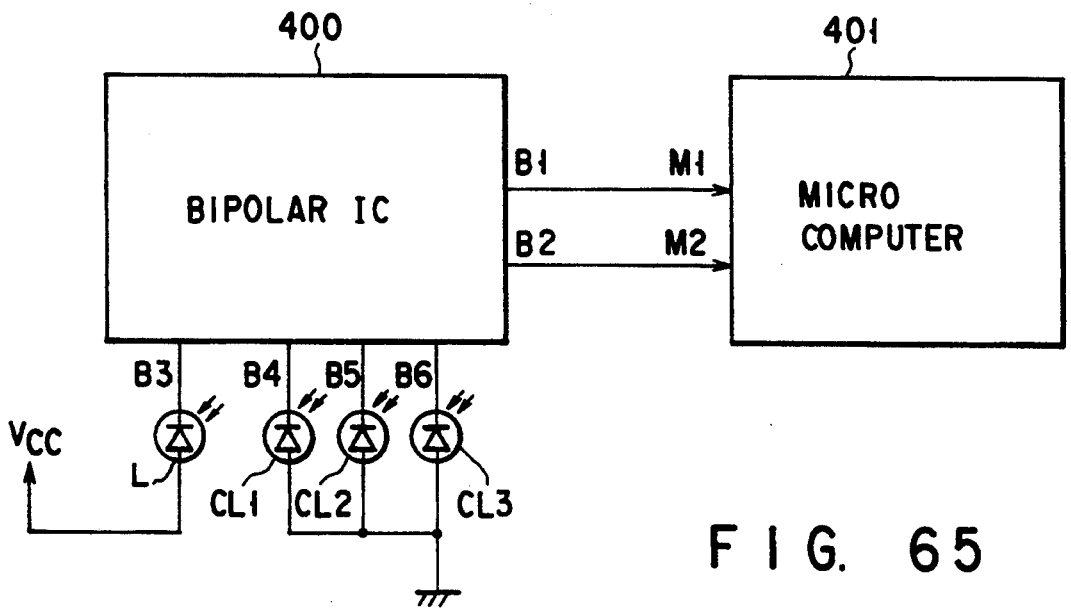
FIG. 65 is a block diagram showing the construction of a signal processing system formed of an analog circuit of the two-axial inclination sensor according to the third embodiment of this invention.

FIG. 65 is a block diagram showing the construction of a signal processing system of the two-axial inclination sensor. In FIG. 65, a bipolar IC 400 is used to effect the driving control and signal processing for a light emitting diode L, photodiodes $CL_1$, $CL_2$, $CL_3$. A microcomputer 401 subjects an analog signal from the bipolar IC 400 to the A/D conversion and detects the inclination degree of the reflection surface according to the result of A/D conversion.

Figure 66:
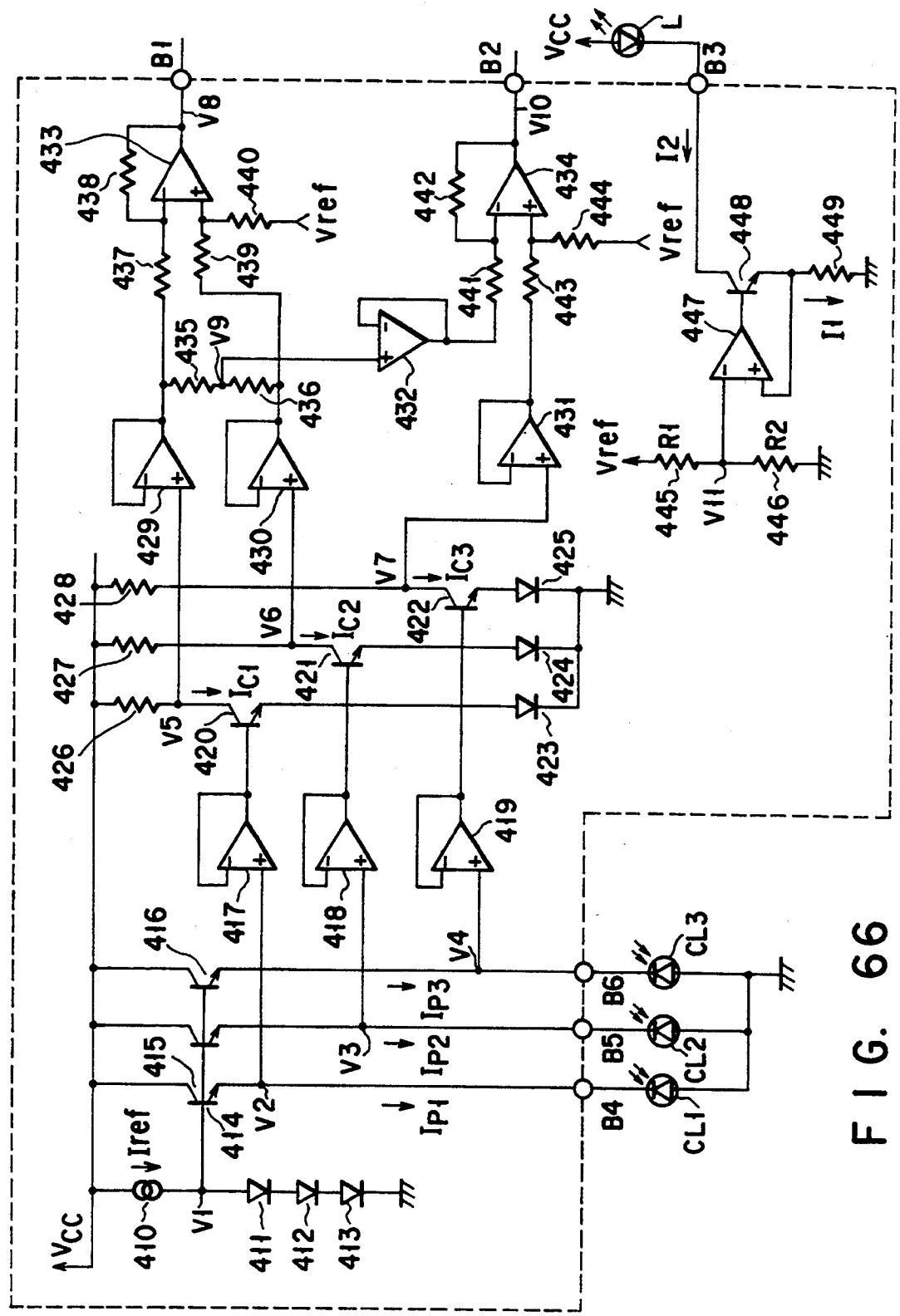
FIG. 66 is a circuit diagram showing the detail internal construction of a bipolar IC 100 shown in FIG. 65.

FIG. 66 is a circuit diagram showing the detail construction of the bipolar IC 400. In FIG. 66, 410 denotes a current source which supplies current $I_{ref}$. 411, 412, 413 denote diodes. The anode potential $V_1$ of the diode 411 is expressed by the following equation (47).

$$V_1 = 3V_T \ln \frac{I_{ref}}{I_S} \tag{47}$$

where $V_T = KT/q$ (K: Boltzmann's constant, T: absolute temperature, q: unit charge of electron) and $I_s$ is the reverse saturation current of a diode (or transistor).

The collectors of transistors 414, 415, 416 are connected to a power source $V_{cc}$ and the bases thereof are connected to a connection node between the current source 410 and the diode 411. Further, the emitters of the transistors 414, 415, 416 are respectively connected to terminals B4, B5, B6 and respectively connected to photodiodes $CL_1$, $CL_2$, $CL_3$ externally attached. With the above connection, photoelectric currents $I_{P1}$, $I_{P2}$, $I_{P3}$ generated in the photodiodes $CL_1$, $CL_2$, $CL_3$ flow into the emitters of the transistors 414, 415, 416. Therefore, the emitter potentials $V_2$, $V_3$, $V_4$ of the transistors 414, 415, 416 can be expressed by the following equations (48).

$$\left. \begin{array}{l} V_2 = V_1 - V_T \ln \dfrac{I_{P1}}{I_S} \\[6pt] V_3 = V_1 - V_T \ln \dfrac{I_{P2}}{I_S} \\[6pt] V_4 = V_1 - V_T \ln \dfrac{I_{P3}}{I_S} \end{array} \right\} \tag{48}$$

417, 418, 419 denote buffer amplifiers whose output voltages are equal to $V_2$, $V_3$, $V_4$ described above. Further, 420, 421, 422 denote transistors, and 423, 424, 425 denote diodes. When the collector currents of the transistors 420, 421, 422 are respectively $I_{c1}$, $I_{c2}$, $I_{c3}$, then the following equations (49) can be attained.

$$\left. \begin{array}{l} V_2 = 2V_T \ln \dfrac{I_{C1}}{I_S} \\[6pt] V_3 = 2V_T \ln \dfrac{I_{C2}}{I_S} \\[6pt] V_4 = 2V_T \ln \dfrac{I_{C3}}{I_S} \end{array} \right\} \tag{49}$$

The following equations (50) can be derived from the equations (47), (48), (49).

$$\left. \begin{array}{l} 3V_T \ln \dfrac{I_{ref}}{I_S} - V_T \ln \dfrac{I_{P1}}{I_S} = 2V_T \ln \dfrac{I_{C1}}{I_S} \\[6pt] 3V_T \ln \dfrac{I_{ref}}{I_S} - V_T \ln \dfrac{I_{P2}}{I_S} = 2V_T \ln \dfrac{I_{C2}}{I_S} \\[6pt] 3V_T \ln \dfrac{I_{ref}}{I_S} - V_T \ln \dfrac{I_{P3}}{I_S} = 2V_T \ln \dfrac{I_{C3}}{I_S} \end{array} \right\} \tag{50}$$

Therefore, the following equations (51) can be obtained.

$$\left. \begin{array}{l} I_{C1} = \dfrac{\sqrt{I_{ref}^3}}{\sqrt{I_{P1}}} \\[10pt] I_{C2} = \dfrac{\sqrt{I_{ref}^3}}{\sqrt{I_{P2}}} \\[10pt] I_{C3} = \dfrac{\sqrt{I_{ref}^3}}{\sqrt{I_{P3}}} \end{array} \right\} \tag{51}$$

Resistors 426, 427, 428 have the resistance R. Therefore, the collector potentials $V_5$, $V_6$, $V_7$ of the transistors 420, 421, 422 can be expressed by the following equations (52).

$$\left. \begin{array}{l} V_5 = V_{cc} - \dfrac{R\sqrt{I_{ref}^3}}{I_{P1}} \\[10pt] V_6 = V_{cc} - \dfrac{R\sqrt{I_{ref}^3}}{I_{P2}} \\[10pt] V_7 = V_{cc} - \dfrac{R\sqrt{I_{ref}^3}}{I_{P3}} \end{array} \right\} \tag{52}$$

That is, voltages occurring across the resistors 426, 427, 428 are voltages which vary in inverse proportion to the square roots of photoelectric currents generated in the sensor.

429, 430, 431 denote buffer amplifiers, and 433 denotes a differential amplifier. The amplification factor of the differential amplifier 433 is determined by resistors 437 to 440. Therefore, an output of the differential amplifier 433, that is, the output voltage $V_8$ at the terminal $B_1$ can be expressed by the following equation (53).

$$V_8 = (V_6 - V_5)A + V_{ref} \tag{53}$$

$$= \left( \frac{1}{\sqrt{I_{P1}}} - \frac{1}{\sqrt{I_{P2}}} \right) A \cdot R \cdot \sqrt{I_{ref}^3} + V_{ref}$$

where A denotes an amplification factor determined by the resistors 437 to 440. $V_8$ becomes a voltage which corresponds to the inclination angle of the axial direction connecting the sensors of the light receiving elements $CL_1$ and $CL_2$ shown in FIG. 54.

The resistors 435 and 436 have the same resistance and a voltage on a connection node between them can be expressed by the following equation (54).

$$V_9 = \tfrac{1}{2}(V_5 + V_6) \tag{54}$$

$$= V_{CC} - \tfrac{1}{2} R \sqrt{I_{ref}^3} \left( \frac{1}{\sqrt{I_{P1}}} + \frac{1}{\sqrt{I_{P2}}} \right)$$

$V_9$ may express an output value obtained when the light receiving element is disposed in the intermediate position between the photodiodes $CL_1$ and $CL_2$. Like the differential amplifier 433, the amplification factor of a differential amplifier 434 is determined by resistors 441 to 444. An output of the differential amplifier 434, that is, an output voltage $V_{10}$ on the terminal $B_2$ can be derived by the following equation (55).

$$V_{10} = (V_7 - V_9)A + V_{ref} \qquad (55)$$
$$= \left\{ \frac{1}{2}\left(\frac{1}{\sqrt{I_{P1}}} + \frac{1}{\sqrt{I_{P2}}}\right) - \frac{1}{\sqrt{I_{P3}}} \right\} A \cdot R \cdot$$
$$\sqrt{I_{ref}^3} + V_{ref}$$

$V_{10}$ becomes a voltage which corresponds to the inclination angle of the axial direction connecting the light emitting element L and the light receiving element $CL_3$ shown in FIG. 54.

Further, resistors 445, 446, 449, operational amplifier 447 and transistor 448 constitute a circuit for driving the externally attached light emitting diode L by supplying a constant current thereto. The resistors 445 and 446 respectively have resistances $R_1$ and $R_2$. Therefore, a potential $V_{11}$ at a connection node between the resistors 445 and 446 takes a value expressed by the following equation (56).

$$V_{11} = \left(\frac{R}{R_1 + R_2}\right) \cdot V_{ref} \qquad (56)$$

The operational amplifier 447 and transistor 448 constitute a buffer amplifier. The resistor 449 has a resistance $R_3$. Therefore, current $I_1$ flowing in the resistor 449 takes a value expressed by the following equation (57).

$$I_1 = \left(\frac{R_2}{R_1 + R_2}\right)\frac{V_{ref}}{R_3} \qquad (57)$$

Assuming that the D.C. current amplification factor of the transistor 448 is sufficiently large, then the driving current $I_2$ of the light emitting diode is expressed by the equation (58).

$$I_2 \approx I_1 \qquad (58)$$

Figure 67:
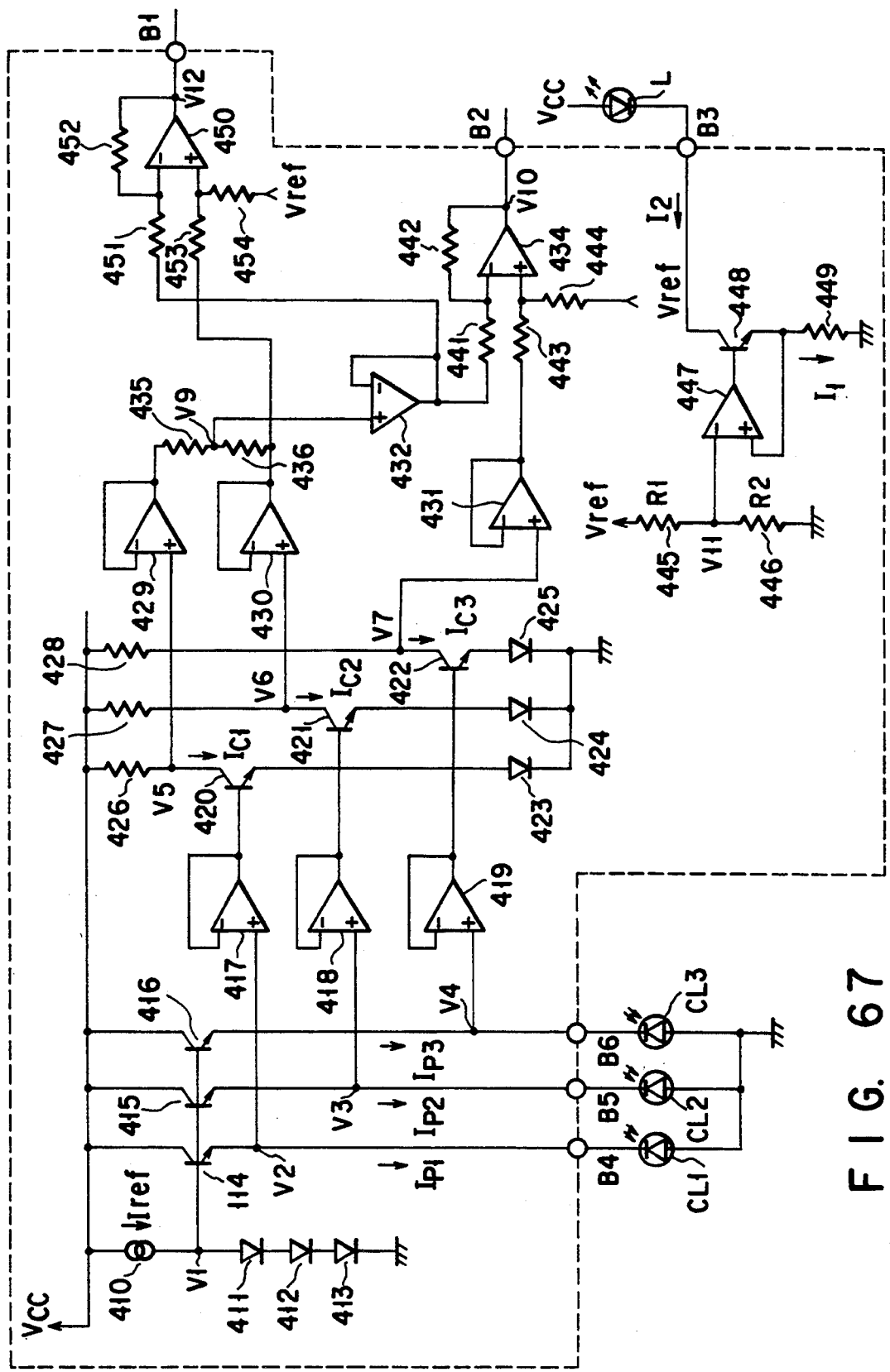
FIG. 67 is a block diagram showing another construction of a signal processing system formed of an analog circuit of the two-axial inclination sensor according to the third embodiment of this invention.

FIG. 67 shows another example of the construction of the two-axial inclination sensor using the above-described analog circuit. The basic construction of this example is the same as that of the circuit shown in FIG. 65, but the internal circuit construction of the bipolar IC 400 is slightly different. Therefore, only that portion which is different from the internal circuit of the bipolar IC 400 is explained and the explanation for the remaining portion is omitted.

A differential amplifier 450 is used instead of the differential amplifier 433 shown in FIG. 66 and the negative input terminal thereof is connected to the output of the buffer amplifier 432 via a resistor 451 and to a feedback resistor 452. Further, the positive input terminal of the differential amplifier 450 is connected to the output of the buffer amplifier 430 via a resistor 453 and to a resistor 454. The amplification factor of the differential amplifier 450 is determined by the resistors 451 to 454. Therefore, an output voltage of the differential amplifier 450, that is, an output voltage $V_2$ at the terminal $B_1$ can be derived by the following equation (59).

$$V_{12} = (V_6 - V_9)A + V_{ref} \qquad (59)$$
$$= \left\{ \frac{1}{2}\left(\frac{1}{\sqrt{I_{P1}}} + \frac{1}{\sqrt{I_{P2}}}\right) - \frac{1}{\sqrt{I_{P2}}} \right\} A \cdot R \cdot$$
$$\sqrt{I_{ref}^3} + V_{ref}$$
$$= \left(\frac{1}{\sqrt{I_{P1}}} - \frac{1}{\sqrt{I_{P2}}}\right)\frac{A \cdot R}{2} \sqrt{I_{ref}^3} + V_{ref}$$

The above equation (59) is slightly different from the equation for $V_8$ in the above embodiment, but the meaning thereof is the same. That is, $V_{12}$ is set to a voltage corresponding to the inclination of the axial direction connecting the sensors of the light receiving elements $CL_1$ and $CL_2$ shown in FIG. 54 and the variation amount of the output voltage for the same inclination angle is one half that obtained in the case of $V_8$ in the above embodiment.

Correction for mounting errors of the light receiving elements $CL_1$ to $CL_3$ and variation in the sensitivity of the sensor can be effected by multiplying the outputs $B_1$ and $B_2$ by the inclination coefficients in a manner described above.

Figure 68A:
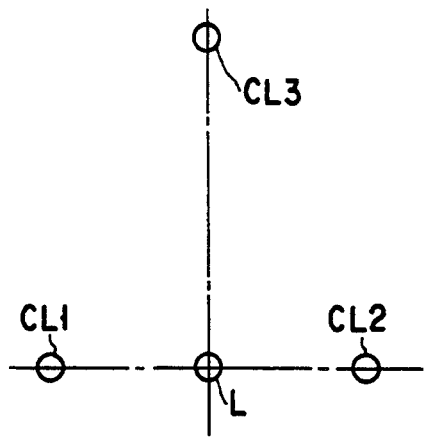
FIGS. 68A to 68C are diagrams showing modifications of the arrangements of the light projecting and receiving elements.
Figure 68B:
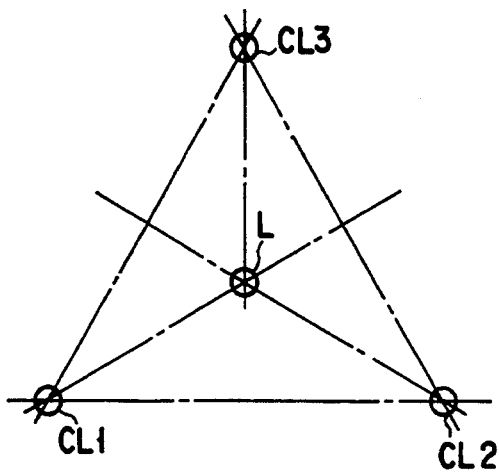
Figure 68C:
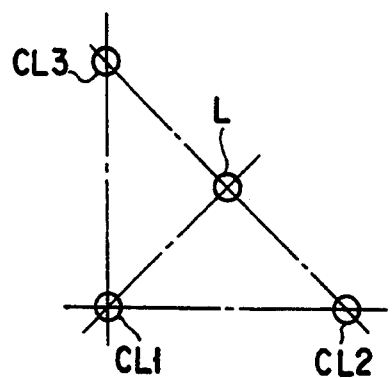

FIGS. 68A to 68C show modifications of the arrangement of the light projecting and receiving elements. The photoelectric current outputs of the elements are different from those shown in FIG. 54, but no problem occurs by changing the values of the correction coefficients.

Further, in the case of the arrangement (the light receiving elements $CL_1$ to $CL_3$ are disposed at the same distance from the light emitting element L) shown in FIG. 68B or 68C, inclinations in the two axial directions can be derived based on differences between reciprocals of the square roots as indicated by the expression (27) and the following expression (60) in the manner described in the first embodiment.

$$\frac{1}{\sqrt{i_1}} - \frac{1}{\sqrt{i_3}} \qquad (60)$$

When the above two-axial inclination sensor is applied to a shake sensor of a camera, a mounting space for the light receiving element $CL_4$ is not necessary, and therefore, a sensor of small area which will not degrading the design can be obtained.

As described above, according to the third embodiment of this invention, a two-axial inclination sensor in which the inclinations in the two axial directions can be detected without using four light receiving elements can be provided.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. An inclination detecting apparatus comprising:
   light projection means for projecting light towards a to-be-measured object;
   light receiving means for receiving reflection light from said light projection means and outputting at east two photoelectric currents according to the respective received light amounts;
   first operating means for deriving reciprocals of the square roots of the respective two photoelectric currents output from said light receiving means; and
   second operating means for deriving a difference between the reciprocals of the square roots derived by said first operating means, an output of said second operating means representing the inclination of the to-be-measured object.

2. An inclination detecting apparatus according to claim 1, wherein said light projection means is constructed by one light projecting element and said light receiving means is constructed by two light receiving elements.

3. An inclination detecting apparatus according to claim 1, wherein said light projection means is constructed by two light projecting elements and said light receiving means is constructed by two light receiving elements, each of said light projecting elements and a corresponding one of said light receiving elements constituting a detecting section.

4. An inclination detecting apparatus according to claim 1, wherein said light projection means is constructed by first and second light projecting elements and said light receiving means is constructed by one light receiving element, a photoelectric current of said light receiving element being output in response to light projected from said first light projecting element at a first timing and output in response to light projected from said second light projecting element at a second timing.

5. An inclination detecting apparatus according to claim 1, wherein said light projection means includes at east one light emitting diode and a hood disposed around said light emitting diode.

6. An inclination detecting apparatus according to claim 1, wherein said light projection means projects infrared rays towards said to-be-measured object.

7. An inclination detecting apparatus according to claim 1, wherein said light receiving means includes at least two photodiodes disposed in positions separated from said light projecting means by a preset distance.

8. An inclination detecting apparatus according to claim 1, wherein said light receiving means is constructed by two light receiving elements which are arranged on both sides of said light projecting means.

9. An inclination detecting apparatus according to claim 1, wherein said light receiving means includes an eliminating circuit for eliminating an influence by a stationary light current component caused by stationary light from the photoelectric current.

10. An inclination detecting apparatus according to claim 1, wherein said inclination detecting apparatus is attached to a camera to detect hand shake of a user of said camera according to a variation in the output of said second operating means with time.

11. An inclination detecting apparatus according to claim 10, wherein said camera permits the exposure operation when the detected hand shake amount is set in a preset range.

12. An inclination detecting apparatus according to claim 10, wherein a plurality of light receiving sections are arranged on the rear surface of said camera to detect hand shake amounts in two directions.

13. An inclination detecting apparatus according to claim 1, wherein said first operating means includes multiplying means for multiplying a reciprocal of the square root of a photoelectric current derived by said first operating means by a coefficient.

14. An inclination detecting apparatus according to claim 13, wherein said coefficient is stored in an electrically programmable nonvolatile storing means.

15. An inclination detecting apparatus according to claim 1, wherein said second operating means includes multiplying means for multiplying a difference between reciprocals of the two square roots derived by said second operating means by a coefficient.

16. An inclination detecting apparatus according to claim 15, wherein said coefficient is stored in an electrically programmable nonvolatile storing means.

17. An inclination detecting apparatus according to claim 1, wherein said first operating means includes multiplying means for multiplying a reciprocal of the square root of a photoelectric current derived by said first operating means by a coefficient for correcting the reflection factor of said to-be-measured object.

18. An inclination detecting apparatus according to claim 17, wherein said coefficient for correcting the reflection factor is stored in an electrically programmable nonvolatile storing means.

19. An inclination detecting apparatus according to claim 1, wherein the operation of said first operating means is effected by an analog operation circuit and the operation of said second operating means is effected by a digital operation circuit.

20. An inclination detecting apparatus according to claim 1, wherein said first and second operating means are constructed by digital operation circuits.

21. An inclination detecting apparatus according to claim 1, further comprising:
   adding means for adding together the two operation results derived by said first operating means for said two photoelectric currents, and
   means for deriving an absolute inclination of said to-be-measured object by use of the above result of addition.

22. An inclination detecting apparatus according to claim 21, wherein variations in said light receiving means are corrected by use of correction values when said adding means effects said adding operation.

23. An inclination detecting apparatus according to claim 22, wherein correction values used for correcting said variations are stored in an electrically programmable nonvolatile storing means.

24. An inclination detecting apparatus according to claim 1, wherein said light receiving means receives reflection light from said light projecting means at at least three different positions, outputs at least three photoelectric currents corresponding to received light amounts and said first and second operating means derive inclinations in two axial directions based on said three photoelectric currents.

25. An inclination detecting apparatus according to claim 24, wherein said light projection means is disposed between two of said three positions of said light receiving means and third light receiving means is disposed on a line perpendicular to a line connecting said two positions of said light receiving means.

26. An inclination detecting apparatus according to claim 24, wherein said three positions are set at the same distance from said light projection means.

27. An inclination detecting apparatus according to claim 24, wherein said first operating means derives reciprocals of the square roots of said three photoelectric currents, and said second operating means derives the sum of reciprocals of the square roots of two of said three photoelectric currents and derives a difference between the sum of reciprocals and a reciprocal of the square root of the remaining one of said three photoelectric currents.

28. An inclination detecting apparatus according to claim 1, further comprising switching means disposed between said first operating means and said light receiving means, for selectively supplying one of said first and second photoelectric currents to said first operating means.

29. A camera comprising:
a camera body;
light projection means attached to said camera body, for projecting light towards a user of the camera;
light receiving means attached to said camera body, for receiving reflection light from said light projection means and outputting at least two photoelectric currents according to the respective received light amounts;
first operating means for deriving reciprocals of the square roots of the respective two photoelectric currents output from said light receiving means;
second operating means for deriving a difference between the two reciprocals of the square roots derived by said first operating means, an output of said second operating means representing the inclination of a to-be-measured object; and
hand shake amount detecting means for detecting a hand shake amount of the user of the camera according to a variation in an output of said second operating means with time.

30. A camera according to claim 29, wherein said light projecting means is constructed by one light projecting element and said light receiving means is constructed by two light receiving elements.

31. A camera according to claim 29, wherein said light projecting means is constructed by two light projecting elements and said light receiving means is constructed by two light receiving elements, each of said light projecting elements and a corresponding one of said light receiving elements constituting a detecting section.

32. A camera according to claim 29, wherein said light projection means is constructed by first and second light projecting elements and said light receiving means is constructed by one light receiving element, a photoelectric current of said light receiving element being output in response to light projected from said first light projecting element at a first timing and output in response to light projected from said second light projecting element at a second timing.

33. A camera according to claim 29, wherein said camera permits the exposure operation of said camera body when the detected hand shake amount is set in a preset range.

34. A camera according to claim 29, wherein a plurality of light receiving sections are arranged on the rear surface of said camera body to detect hand shake amounts in two directions.

35. A camera according to claim 29, wherein said first operating means includes multiplying means for multiplying a reciprocal of the square root of a photoelectric current derived by said first operating means by a coefficient.

36. A camera according to claim 35, wherein said coefficient is stored in an electrically programmable nonvolatile storing means.

37. A camera according to claim 29, wherein said first operating means includes multiplying means for multiplying the reciprocal of the square root of the photoelectric current derived by said second operating means by a coefficient for correcting the reflection factor of said to-be-measured object.

38. A camera according to claim 37, wherein said coefficient for correcting the reflection factor is stored in an electrically programmable nonvolatile storing means.

39. A camera according to claim 29, wherein the operation of said first operating means is effected by an analog operation circuit and the operation of said second operating means is effected by a digital operation circuit.

40. A camera according to claim 29, wherein said first and second operating means are constructed by digital operation circuits.

41. A camera according to claim 29, further comprising:
adding means for adding together the two operation results derived by said first operating means for said two photoelectric currents, and
means for deriving an absolute inclination of said to-be-measured object by use of the above result of addition.

42. A camera according to claim 41, wherein variations in said light receiving means are corrected by use of correction values when said adding means effects said adding operation.

43. A camera according to claim 42, wherein correction values used for correcting said variations are stored in an electrically programmable nonvolatile storing means.

44. A camera according to claim 29, wherein said light projecting means is attached to the rear surface of said camera body.

45. A camera according to claim 29, wherein said light receiving means includes an eliminating circuit for eliminating an influence by a stationary light current component caused by stationary light from the photoelectric current.

46. A camera according to claim 29, wherein said light receiving means receives reflection light from said light projecting means in at least three different positions, outputs at least three photoelectric currents corresponding to received light amounts and said first and second operating means derive inclinations in two axial directions based on said three photoelectric currents.

47. An inclination detecting apparatus comprising:
light projection means for projecting light towards a to-be-measured object;
light receiving means for receiving reflection light from said light projection means and for outputting at least first and second photoelectric currents according to the respective received light amounts;
first operating means for effecting a processing operation for the first and second photoelectric currents output from said light receiving means and for outputting first and second results of the processing operation, said first operating means deriving reciprocals of square roots of the first and second photoelectric currents;

correction operating means for subjecting at least one of the first and second results of the processing operation derived by said first operating means to a correcting operation by use of at least one correction value for correcting a variation in the first and second photoelectric currents; and second operating means for deriving an inclination of said to-be-measured object by use of the first and second results of the processing operation correction by said correction operating means.

48. An inclination detecting apparatus according to claim 47, wherein said correction operating means effects the correcting operation by use of correction values for correcting variations in the first and second photoelectric currents caused by variations in said light projecting means and said light receiving means.

49. An inclination detecting apparatus according to claim 47, wherein said correction operating means effects the correcting operation by use of correction values for correcting a difference in the reflection factor of said to-be-measured object.

50. An inclination detecting apparatus according to claim 49, wherein said correction values are stored in an electrically programmable nonvolatile storing means.

51. An inclination detecting apparatus according to claim 48, wherein said correction values are stored in an electrically programmable nonvolatile storing means.

52. An inclination detecting apparatus according to claim 47, wherein said inclination detecting apparatus is attached to a camera to detect hand shake of a user of the camera according to a variation in the operation result of said second operating means with time.

53. An inclination detecting apparatus according to claim 52, wherein said camera permits a exposure operation when the detected hand shake amount is less than a preset value.

54. An inclination detecting apparatus comprising:
light projection means for projecting light towards a to-be-measured object;
light receiving means for receiving reflection light from said light projection means in at least three different positions and outputting at least three photoelectric currents according to the respective received light amounts;
first operating means for effecting the operation based on the first, second and third photoelectric currents output from said light receiving means; and
second operating means for deriving an inclination of said to-be-measured object in two axial directions based on the result of operation effected by said first operating means.

55. An inclination detecting apparatus according to claim 54, wherein said first operating means derives reciprocals of the square roots of the first, second and third photoelectric currents and said second operating means effects the arithmetic operation based on the reciprocals of the square roots.

56. An inclination detecting apparatus according to claim 54, wherein said light receiving means includes first and second light receiving elements arranged on both sides of said light projecting means and a third light receiving element disposed in a position different from said first and second light receiving elements.

57. An inclination detecting apparatus according to claim 56, wherein said second operating means detects an inclination in a first axial direction based on photoelectric currents output from said first and second light receiving elements, derives the sum of outputs of said first operating means for the photoelectric currents output from said first and second light receiving elements, and detects an inclination in a second axial direction based on the result of addition operation and the result of operation effected by said first operating means based on a photoelectric current output from said third light receiving element.

58. An inclination detecting apparatus according to claim 54, wherein said inclination detecting apparatus is attached to a camera to detect hand shake of said camera based on a variation in the result of operation effected by said second operating means with time.

59. An inclination detecting apparatus according to claim 58, wherein said camera permits the exposure operation when the detected hand shake amount is set less than a preset value.

60. An inclination detecting apparatus comprising:
a light projection element for projecting a light beam towards a to-be-measured object;
first, second and third light receiving elements for receiving light projected from said light projection element and reflected from said to-be-measured object;
first detecting means for detecting an inclination in a first axial direction according to photoelectric currents output from said first and second light receiving elements; and
second detecting means for detecting an inclination in a second axial direction according to photoelectric currents output from said second and third light receiving elements.

61. An inclination detecting apparatus according to claim 60, wherein said light receiving elements are disposed at substantially the same distance from said light projecting element.

62. An inclination detecting apparatus comprising:
light projection means for projecting light towards a to-be-measured object;
light receiving means for receiving reflection light from said light projection means and for outputting at least first and second photoelectric currents according to the respective received light amounts;
first operating means for effecting an arithmetic operation for the first and second photoelectric currents output from said light receiving means and for outputting first and second results of operation, said first operating means deriving reciprocals of the square roots of the respective first and second photoelectric currents;
second operating means for deriving an inclination of said to-be-measured object by use of the first and second results of operation; and
stationary light eliminating means for eliminating an influence on the first and second photoelectric currents by stationary light contained in the reflection light from said to-be-measured object.

63. An inclination detecting apparatus according to claim 62, wherein said stationary light elimination means stores output levels of currents of said light receiving means for the first and second photoelectric currents obtained prior to light projection by said light projecting means and outputs values obtained by subtracting the stored currents as the respective photoelectric currents at the time of light projection by said light projecting means.

64. An inclination detecting apparatus according to claim 62, wherein said inclination detecting apparatus is incorporated into a camera to detect hand shake of a user of said camera according to an output representing the inclination derived by said second operating means.

65. An inclination detecting apparatus incorporated in a camera to detect hand shake of a user camera, the inclination detecting apparatus comprising:
light projection means for projecting light towards a to-be-measured object;
light receiving means for receiving reflection light from said light projection means and for outputting at least one photoelectric current according to the received light amount;
operating means for producing an output representing an inclination of said to-be-measured object based on the at least one photoelectric current output from said light receiving means;
stationary light eliminating means for eliminating an influence on the photoelectric current by stationary light contained in the reflection light from said to-be-measured object, and
wherein said inclination detecting apparatus incorporated into a camera detects hand shake of a user of said camera according to the output produced by said operating means.

66. A non-contact type inclination detecting apparatus comprising:
light projection means for projecting light towards a to-be-measured object;
light receiving means for receiving light reflected from said to-be-measured object and outputting a photoelectric current signal;
first operating means for deriving a reciprocal of the square root of the photoelectric current signal output from said light receiving means; and
second operating means for deriving an inclination of said to-be-measured object based on an output of said first operating means.

67. A non-contact type inclination detecting apparatus according to claim 66, wherein said light receiving means includes eliminating means for eliminating an influence of light other than light projected from said light projecting means.

68. A non-contact type inclination detecting apparatus according to claim 66, wherein said light projection means and said light receiving means are arranged on substantially the same plane.

69. A non-contact type inclination detecting apparatus according to claim 66, wherein said light receiving means includes first and second light receiving elements and said light projecting means includes a single light projecting element.

70. A non-contact type inclination detecting apparatus according to claim 66, wherein said light projecting means includes a single light projecting element and said light receiving means includes first, second and third light receiving elements, said third light receiving element being disposed on a perpendicular passing an intermediate point between said first and second light receiving elements.

71. A shake detecting apparatus of a camera comprising:
light projection means for projecting light towards the exterior of the camera;
light receiving means for receiving light projected from said light projection means and reflected from the preset surface of an object lying outside the camera, and outputting a light signal, said light receiving means including eliminating means for eliminating an influence of light other than light projected from said light projecting means; and
operating means for deriving a shake signal of the camera based on a variation in an output from said light receiving means.

72. A shake detecting apparatus according to claim 71, wherein said operating means derives a difference between reciprocals of the square roots of light signals output from said light receiving means according to amounts of light reflected from points on said preset surface and received by said light receiving means.

73. A shake detecting apparatus according to claim 71, wherein said light projecting means and said light receiving means are arranged near the finder of the camera.

74. A shake detecting apparatus according to claim 71, wherein said light receiving means includes first and second light receiving elements and said light projecting means includes a single light projecting element.

75. A shake detecting apparatus according to claim 71, wherein said light projecting means includes a single light projecting element and said light receiving means includes first, second and third light receiving elements, said third light receiving element being disposed on a perpendicular passing an intermediate point between said first and second light receiving elements.

76. A shake detecting apparatus of a camera comprising:
light projection means for projecting light towards the photographer of the camera;
light receiving means for receiving light projected from said light projection means and reflected from part of the body of the photographer, and outputting a light signal, said light receiving means including eliminating means for eliminating an influence of light other than light projected from said light projecting means; and
operating means for deriving a shake signal of the camera based on a variation in an output from said light receiving means.

77. A shake detecting apparatus according to claim 76, wherein said light receiving means receives light projected from said light projection means and reflected from at least two points on the body of the photographer and outputting light signals, and said operating means derives a difference between reciprocals of the square roots of the light signals corresponding to lights reflected on said points.

78. A shake detecting apparatus according to claim 76, wherein said light projecting means and said light receiving means are arranged near the finder of the camera.

79. A shake detecting apparatus according to claim 76, wherein said light receiving means includes first and second light receiving elements and said light projecting means includes a single light projecting element.

80. A non-contact type inclination detecting apparatus comprising:
light projection means for projecting light towards a to-be-measured object;
light receiving means including three light receiving elements for receiving reflection light from said light projection means;

processing means for processing outputs of said light receiving means; and operating means for deriving inclinations of the to-be-measured object in preset two axial directions with respect to a reference surface according to an output from said processing means.

81. A non-contact type inclination detecting apparatus according to claim 80, wherein said light receiving means includes eliminating means for eliminating an influence of light other than light projected from said light projecting means.

82. A non-contact type inclination detecting apparatus according to claim 80, wherein each of said light receiving means disposed at substantially the same distance from said light projecting means.

83. A non-contact type inclination detecting apparatus according to claim 80, wherein said light projecting means includes a single light projecting element and said light receiving means includes first, second and third light receiving elements, said third light receiving element being disposed on a perpendicular passing an intermediate point between said first and second light receiving elements.

84. A non-contact type inclination detecting apparatus comprising:

light projection means for projecting light towards a to-be-measured object;

light receiving means for receiving reflected light from said to-be-measured object and outputting photoelectric current signals;

first operating means for deriving reciprocals of the square roots of the respective photoelectric current signals output from said light receiving means;

means for correcting outputs from said first operating means; and second operating means for deriving an inclination of said to-be-measured object based on an output from said correction means.

85. A non-contact type inclination detecting apparatus according to claim 84, wherein said light receiving means includes eliminating means for eliminating an influence of light other than light projected from said light projecting means.

86. A non-contact type inclination detecting apparatus according to claim 84, wherein said correction means includes storing means for storing correction coefficients used for correcting the output of said first operating means.

87. A non-contact type inclination detecting apparatus according to claim 84, wherein said light projecting means and said light receiving means are disposed on substantially the same plane.

88. A non-contact type inclination detecting apparatus according to claim 84, wherein said light receiving means includes first and second light receiving elements and said light projecting means includes a single light projecting element.

89. A non-contact type inclination detecting apparatus according to claim 84, wherein said light projecting means includes a single light projecting element and said light receiving means includes first, second and third light receiving elements, said third light receiving element being disposed on a perpendicular passing an intermediate point between said first and second light receiving elements.

90. A shake detecting apparatus of a camera comprising:

light projection means for projecting light towards the exterior of the camera;

light receiving means for receiving light projected from said light projection means and reflected from the preset surface of an object lying outside the camera, and outputting a light signal;

means for correcting an output of said light receiving means; and operating means for deriving a shake signal of the camera based on a variation in an output from said correction means.

91. A shake detecting apparatus according to claim 90, wherein said light receiving means includes eliminating means for eliminating an influence of light other than light projected from said light projecting means.

92. A shake detecting apparatus according to claim 90, wherein said correction means includes storing means for storing correction coefficients used for correcting the output of said first operating means.

93. A shake detecting apparatus according to claim 90, wherein said operating means derives a difference between reciprocals of the square roots of light signals output from said light receiving means and corresponding to amounts of lights reflected from at least two points on said preset surface.

94. A shake detecting apparatus according to claim 90, wherein said light projection means and said light receiving means are disposed on that side of said camera on which a finder is arranged.

95. A shake detecting apparatus according to claim 90, wherein said light receiving means includes first and second light receiving elements and said light projecting means includes a single light projecting element.

96. A shake detecting apparatus according to claim 90, wherein said light projecting means includes a single light projecting element and said light receiving means includes first, second and third light receiving elements, said third light receiving element being disposed on a perpendicular passing an intermediate point between said first and second light receiving elements.

97. An inclination detecting apparatus of a camera comprising:

detection means disposed on a body of said camera, for detecting an inclination of said camera with respect to the face of the photographer of the camera;

wherein said detection means includes at least light projection means and light receiving means, and can detect an inclination of said camera with respect to the face of the photographer and a distance between said camera and the face of the photographer, the sensitivity with which a variation in the inclination is detected is higher than the sensitivity with which a variation in the distance is detected.

98. An inclination detecting apparatus according to claim 97, said light receiving means includes eliminating means for eliminating an influence of light other than light projected from said light projecting means.

99. A shake detecting apparatus of a camera, comprising:

light projecting means for projecting light towards a to-be-measured object;

light receiving means for receiving reflection light from said light projecting means, and outputting at least first and second photoelectric currents in accordance with the respective received light amounts;

first operation means for performing operations on the first and second photoelectric currents output from said light receiving elements, and outputting first and second operation results;

correcting operation means for subjecting at least one of the first and second operation results derived by said first operation means to a correcting operation by use of a correction value for correcting a variation in the first and second photoelectric currents; and second operation means for deriving an inclination of the to-be-measured object by use of the first and second operation results corrected by said correcting operation means; and shake detecting means for detecting hand shake of a user of the camera in accordance with how the operation result of said second operation means varies with time.

100. A shake detecting apparatus according to claim 99, wherein said first operation means derives reciprocals of the square roots of the first and second photoelectric currents.

101. A shake detecting apparatus according to claim 99, wherein said correcting operation means effects the correcting operation by use of correction values for correcting variations in the first and second photoelectric currents caused by variations in said light projecting means and said light receiving means.

102. A shake detecting apparatus according to claim 99, wherein said correcting operation means effects the correcting operation by use of correction values for correcting a difference in the reflection factor of said to-be-measured object.

103. A shake detecting apparatus according to claim 101, wherein said correction values are stored in an electrically programmable nonvolatile storing means.

104. A shake detecting apparatus according to claim 102, wherein said correction values are stored in an electrically programmable nonvolatile storing means.

105. A shake detecting apparatus according to claim 99, wherein said camera permits an exposure operation when the detected hand shake amount is less than a preset value.

106. A shake detecting apparatus of a camera, comprising:

light projecting means for projecting light towards a to-be-measured object;

light receiving means for receiving reflection light from said light projecting means, and outputting at least first and second photoelectric currents in accordance with the respective received light amounts;

first operation means for performing operations on the first and second photoelectric currents output from said light receiving means, and outputting first and second operation results;

second operation means for deriving an inclination of the to-be-measured object by use of said first and second operation results;

stationary light eliminating means for eliminating an influence of stationary light contained in the reflection light from the to-be-measured object upon the first and second photoelectric currents; and shake detecting means for detecting hand shake of a user of a camera in accordance with how an output of said second operation means varies with time.

107. A shake detecting apparatus according to claim 106, wherein said stationary light eliminating means stores output levels of currents of said light receiving means for the first and second photoelectric currents obtained prior to light projection by said light projecting means, and wherein values obtained by subtracting the stored currents are output as the respective photoelectric currents at the time of light projection by said light projecting means.

108. A shake detecting apparatus according to claim 106, wherein said first operation means derives reciprocals of the square roots of the respective first and second photoelectric currents.

* * * * *